United States Patent
Nam et al.

(10) Patent No.: US 11,818,700 B2
(45) Date of Patent: Nov. 14, 2023

(54) INDICATION OF SINGLE FREQUENCY NETWORK RECEIVER PROCESSING MODES

(71) Applicant: QUALCOMM Incorporated, San Diego, CA (US)

(72) Inventors: Wooseok Nam, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 239 days.

(21) Appl. No.: 17/472,559

(22) Filed: Sep. 10, 2021

(65) Prior Publication Data

US 2022/0086818 A1  Mar. 17, 2022

Related U.S. Application Data

(60) Provisional application No. 63/077,515, filed on Sep. 11, 2020, provisional application No. 63/077,455, filed on Sep. 11, 2020, provisional application No. 63/077,508, filed on Sep. 11, 2020.

(51) Int. Cl.
| | | |
|---|---|---|
| *H04W 72/04* | (2023.01) | |
| *H04W 74/08* | (2009.01) | |
| *H04W 72/044* | (2023.01) | |
| *H04W 72/21* | (2023.01) | |

(52) U.S. Cl.
CPC ......... *H04W 72/046* (2013.01); *H04W 72/21* (2023.01); *H04W 74/0833* (2013.01)

(58) Field of Classification Search
CPC ............... H04W 72/046; H04W 72/21; H04W 74/0833; H04W 74/006; H04W 56/0015
See application file for complete search history.

(56) References Cited

U.S. PATENT DOCUMENTS

| | | | |
|---|---|---|---|
| 10,080,230 B2* | 9/2018 | Miao | H04W 24/02 |
| 11,272,503 B2* | 3/2022 | Chae | H04W 24/10 |
| 2015/0071112 A1* | 3/2015 | Nammi | H04B 7/024 |
| | | | 370/254 |
| 2016/0029381 A1* | 1/2016 | Jang | H04W 48/10 |
| | | | 370/329 |
| 2021/0336819 A1* | 10/2021 | Kim | H04B 7/06 |
| 2022/0225119 A1* | 7/2022 | Liberg | H04B 7/18513 |
| 2022/0376855 A1* | 11/2022 | Zhang | H04L 5/0048 |

* cited by examiner

*Primary Examiner* — Brian D Nguyen
(74) *Attorney, Agent, or Firm* — Procopio, Cory, Hargreaves & Savitch

(57) ABSTRACT

Apparatus, methods, and computer-readable media for facilitating an indication of SFN receiver processing modes are disclosed herein. An example method for wireless communication at a UE includes receiving an indication of a set of SFN receiver processing modes supported by a set of two or more base stations configured for SFN communication. The example method also includes receiving an SFN-beam that is SFN transmitted by the set of two or more base stations. Additionally, the example method includes transmitting an uplink signal to the set of two or more base stations based on the indication and the SFN-beam.

29 Claims, 28 Drawing Sheets

INDICATION OF SINGLE FREQUENCY NETWORK RECEIVER PROCESSING MODES

CROSS REFERENCE TO RELATED APPLICATION(S)

This application claims the benefit of and priority to U.S. Provisional Application Ser. No. 63/077,455, entitled "Indication of Single Frequency Network Receiver Processing Modes," and filed on Sep. 11, 2020, U.S. Provisional Application Ser. No. 63/077,515, entitled "RANDOM ACCESS CHANNEL CONFIGURATION FOR SINGLE FREQUENCY NETWORK," and filed on Sep. 11, 2020, and U.S. Provisional Application Ser. No. 63/077,508, entitled "UPLINK TRANSMIT POWER CONTROL FOR SINGLE FREQUENCY NETWORK" and filed on Sep. 11, 2020, which are each expressly incorporated by reference herein in their entirety.

TECHNICAL FIELD

The present disclosure relates generally to communication systems, and more particularly, to wireless communication utilizing single frequency network communications.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a user equipment (UE). An example apparatus may receive an indication of a set of SFN receiver processing modes supported by a set of two or more base stations configured for SFN communication. The example apparatus may also receive an SFN-beam that is SFN transmitted by the set of two or more base stations. Additionally, the example apparatus may transmit an uplink signal to the set of two or more base stations based on the indication and the SFN-beam.

In another aspect of the disclosure, a method, a computer-readable medium, and an apparatus are provided for wireless communication at a UE. An example apparatus may receive a RACH configuration associated with a SFN SSB transmitted by a set of two or more base stations configured for SFN communication, the RACH configuration associated with the SFN SSB including one or more parameter that are different than for a non-SFN SSB. The example apparatus may also transmit a RACH transmission based on the RACH configuration.

In another aspect of the disclosure, a method, a computer-readable medium, and an apparatus are provided for wireless communication at a network entity. An example apparatus may transmit, to a UE, an indication of a set of SFN receiver processing modes, wherein the network entity is associated with a set of two or more base stations configured for SFN communication. The example apparatus may also receive an uplink signal from the UE via at least one of the set of two or more base stations. Additionally, the example apparatus may process the uplink signal based on an SFN receiver processing mode of the set of SFN receiver processing modes.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
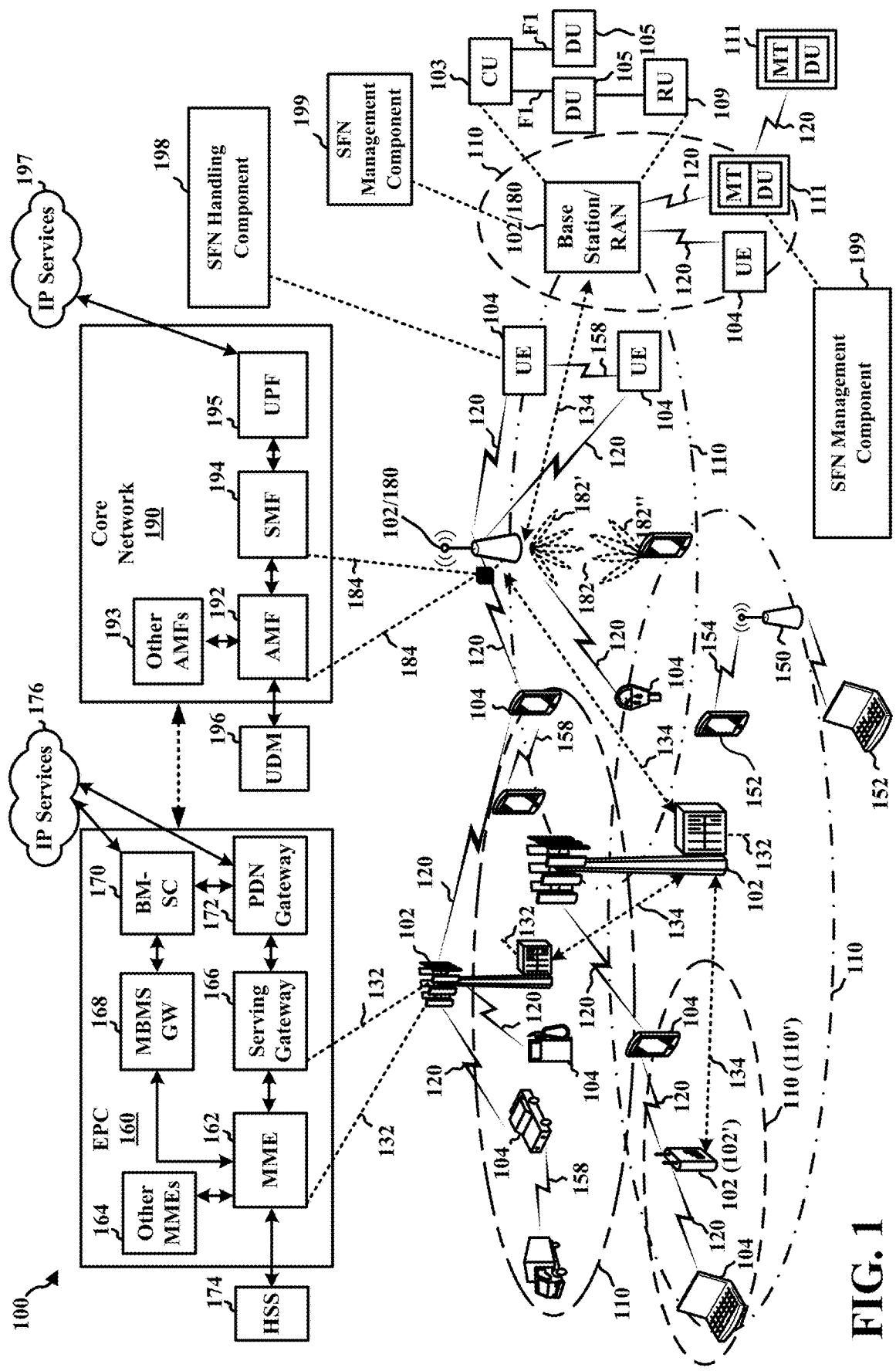
FIG. 1 is a diagram illustrating an example of a wireless communications system and an access network.

SFN transmission is a transmission mode in which a same transmission signal is simultaneously transmitting from multiple spatially dispersed base stations. For the receiver (e.g., a UE receiving an SFN transmission signal), SFN transmission provides benefits associated with macro diversity and/or frequency diversity gain in SFN areas (e.g., areas within a communication network employing SFN communications) and/or with SFN beams (e.g., transmission beams that are used for the SFN transmission signal). In some examples, different sets of SFN-capable base stations may support different receiver processing modes. Additionally, for a given set of SFN-capable base stations, the receiver processing mode may change (e.g., based on a received uplink signal, based on a configuration, etc.). In some examples, RACH parameters associated with SFN may be different than RACH parameters associated with non-SFN.

Examples disclosed herein provide techniques for a base station to indicate one or more SFN receiver processing modes supported by the base station. Additionally, the base station may indicate one or more transmit beams that are SFN beams among a plurality of beams for downlink transmission. In some examples, the indication may map an SFN receiver processing mode to an SFN beam. In some examples, the UE may adapt one or more transmit parameters associated with transmitting the SFN-based uplink signal based on at least one of the indicated SFN receiver processing modes and/or the SFN receiver processing mode mapping to an SFN beam received by the UE.

Aspects disclosed herein provide a RACH configuration associated with SFN SSBs transmitted by a set of two or more base stations configured for SFN communication. For example, disclosed techniques enable applying a RACH configuration associated with SFN when performing a random access procedure based on an SFN SSB. In some examples, the RACH configuration associated with an SFN SSB may be separate from a RACH configuration associated with a non-SFN SSB. For example, the RACH configuration associated with the SFN SSB may include one or more parameter that are different than for a RACH configuration associated with a non-SFN SSB.

Aspects disclosed herein provide techniques for determining an improved uplink transmission power for providing reception at a network in an SFN. For example, disclosed techniques include determining a transmission power for an uplink transmission based on a pathloss measurement for an SFN reference signal and a compensation factor (sometimes referred to as a "scaling factor") associated with the SFN reference signal. In some examples, the SFN reference signal may comprise an SFN SSB.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Aspects described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described aspects may occur. Implementations may range a spectrum from chip-level or modular components to non-modular, non-chip-level implementations and further to aggregate, distributed, or original equipment manufacturer (OEM) devices or systems incorporating one or more aspects of the described aspects. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that aspects described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100 including base stations 102 and 180 and UEs 104. The example of the wireless communications system of FIG. 1 (also referred to as a wireless wide area network (WWAN)) includes the base stations 102, the UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

In some examples, a wireless communication device, such as a UE 104, may be configured to manage one or more aspects of wireless communication by facilitating SFN communication. As an example, in FIG. 1, the UE 104 may include an SFN handling component 198 configured to receive an indication of different SFN receiver processing modes supported by a network entity. The example SFN handling component 198 may also be configured to receive an indication of different RACH configurations for SFN. The example SFN handling component 198 may also be configured to receive an indication of modified power control factors for SFN. Additionally, the example SFN handling component 198 may be configured to transmit an uplink transmission based in part on at least one of the different SFN receiver processing modes, the different RACH configurations, and the modified power control factors.

In another aspect, the example SFN handling component 198 may be configured to facilitate receiving of an indication of SFN receiver processing modes supported by a base station. As an example, the SFN handling component 198 may be configured to receive an indication of a set of SFN receiver processing modes supported by a set of two or more base stations configured for SFN communication. The example SFN handling component 198 may also be configured to receive an SFN-beam that is SFN transmitted by the set of two or more base stations. Additionally, the example SFN handling component 198 may be configured to transmit an uplink signal to the set of two or more base stations based on the indication and the SFN-beam.

In another aspect, the example SFN handling component 198 may manage one or more aspects of wireless communication by using RACH configurations for SFN SSBs that may comprise one or more parameter different than for non-SFN SSBs. As an example, in FIG. 1, the SFN handling component 198 may be configured to receive a RACH configuration associated with an SFN SSB transmitted by a set of two or more base stations configured for SFN communication. In some examples, the RACH configuration associated with the SFN SSB may include one or more parameter that are different than for a non-SFN SSB. The example SFN handling component 198 may also be configured to transmit a RACH transmission based on the RACH configuration.

In another aspect, the example SFN handling component 198 may manage one or more aspects of wireless communication by using a scaling factor to determine a transmission power for an uplink transmission. As an example, in FIG. 1, the SFN handling component 198 may be configured to receive, from a network, a scaling factor for transmission power control of an uplink transmission associated with an SFN reference signal transmitted by a set of two or more base stations configured for SFN communication. The example SFN handling component 198 may also be configured to receive the SFN reference signal. The example SFN handling component 198 may also be configured to determine a transmission power for the uplink transmission based on a pathloss measurement for the SFN reference signal and using the scaling factor. In some examples, the pathloss measurement may be based on respective pathlosses associated with the set of two or more base stations. The example SFN handling component 198 may also be configured to transmit the uplink transmission based on the determined transmission power.

Still referring to FIG. 1, in some examples, a base station 102/180 may be configured to manage one or more aspects of wireless communication by facilitating SFN communication. As an example, in FIG. 1, the base station 102/180 may include an SFN management component 199 configured to indicate different SFN receiver processing modes supported by a network entity. The example SFN management component 199 may also be configured to indicate different RACH configurations for SFN. The example SFN management component 199 may also be configured to indicate modified power control factors for SFN. Additionally, the example SFN management component 199 may be configured to receive an uplink transmission based in part on at least one of the different SFN receiver processing modes, the different RACH configurations, and the modified power control factors.

In another aspect, the example SFN management component 199 may manage one or more aspects of wireless communication by providing an indication of SFN receiver processing modes supported by the base station. As an example, in FIG. 1, the example SFN management component 199 may be configured to transmit, to a UE, an indication of a set of SFN receiver processing modes. In some examples, the base station may be configured for SFN communication. The example SFN management component 199 may also be configured to receive an uplink signal from the UE. Additionally, the example SFN management component 199 may be configured to process the received uplink signal based on an SFN receiver processing mode of the indicated set of SFN receiver processing modes.

In another aspect, the example SFN management component 199 may be configured to manage one or more aspects of wireless communication by providing RACH configurations for SFN SSBs that may comprise one or more parameter different than for non-SFN SSBs an indication of SFN receiver processing modes supported by the base station. As an example, in FIG. 1, the example SFN management component 199 may be configured to transmit, to a UE, a RACH configuration associated with an SFN SSB transmitted by a set of two or more base stations configured for SFN communication. In some examples, the RACH configuration associated with the SFN SSB may include one or more parameter that are different than for a non-SFN SSB. The example SFN management component 199 may also be configured to receive a RACH transmission from a UE based on the RACH configuration.

In another aspect, the example SFN management component 199 may be configured to manage one or more aspects of wireless communication by indicating a scaling factor to a UE to determine a transmission power for an uplink transmission. As an example, in FIG. 1, the example SFN management component 199 may be configured to indicate, to a UE, a scaling factor for transmission power control of an uplink transmission associated with SFN reference signal transmitted by a set of two or more transmission points configured for SFN communication. The example SFN management component 199 may also be configured to transmit the SFN reference signal. The example SFN management component 199 may also be configured to receive the uplink transmission having a transmission power based, at least in part, on the scaling factor.

Although the following description provides examples directed to 5G NR (and, in particular, to SFN transmissions), the concepts described herein may be applicable to other similar areas, such as LTE, LTE-A, CDMA, GSM, and/or other wireless technologies.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184 (e.g., an X2 interface), and the third backhaul links 134 may be wired or wireless.

In some aspects, a base station may be referred to as a RAN and may include aggregated or disaggregated components. As an example of a disaggregated RAN, a base station may include a central unit (CU), one or more distributed units (DU), and/or one or more remote units (RU). For example, the example of FIG. 1 illustrates a disaggregated RAN including a CU 103, a DU 105, an/or an RU 109. In some examples, a RAN may be disaggregated with a split between the RU 109 and an aggregated CU/DU. In some examples, a RAN may be disaggregated with a split between the CU 103, the DU 105, and the RU 109. In some examples, a RAN may be disaggregated with a split between the CU 103 and an aggregated DU/RU. The CU 103 and the DU 105 may be connected via an F1 interface. The DU 105 and the RU 109 may be connected via a fronthaul interface. A connection between the CU 103 and the DU 105 may be referred to as a midhaul, and a connection between the DU 105 and the RU 109 may be referred to as a fronthaul. The connection between the CU 103 and the core network may be referred to as the backhaul. The RAN may be based on a functional split between various components of the RAN, e.g., between the CU 103, the DU 105, or the RU 109. The CU may be configured to perform one or more aspects of a wireless communication protocol, e.g., handling one or more layers of a protocol stack, and the DU(s) may be configured to handle other aspects of the wireless communication protocol, e.g., other layers of the protocol stack. In different implementations, the split between the layers handled by the CU and the layers handled by the DU may occur at different layers of a protocol stack. As one, non-limiting example, the DU 105 may provide a logical node to host a radio link control (RLC) layer, a medium access control (MAC) layer, and at least a portion of a physical (PHY) layer based on the functional split. An RU may provide a logical node configured to host at least a portion of the PHY layer and radio frequency (RF) processing. The CU 103 may host higher layer functions, e.g., above the RLC layer, such as a service data adaptation protocol (SDAP) layer, a packet data convergence protocol (PDCP) layer. In other implementations, the split between the layer functions provided by the CU, DU, or RU may be different.

An access network, such as the example access network 100 of FIG. 1, may include one or more integrated access and backhaul (IAB) nodes 111 that exchange wireless communication with the UE 104 or another IAB node to provide access and backhaul to a core network. In an IAB network of multiple IAB nodes, an anchor node may be referred to as an IAB donor. The IAB donor may be a base station that provides access to the core network 190 or the EPC 160 and/or control to the one or more IAB nodes 111. The IAB donor may include the CU 103 and the DU 105. In some examples, the one or more IAB nodes 111 may include the DU 105 and a mobile termination (MT) 113. In some such examples, the DU 105 of the IAB node may operate as a parent node, and the MT 113 may operate as a child node.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE to a base station and/or downlink (DL) (also referred to as forward link) transmissions from a base station to a UE. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station, whether a small cell 102' or a large cell (e.g., a macro base station), may include and/or be referred to as an eNB, gNodeB (gNB), or another type of base station. Some base stations, such as a gNB may operate in a traditional sub 6 GHz spectrum, in millimeter wave frequencies, and/or near millimeter wave frequencies in communication with the UE 104. When the gNB operates in millimeter wave or near millimeter wave frequencies, the gNB may be referred to as a millimeter wave base station. The millimeter wave base station may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Figure 2:
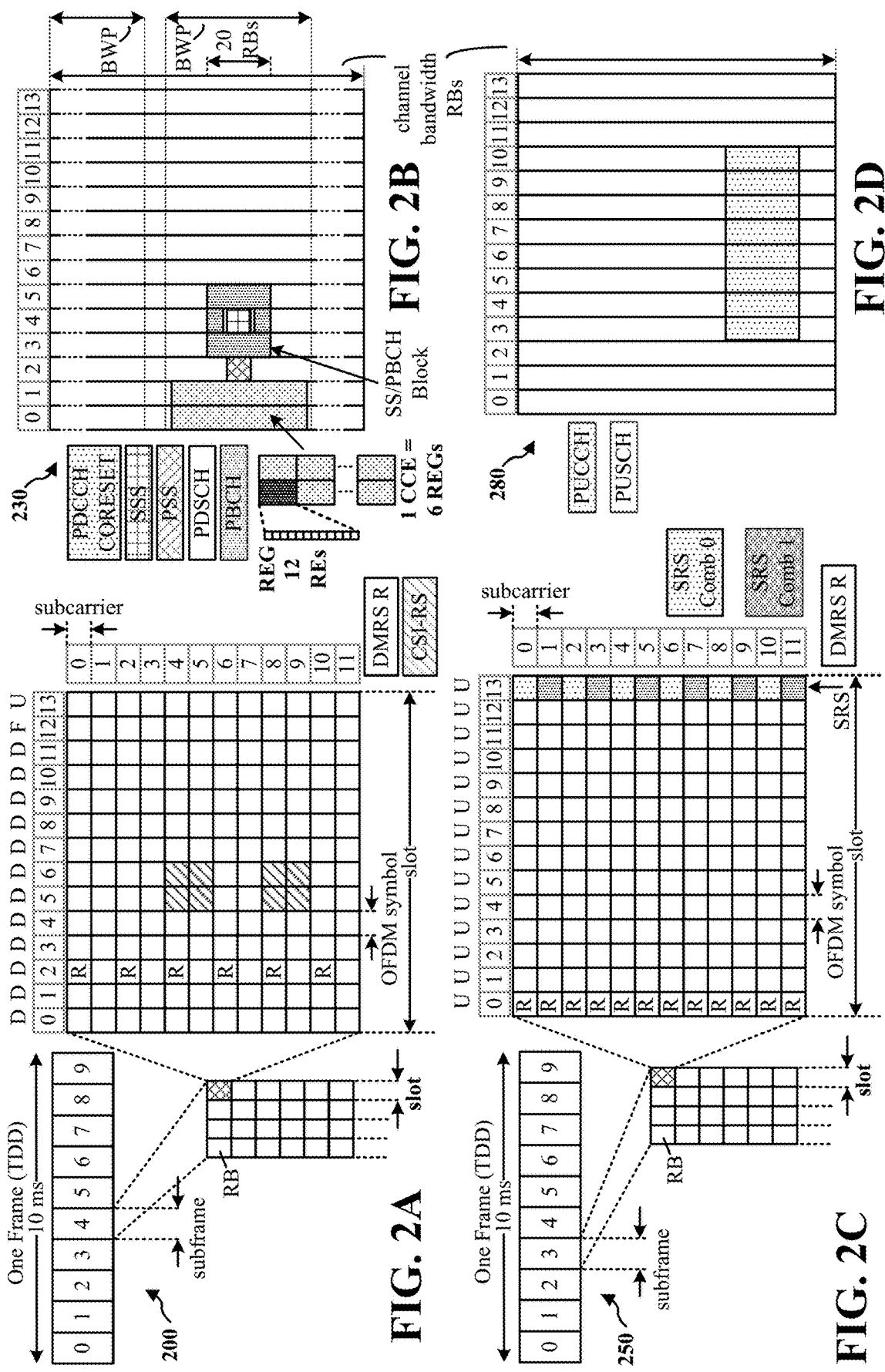
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2\mu \cdot 15[kHz]$ | Cyclic prefix |
| --- | --- | --- |
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu * 15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
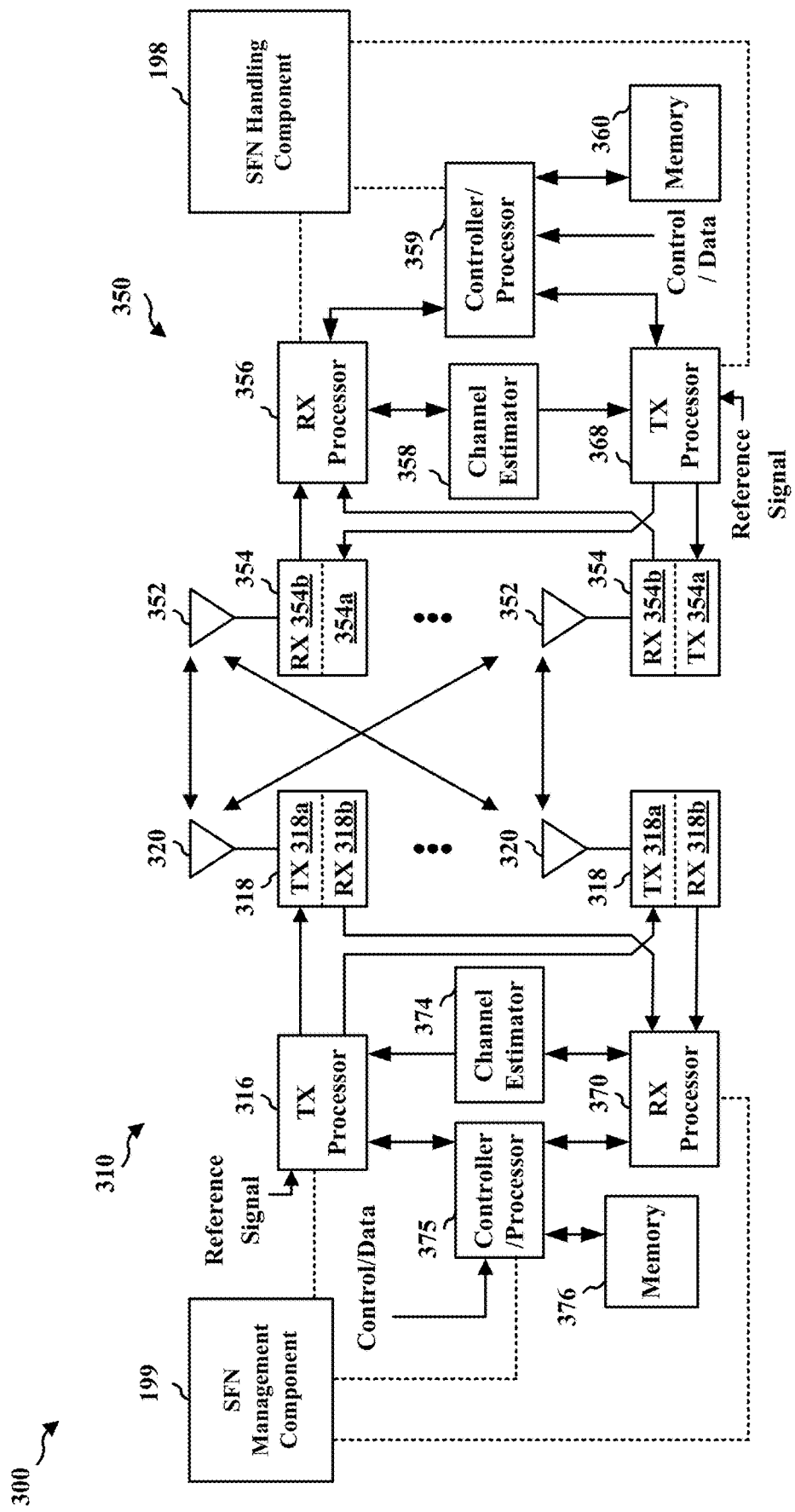
FIG. 3 is a diagram illustrating an example of a base station and a UE in an access network.

FIG. 3 is a block diagram that illustrates an example of a first wireless device that is configured to exchange wireless communication with a second wireless device. In the illustrated example, the first wireless device may include a base station 310, the second wireless device may include a UE 350, and the base station 310 may be in communication with the UE 350 in an access network. As shown in FIG. 3, the base station 310 includes a transmit processor (TX processor 316), a transceiver 318 including a transmitter 318a and a receiver 318b, antennas 320, a receive processor (RX processor 370), a channel estimator 374, a controller/processor 375, and memory 376. The example UE 350 includes antennas 352, a transceiver 354 including a transmitter 354a and a receiver 354b, an RX processor 356, a channel estimator 358, a controller/processor 359, memory 360, and a TX processor 368. In other examples, the base station 310 and/or the UE 350 may include additional or alternative components.

In the DL, IP packets from the EPC 160 may be provided to the controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The TX processor 316 and the RX processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from the channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318a. Each transmitter 318a may modulate a radio frequency (RF) carrier with a respective spatial stream for transmission.

At the UE 350, each receiver 354b receives a signal through its respective antenna 352. Each receiver 354b recovers information modulated onto an RF carrier and provides the information to the RX processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with the memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by the channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354a. Each transmitter 354a may modulate an RF carrier with a respective spatial stream for transmission.

The UL transmission is processed at the base station 310 in a manner similar to that described in connection with the receiver function at the UE 350. Each receiver 318b receives a signal through its respective antenna 320. Each receiver 318b recovers information modulated onto an RF carrier and provides the information to the RX processor 370.

The controller/processor 375 can be associated with the memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the SFN handling component 198 of FIG. 1.

At least one of the TX processor 316, the RX processor 370, and the controller/processor 375 may be configured to perform aspects in connection with the SFN management component 199 of FIG. 1.

SFN transmission is a transmission mode in which a same transmission signal is simultaneously transmitting from multiple spatially dispersed base stations. In some such examples, a base station may comprise a TRP, a remote radio head (RRH), or any type of radio access network (RAN) node. In some examples, joint processing of transmission signals that are transmit using SFN is not applied. For example, layer splitting or joint precoding techniques may not be applied to the SFN transmission signal. For the receiver (e.g., a UE receiving an SFN transmission signal), SFN transmission provides benefits associated with macro diversity and/or frequency diversity gain in SFN areas (e.g., areas within a communication network employing SFN communications). For SFN communications, when beamforming is employed, the same SFN transmission signal may be simultaneously transmitted over multiple beams from the same or different base stations.

It may be appreciated that within a communication network, single base station communication (e.g., non-SFN communication) and SFN communication may coexist. For example, geographic areas within the communication network may be configured for SFN communications (e.g., SFN areas). In some examples, SFN areas may be suitable for some deployment scenarios, such as with respect to a high-speed train where mobility management between base stations and UEs may be difficult. In some examples, SFN communications may be suitable for some service types, such as broadcast services, broadcast traffic, multicast services, and/or multicast traffic. In some examples, SFN may be used within an area within the communication network (e.g., an SFN area) with respect to a direction, and/or may be beam-specific.

Figure 4:
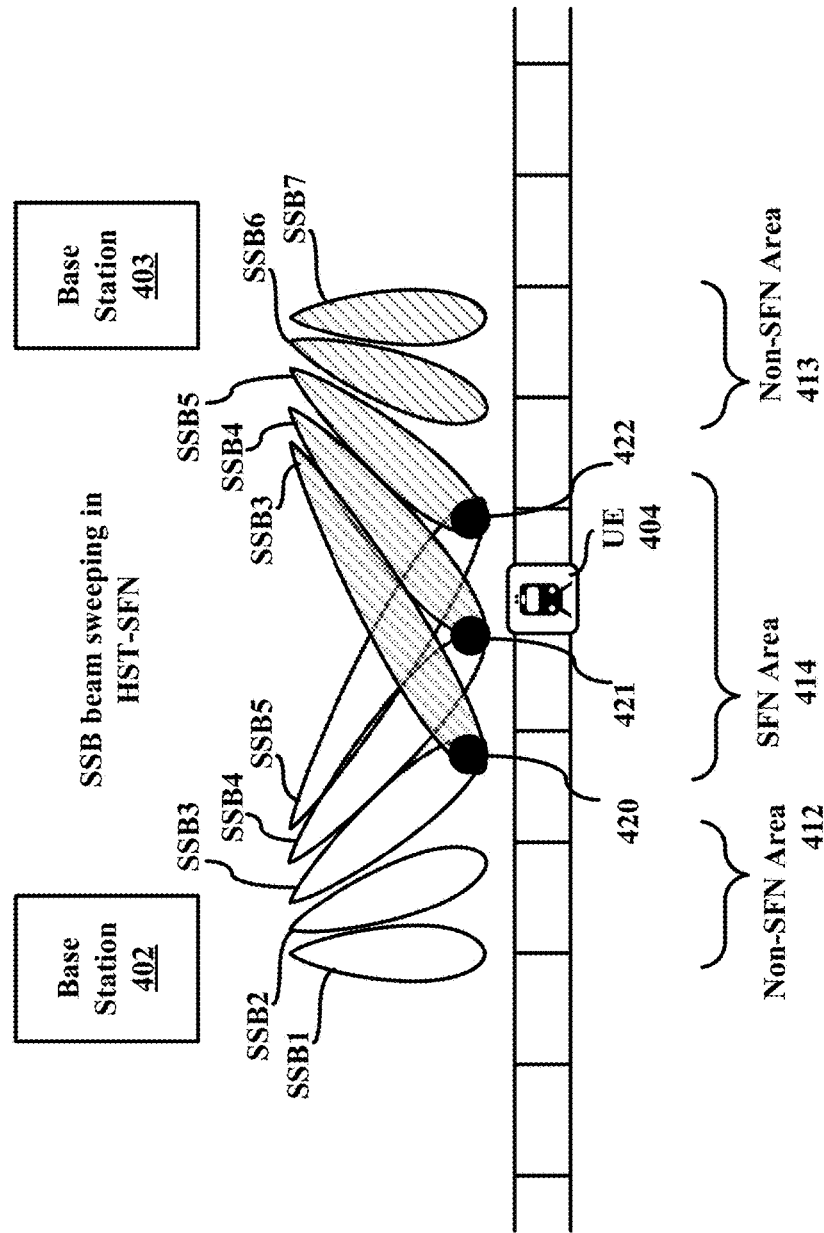
FIG. 4 is a diagram illustrating wireless communication between base stations and a UE capable of SFN communications, in accordance with various aspects of the present disclosure.

FIG. 4 is a diagram 400 illustrating wireless communication between a first base station 402, a second base station 403, and a UE 404 capable of SFN communications, in accordance with various aspects of the present disclosure. Aspects of the first base station 402 and/or the second base station 403 may be implemented by the base stations 102/180 of FIG. 1 and/or the base station 310 of FIG. 3. Aspects of the UE 404 may be implemented by the UE 104 of FIG. 1 and/or the UE 350 of FIG. 3.

In the illustrated example of FIG. 4, a high-speed train, including the UE 404, may travel through a geographic coverage area associated with the first base station 402 and the second base station 403. In some such examples, and due to the high-speed of the train, mobility management between the base stations and the UE 404 may be difficult. Additionally, as the distance from a base station increases (e.g., at a boundary of the base stations), the UE 404 may experience path loss associated with a corresponding signal due to, for example, the distance that the signal travels.

As shown in FIG. 4, the geographic coverage area associated with the base stations includes a first non-SFN area 412, a second non-SFN area 413, and an SFN area 414. For example, each of the base stations may be configured to transmit a plurality of downlink beams including SFN beams and non-SFN beams. In the illustrated example of FIG. 4, transmission of synchronization signals (e.g., SSBs) with respective to non-SFN areas and SFN areas are described. For example, a first SSB occasion ("SSB1") and a second SSB occasion ("SSB2") are located in the first non-SFN area 412, and sixth SSB occasion ("SSB6") and a seventh SSB occasion ("SSB7") are located in the second non-SFN area 413. The first base station 402 may be configured to transmit a first beam associated with the first SSB occasion and a second beam associated with the second SSB occasion. The second base station 403 may be configured to transmit a fourth beam associated with the sixth SSB occasion and a fifth beam associated with the seventh SSB occasion. As used herein, transmissions associated with non-SFN areas may be referred to as "non-SFN beams" or "non-SFN SSBs."

To facilitate SFN communications, multiple base stations may transmit a beam simultaneously. For example, for some SSB occasions (e.g., SSB occasions associated with coverage area boundaries, such as a third SSB occasion ("SSB3"), a fourth SSB occasion ("SSB4"), and a fifth SSB occasion ("SSB5") located in the SFN area 414), multiple base stations may transmit the same beam (e.g., using a same SSB identifier (ID)). For example, the third SSB occasion may be mapped to a third beam of the first base station 402 and to a first beam of the second base station 403, the fourth SSB occasion may be mapped to a fourth beam of the first base station 402 and a second beam of the second base station 403, and the fifth SSB occasion may be mapped to a fifth beam of the first base station 402 and a third beam of the second base station 403. As used herein, transmissions associated with SFN areas may be referred to as "SFN beams" or "SFN SSBs."

In the illustrated example, the beams associated with SFN SSBs may be configured to be focused and/or overlap on a single point or region to maximize the processing gain. For example, the third beam of the first base station 402 and the first beam of the second base station 403 may be configured to focus on a first region 420 of the railway, the fourth beam of the first base station 402 and the second beam of the second base station 403 may be configured to focus on a second region 421 of the railway, and the fifth beam of the first base station 402 and the third beam of the second base station 403 may be configured to focus on a third region 422 of the railway.

In operation, and as the UE 404 travels across the railway, when the UE 404 is located close to the first base station 402, the UE 404 may be capable of receiving beams associated with the first SSB occasion and/or the second SSB occasion without the assistance of additional gain provided by SFN transmissions. As a result, SFN may not be needed for the first SSB occasion and the second SSB occasion and, thus, the respective beams may be non-SFN beams. Similarly, when the UE 404 is located close to the second base station 403, the UE 404 may be capable of receiving beams associated with the sixth SSB occasion and/or the seventh SSB occasion without the assistance of additional gain provided by SFN transmissions. As a result, SFN may not be needed for the sixth SSB occasion and the seventh SSB occasion and, thus, the respective beams may be non-SFN beams. In contrast, when the UE 404 is located relatively far from the first base station 402 and the second base station 403 (e.g., at a boundary), it may be beneficial to use SFN transmissions to provide the SFN gain so that the respective beams may be received by the UE 404.

The UE 404 may include an SFN handling component, similar to the SFN handling component 198 described in connection with FIG. 1. The first base station 402 and/or the second base station 403 may include an SFN management component, similar to the SFN management component 199 described in connection with FIG. 1.

As described in connection with FIG. 4, some SSB occasions may be mapped to beams configured (or designed) for SFN transmissions. For example, the first beam of the second base station 403 may be configured to facilitate SFN communications. Thus, when the second base station 403 transmits the first beam associated with the third SSB occasion, the second base station 403 may apply one or more transmit parameters to the first beam to facilitate SFN communications. However, in some examples, the respective base stations may receive an uplink signal from the UE 404 based on the SFN beam. For example, the UE 404 may implicitly determine an uplink beam based on a downlink SFN beam. Moreover, a base station receiving an uplink signal based on an SFN beam may be configured to apply different options for processing the uplink signal.

Figure 5A:
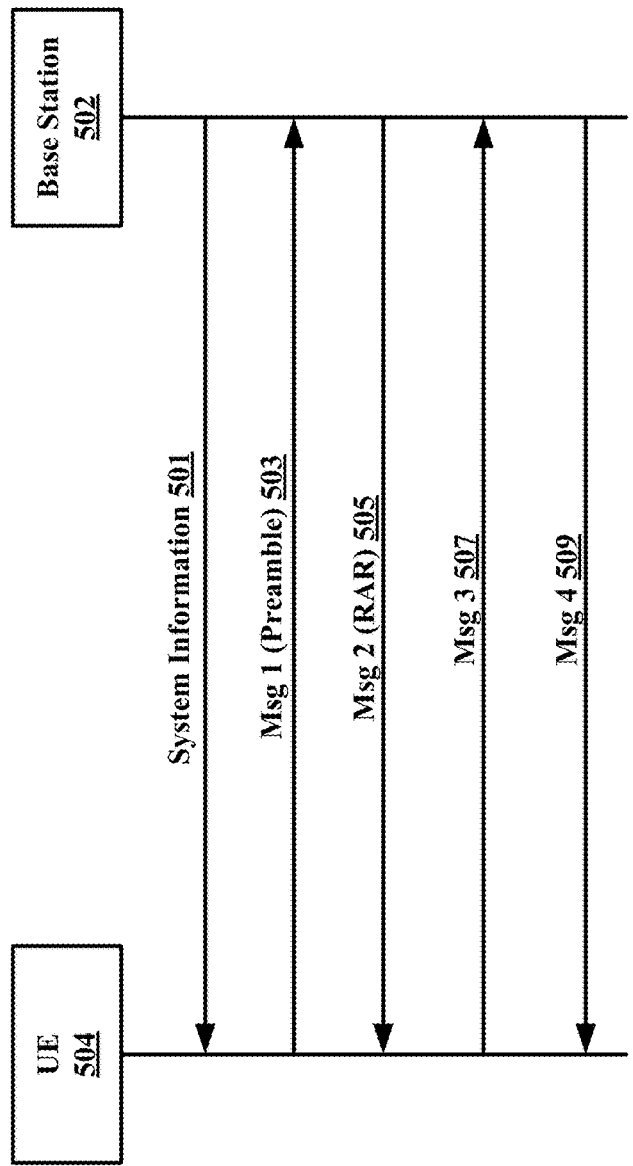
FIG. 5A illustrates example aspects of a random access procedure between a UE and a base station, in accordance with various aspects of the present disclosure.

For example, the UE 404 may use a random access procedure (RACH) in order to communicate with a base station. For example, the UE 404 may use the random access procedure to request an RRC connection, to re-establish an RRC connection, resume and RRC connection, etc. FIG. 5A illustrates example aspects of a random access procedure 500 between a base station 502 and a UE 504, as presented herein. The UE 504 may initiate the random access message exchange by sending, to the base station 502, a first random access message 503 (e.g., Msg 1) including a preamble. Prior to sending the first random access message 503, the UE 504 may obtain random access parameters, for example, including preamble format parameters, time and frequency resources, parameters for determining root sequences and/or cyclic shifts for a random access preamble, etc., e.g., in system information 501 from the base station 502. The UE 504 may randomly select a random access preamble sequence, for example, from a set of preamble sequences. If the UE 504 randomly selects the preamble sequence, the base station 502 may receive another preamble from a different UE at the same time. In some examples, a preamble sequence may be assigned to the UE 504.

The base station 502 responds to the first random access message 503 by sending a second random access message 505 (e.g. Msg 2), which is identified by a Random Access RNTI (RA-RNTI), using PDSCH and including a random access response (RAR). The RAR may include, for example, an identifier of the random access preamble sent by the UE 504, a time advance (TA), an uplink grant for the UE 504 to transmit data, a temporary cell radio network temporary identifier (TC-RNTI) or other identifier, and/or a back-off indicator. Upon receiving the second random access message 505, the UE 504 may transmit a third random access message 507 (e.g., Msg 3) to the base station 502, for example, using PUSCH, that may include a RRC connection request, an RRC connection re-establishment request, or an RRC connection resume request, depending on the trigger for the initiating the random access procedure. The base station 502 may then complete the random access procedure of FIG. 5 by sending a fourth random access message 509 (e.g., Msg 4) to the UE 504, for example, using PDCCH for scheduling and PDSCH for the message. The fourth random access message 509 may include timing advancement information, contention resolution information, cell radio network temporary identifier (C-RNTI), and/or RRC connection setup information. The UE 504 may monitor for PDCCH, for example, with the C-RNTI. If the PDCCH is successfully decoded, the UE 504 may also decode PDSCH. The UE 504 may send HARQ feedback for any data carried in the fourth random access message. If two UEs send a same preamble (e.g., via respective first random access messages), both UEs may receive the RAR leading both UEs to send a third random access message 507. The base station 502 may resolve such a collision by being able to decode the third random access message from only one of the UEs and responding with a fourth random access message to that UE. The other UE, which did not receive the fourth random access message 509, may determine that random access did not succeed and may re-attempt random access. Thus, the fourth random access message may be referred to as a contention resolution message. The fourth random access message 509 may complete the random access procedure. Thus, the UE 504 may then transmit uplink communication and/or receive downlink communication with the base station 502 based on the fourth random access message 509.

Figure 5B:
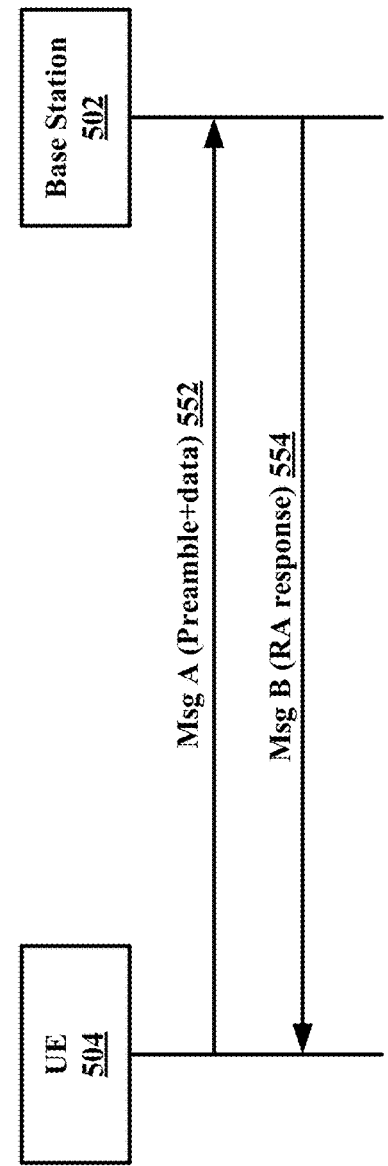
FIG. 5B illustrates example aspects of a two-step random access procedure between a UE and a base station, in accordance with various aspects of the present disclosure.

In order to reduce latency or control signaling overhead, a single round trip cycle between the UE and the base station may be achieved in a 2-step RACH process 550, such as shown in FIG. 5B. Aspects of Msg 1 (e.g., the first random access message 503 of FIG. 5A) and Msg 3 (e.g., the third random access message 507 of FIG. 5A) may be combined in a single message, for example, which may be referred to as Msg A 552. The Msg A 552 may include a random access preamble, and may also include a PUSCH transmission, such as data. The preambles of the Msg A 552 may be separate from the four step preambles, yet may be transmitted in the same random access occasions (ROs) as the preambles of the four step RACH procedure or may be transmitted in separate ROs. The PUSCH transmissions may be transmitted in PUSCH occasions (POs) that may span multiple symbols and PRBs. After the UE 504 transmits the Msg A 452, the UE 504 may wait for a response from the base station 502. Additionally, aspects of the Msg 2 (e.g., the second random access message 505 of FIG. 5A) and Msg 4 (e.g., the fourth random access message 509 of FIG. 5A) may be combined into a single message, which may be referred to as Msg B 554. Two step RACH may be triggered for reasons similar to a four-step RACH procedure. If the UE 504 does not receive a response, the UE 504 may retransmit the Msg A 552 or may fall back to a four-step RACH procedure starting with the first random access message (Msg1). If the base station 502 detects the Msg A 552, but fails to successfully decode the PUSCH of the Msg A 552, the base station 502 may respond with an allocation of resources for an uplink retransmission of the PUSCH. The UE 504 may fallback to the four step RACH with a transmission of the third random access message (Msg3) based on the response from the base station 502 and may retransmit the PUSCH from the Msg A 552. If the base station 502 successfully decodes the Msg A 552 and the corresponding PUSCH, the base station 502 may reply with an indication of the successful receipt, for example, as the Msg B 554 that completes the two-step RACH procedure. The Msg B 554 may include the random access response and a contention-resolution message. The contention resolution message may be sent after the base station successfully decodes the PUSCH transmission.

In some examples, the UE 504 may initiate a random access message exchange with the base station 502 by sending a preamble to the base station 502. The UE 504 may select a RACH occasion for initiating the random access message exchange based on an SSB measurement. The UE 504 may then transmit a physical random access channel (PRACH) preamble based on the RACH occasion.

However, in some examples, the SSB associated with the SSB measurement may be an SFN SSB. In some such examples, the UE 504 may transmit the PRACH preamble to multiple base stations. For example, and referring again to the example of FIG. 4, the UE 404 may select a RACH occasion based on an SSB measurement of the third SSB occasion. In some such examples, the UE 404 may implicitly determine an uplink beam based on a downlink SFN beam corresponding to the third SSB occasion. For example, the UE 404 may transmit the PRACH preamble to the first base station 402 using a first uplink beam corresponding to the third beam of the first base station 402. The UE 404 may also transmit the PRACH preamble to the second base station 403 using a second uplink beam corresponding to the first beam of the second base station 403.

When a base station receives an uplink signal that is transmitted by a UE based on a downlink SFN SSB, the base station may be configured to apply different techniques for processing the uplink signal. For example, the base station (e.g., an SFN receiver) may be configured to apply a selective processing mode (e.g., where a subset of SFN-based uplink signals is selected for processing) (e.g., as described in connection with FIG. 6), may be configured to apply a combined processing mode (e.g., where two or more SFN-based uplink signals are combined and then processed) (e.g., as described in connection with FIG. 7), and/or may be configured to apply an independent processing mode (e.g., where each SFN-based uplink signal is separately processed) (e.g., as described in connection with FIG. 8).

Figure 6:
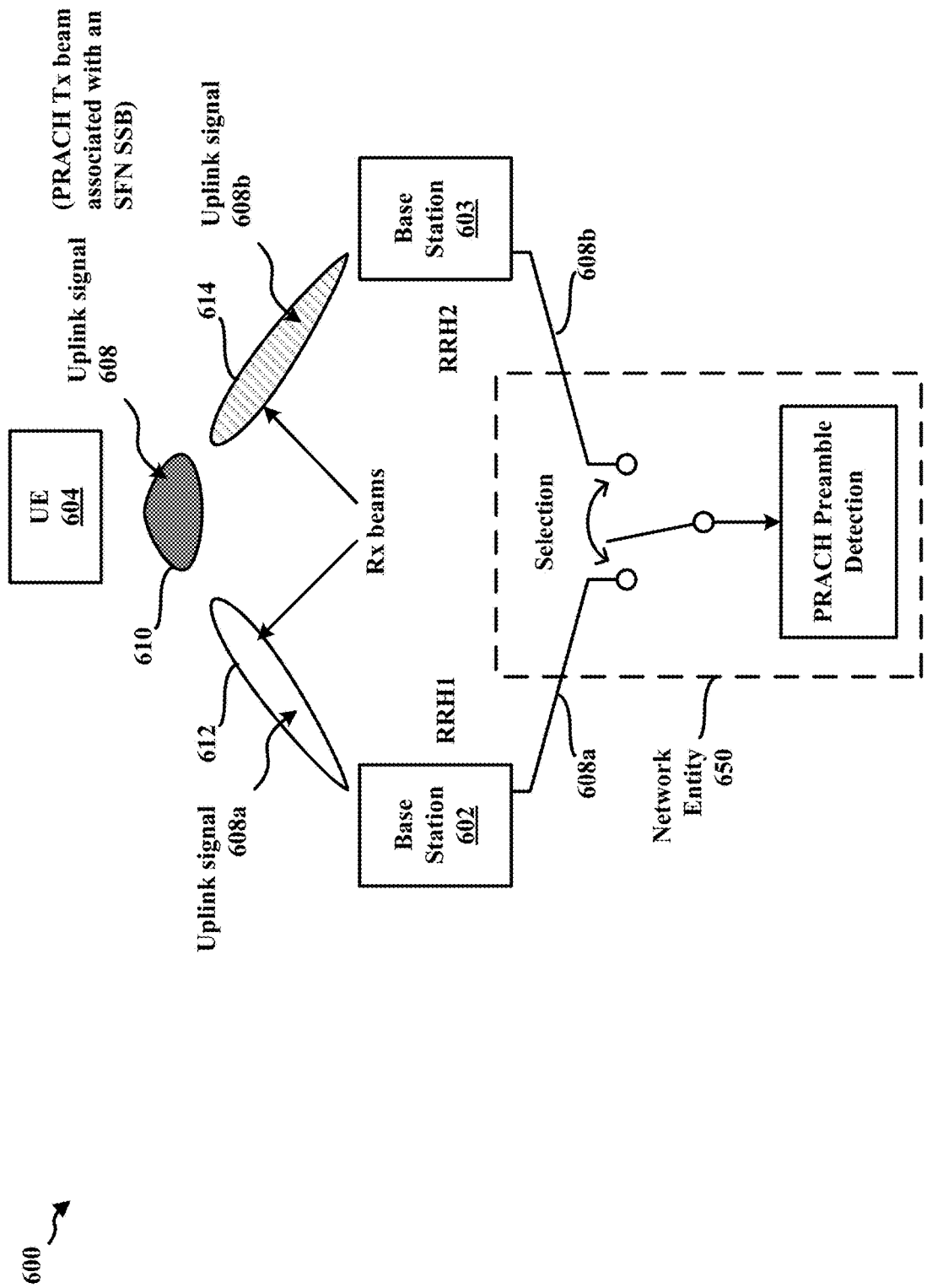
FIG. 6 is a diagram illustrating a network entity employing an SFN receiver selective processing mode to process an SFN-based uplink signal, in accordance with various aspects of the present disclosure.

FIG. 6 is a diagram 600 illustrating a network entity 650 employing an SFN receiver selective processing mode to process an SFN-based uplink signal, in accordance with various aspects of the present disclosure. In the illustrated example of FIG. 6, a UE 604 may transmit an uplink signal 608 (e.g., a PRACH preamble). The UE 604 may transmit the uplink signal 608 based on an SFN SSB. In some examples, the UE 604 may implicitly determine an uplink beam 610 to use to transmit the uplink signal 608. The uplink beam 610 may be based on the respective downlink SFN beams associated with the SFN SSB received from a first base station 602 and a second base station 603. In some examples, the uplink beam 610 may comprise a wide beam to transmit the uplink signal 608. Aspects of the UE 604 may be implemented by the UE 104 of FIG. 1, the UE 350 of FIG. 3, the UE 404 of FIG. 4, and/or the UE 504 of FIG. 5A and/or FIG. 5B. Aspects of the first base station 602 and/or the second base station 603 may be implemented by the base stations 102/180 of FIG. 1, the base station 310 of FIG. 3, the first base station 402 and/or the second base station 403 of FIG. 4, and/or the base station 502 of FIG. 5A and/or FIG. 5B.

As shown in FIG. 6, the first base station 602 may receive an uplink signal 608a from the UE 604 using a first receive beam 612, and the second base station 603 may receive an uplink signal 608b from the UE 604 using a second receive beam 614. In the illustrated example, the network entity 650 may employ a selective processing mode for processing the uplink signals received by the base stations. In some examples, the selective processing mode may be suitable for an SFN deployment in which the base stations are implemented using remote radio heads (RRHs). An RRH (sometimes referred to as a remote radio unit (RRU)) may be a radio transceiver that connects to centralized baseband processor via an electrical interface and/or a wireless interface. For example, the first base station 602 and/or the second base station 603 may be in electrical and/or wireless communication with the network entity 650, which may implement a centralized baseband processor. In some examples, the uplink signals from the base stations to the network entity 650 may include an analog signal (e.g., the uplink signal 608a and/or the uplink signal 608b) or a digital signal (e.g., quantized samples of the uplink signal 608a and/or the uplink signal 608b).

When the network entity 650 employs the selective processing mode of FIG. 6, the network entity 650 selects the uplink signal received by one (or a subset) of the RRHs. The network entity 650 may select the one (or the subset) of the RRHs based on one or more criterion. For example, the network entity 650 may be configured to select one (or a subset) of the RRHs (e.g., selecting the uplink signal received by the first base station 602 whenever an SFN-based uplink signal is received). In some examples, the network entity 650 may select the uplink signal received by the RRH (or a subset) of the RRHs with the largest receiver power associated with the uplink signal. In some examples, the network entity 650 may select the uplink signal received by the RRH (or a subset) of the RRHs associated with the largest SINR associated with the uplink signal.

After the network entity 650 selects an uplink signal received by an RRH (or uplink signals received by a subset of RRHs), the network entity 650 processes the selected uplink signal. For example, with respect to an uplink signal comprising a PRACH preamble, the network entity 650 may process the selected uplink signal by performing PRACH preamble detection.

Figure 7:
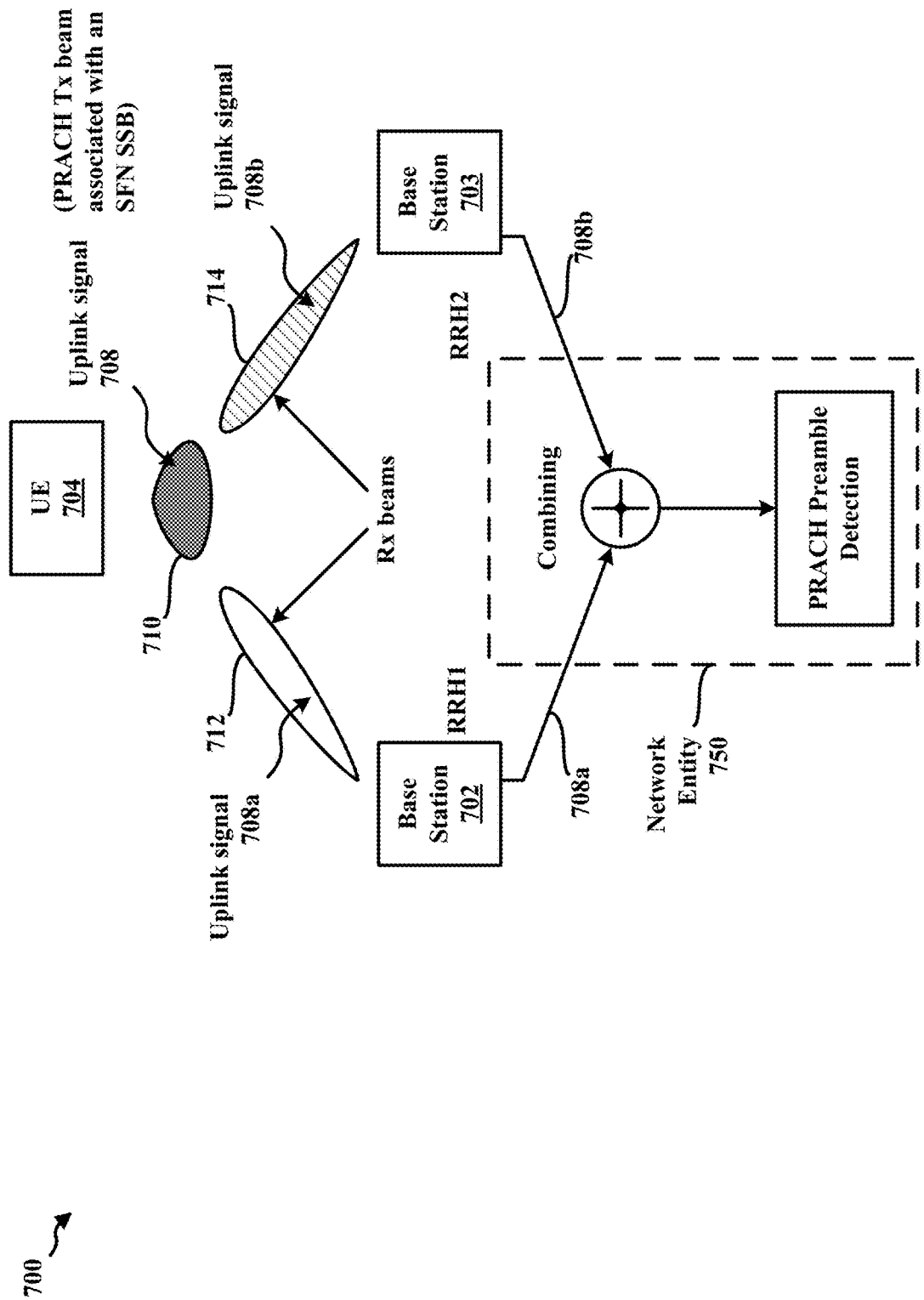
FIG. 7 is a diagram illustrating a network entity employing an SFN receiver combined processing mode to process an SFN-based uplink signal, in accordance with various aspects of the present disclosure.

FIG. 7 is a diagram 700 illustrating a network entity 750 employing an SFN receiver combined processing mode to process an SFN-based uplink signal, in accordance with various aspects of the present disclosure. Similar to the example of FIG. 6, a UE 704 may transmit an uplink signal 708 (e.g., a PRACH preamble). The UE 704 may transmit the uplink signal 708 based on an SFN SSB. In some examples, the UE 704 may implicitly determine an uplink beam 710 to use to transmit the uplink signal 708. The uplink beam 710 may be based on the respective downlink SFN beams associated with the SFN SSB received from a first base station 702 and a second base station 703. In some examples, the uplink beam 710 may comprise a wide beam to transmit the uplink signal 708. Aspects of the UE 704 may be implemented by the UE 104 of FIG. 1, the UE 350 of FIG. 3, the UE 404 of FIG. 4, the UE 504 of FIG. 5A and/or FIG. 5B, and/or the UE 604 of FIG. 6. Aspects of the first base station 702 and/or the second base station 703 may be implemented by the base stations 102/180 of FIG. 1, the base station 310 of FIG. 3, the first base station 402 and/or the second base station 403 of FIG. 4, the base station 502 of FIG. 5A and/or FIG. 5B, and/or the first base station 602 and/or the second base station 603 of FIG. 6.

As shown in FIG. 7, the first base station 702 may receive an uplink signal 708a from the UE 704 using a first receive beam 712, and the second base station 703 may receive an uplink signal 708b from the UE 704 using a second receive beam 714. In the illustrated example, the network entity 750 may employ a combined processing mode for processing the uplink signals received by the base stations. In some examples, the combined processing mode may be suitable for an SFN deployment in which the base stations are implemented using RRHs. In the illustrated example, the first base station 702 and/or the second base station 703 may be in electrical and/or wireless communication with the network entity 750, which may implement a centralized baseband processor. In some examples, the uplink signals from the base stations to the network entity 750 may be an analog signal (e.g., the uplink signal 708a and/or the uplink signal 708b) or a digital signal (e.g., quantized samples of the uplink signal 708a and/or the uplink signal 708b).

When the network entity 750 employs the combined processing mode of FIG. 7, the network entity 750 combines the uplink signals received from two or more of the RRHs. For example, the network entity 750 may combine the uplink signal 708a received by the first base station 702 and the uplink signal 708b received by the second base station 703. The network entity 750 may combine the respective uplink signals based on a combining scheme. For example, the network entity 750 may use equal gain combining, maximal-ratio combining (MRC), etc. to combine the respective uplink signals.

After the network entity 750 combines the two or more uplink signals received by the RRHs, the network entity 750 processes the combined uplink signal. For example, with respect to an uplink signal comprising a PRACH preamble, the network entity 750 may process the combined uplink signal by performing PRACH preamble detection.

Figure 8:
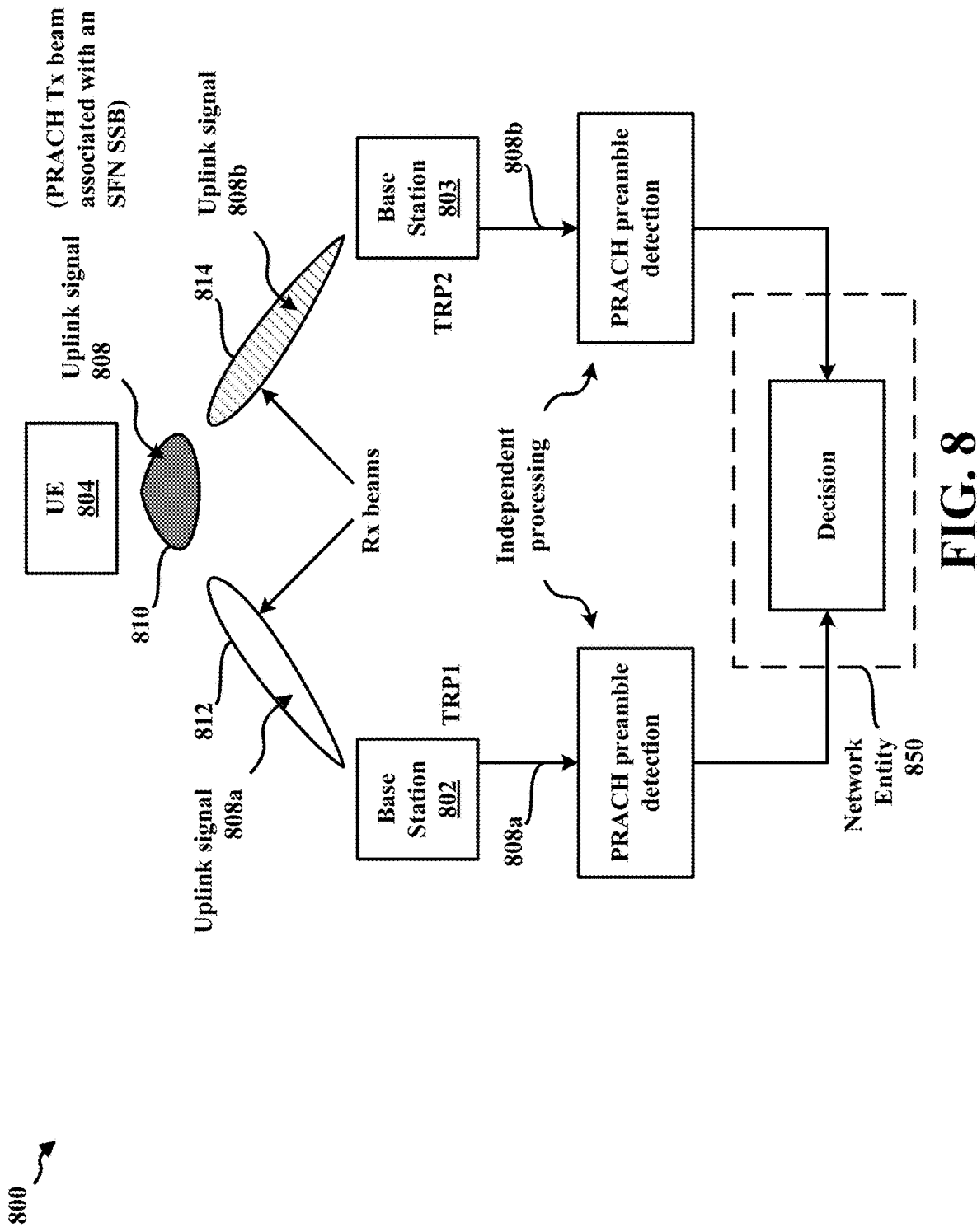
FIG. 8 is a diagram illustrating a network entity employing an SFN receiver independent processing mode to process an SFN-based uplink signal, in accordance with various aspects of the present disclosure.

FIG. 8 is a diagram 800 illustrating a network entity 850 employing an SFN receiver independent processing mode to process an SFN-based uplink signal, in accordance with various aspects of the present disclosure. Similar to the examples of FIG. 6 and FIG. 7, a UE 804 may transmit an uplink signal 808 (e.g., a PRACH preamble). The UE 804 may transmit the uplink signal 808 based on an SFN SSB. In some examples, the UE 804 may implicitly determine an uplink beam 810 to use to transmit the uplink signal 808. The uplink beam 810 may be based on the respective downlink SFN beams associated with the SFN SSB received from a first base station 802 and a second base station 803. In some examples, the uplink beam 810 may comprise a wide beam to transmit the uplink signal 808. Aspects of the UE 804 may be implemented by the UE 104 of FIG. 1, the UE 350 of FIG. 3, the UE 404 of FIG. 4, the UE 504 of FIG. 5A and/or FIG. 5B, the UE 604 of FIG. 6, and/or the UE 704 of FIG. 7. Aspects of the first base station 802 and/or the second base station 803 may be implemented by the base stations 102/180 of FIG. 1, the base station 310 of FIG. 3, the first base station 402 and/or the second base station 403 of FIG. 4, the base station 502 of FIG. 5A and/or FIG. 5B, the first base station 602 and/or the second base station 603 of FIG. 6, and/or the first base station 702 and/or the second base station 703 of FIG. 7.

As shown in FIG. 8, the first base station 802 may receive an uplink signal 808a from the UE 804 using a first receive beam 812, and the second base station 803 may receive an uplink signal 808b from the UE 804 using a second receive beam 814. In the illustrated example, the network entity 850 may employ an independent processing mode for processing the uplink signals received by the base stations. In some examples, the combined processing mode may be suitable for an SFN deployment in which the base stations are implemented using TRPs. In contrast to an RRH, each TRP may comprise a dedicated baseband processor. Accordingly, each TRP may independently process a respective uplink signal. For example, with respect to an uplink signal comprising a PRACH preamble, the first base station 802 may process the uplink signal 808a by performing PRACH preamble detection using the uplink signal 808a, and the second base station 803 may process the uplink signal 808b by performing PRACH preamble detection using the uplink signal 808b.

After the base stations process the respective uplink signals, a determination may be made regarding whether the processing of the uplink signal is successful. For example, if at least one of the base stations detected a PRACH preamble, the network entity 850 may determine that the processing of the uplink signal is successful.

Although FIGS. 6, 7, and 8 provide three different processing modes for processing an SFN-based uplink signal, it may be appreciated that other techniques for processing an SFN-based uplink signal may be implemented. Additionally, while the examples of FIGS. 6, 7, and 8 provide examples related to the processing of a PRACH preamble, it may be appreciated that other examples may include additional or alternative receiver processing techniques. While the examples of FIGS. 6 and 7 include base stations that may be implemented by RRHs and the example of FIG. 8 includes base stations that may be implemented by TRPs, other examples may include additional or alternative combinations. For example, one or both of the base stations of FIG. 6 may be implemented by a TRP, one or both of the base stations of FIG. 7 may be implemented by a TRP, and/or one or both of the base stations of FIG. 8 may be implemented by an RRH. In examples in which both of the base stations of FIG. 8 are implemented using RRHs, the base stations may provide their respective received uplink signals to one or more network entities capable of processing the respective received uplink signals. In some such examples, if at least one of the network entities detects a PRACH preamble, the processing of the uplink signal may be determined to be successful.

In some examples, different sets of SFN-capable base stations may support different receiver processing modes. Additionally, for a given set of SFN-capable base stations, the receiver processing mode may change (e.g., based on a received uplink signal, based on a configuration, etc.). For example, the receiver processing mode applied by a network entity (e.g., the selective processing mode of FIG. 6, the combined processing mode of FIG. 7, and/or the independent processing mode of FIG. 8 may change for a set of base stations based on an instantaneous receiver power associated with an uplink signal and/or based on a receiver power delta associated with the uplink signal across the set of base stations. In some examples, the receiver processing mode applied by a network entity may change based on an uplink channel (e.g., PRACH, PUCCH, PUSCH, or SRS) associated with the uplink signal. In some examples, the receiver processing mode applied by a network entity may change based on an average receiver power associated with the uplink signal, cell loading associated with the uplink signal, and/or interference conditions associated with the uplink signal.

Accordingly, examples disclosed herein provide techniques for a base station to indicate one or more SFN receiver processing modes supported by the base station. Additionally, the base station may indicate one or more transmit beams that are SFN beams among a plurality of beams for downlink transmission. In some examples, the indication may map an SFN receiver processing mode to an SFN beam. In some examples, the UE may adapt one or more transmit parameters associated with transmitting the SFN-based uplink signal based on at least one of the indicated SFN receiver processing modes and/or the SFN receiver processing mode mapping to an SFN beam received by the UE.

Figure 9:
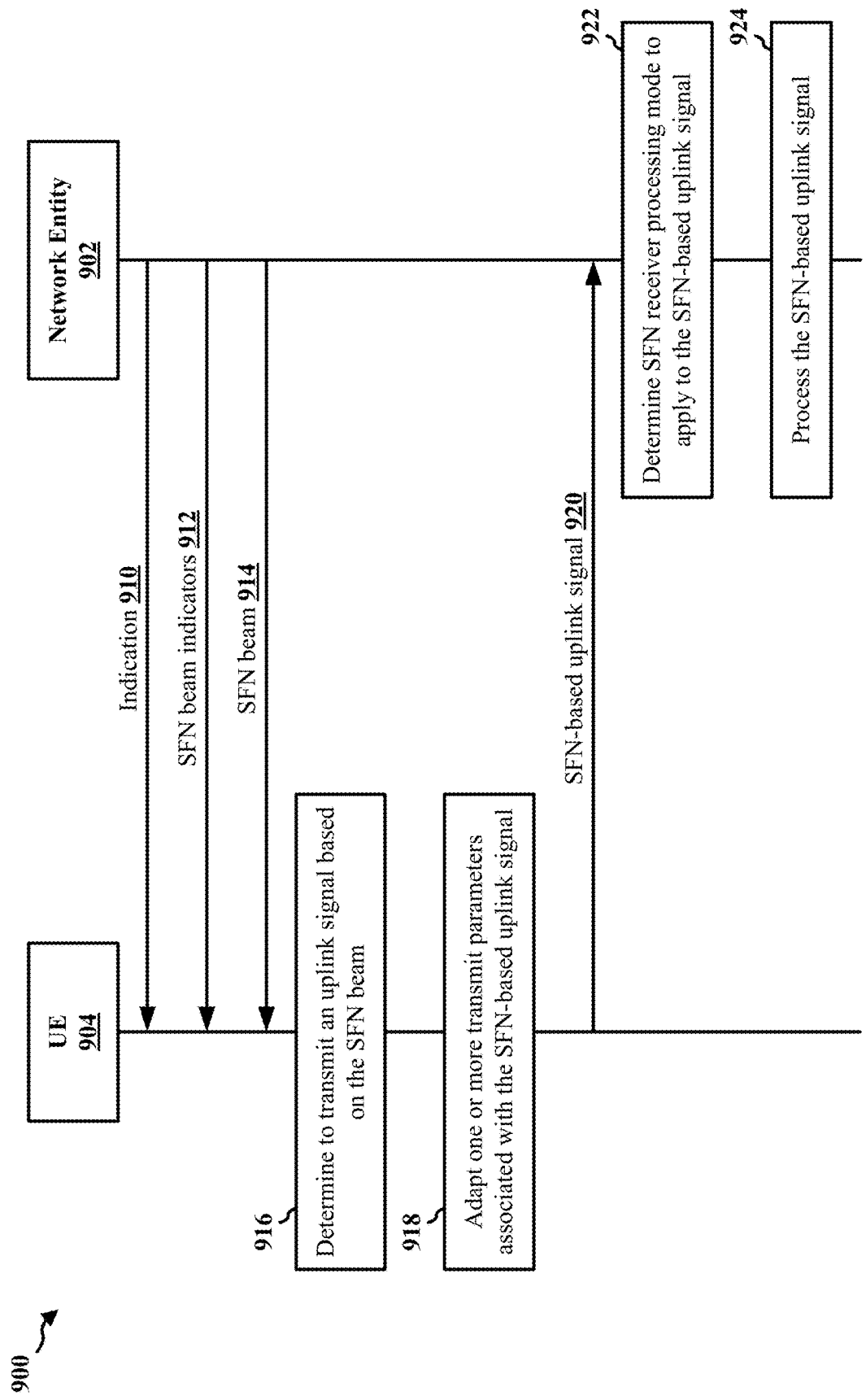
FIG. 9 is an example communication flow between a network entity and a UE, in accordance with the teachings disclosed herein.

FIG. 9 illustrates an example communication flow 900 between a network entity 902 and a UE 904, as presented herein. In the illustrated example, the communication flow 900 facilitates indicating an SFN receiver processing mode for processing an SFN-based uplink signal. Aspects of the network entity 902 may be implemented by the base stations 102/180 of FIG. 1, the base station 310 of FIG. 3, the first base station 402 and/or the second base station 403 of FIG. 4, the base station 502 of FIG. 5A and/or FIG. 5B, the first base station 602 and/or the second base station 603 of FIG. 6, the first base station 702 and/or the second base station 703 of FIG. 7, and/or the first base station 802 and/or the second base station 803 of FIG. 8. Aspects of the UE 904 may be implemented by the UE 104 of FIG. 1, the UE 350 of FIG. 3, the UE 404 of FIG. 4, the UE 504 of FIG. 5A and/or FIG. 5B, the UE 604 of FIG. 6, the UE 704 of FIG. 7, and/or the UE 804 of FIG. 8. Although not shown in the illustrated example of FIG. 9, in additional or alternative examples, the network entity 902 may be in communication with one or more other network entities (e.g., a base station, a TRP, an RRH, and/or another RAN node) or UEs, and/or the UE 904 may be in communication with one or more other network entities or UEs.

The network entity 902 transmits an indication 910 that is received by the UE 904. The network entity 902 may transmit the indication 910 using at least one of a system information block (SIB), RRC signaling, a medium access control—control element (MAC-CE), and layer 1 (L1) signaling.

In some examples, the indication 910 may indicate a set of SFN receiver processing modes that may be supported by the network entity 902. For example, the indication 910 may indicate that the network entity 902 supports one or more of a selective processing mode (e.g., as shown in FIG. 6), a combined processing mode (e.g., as shown in FIG. 7), and an independent processing mode (e.g., as shown in FIG. 8). In some examples, the indication 910 may indicate one or more SFN receiver processing modes supported by a set of two or more base stations configured for SFN communication, such as the example first base station 402 and the second base station 403 of FIG. 4. The set of two or more base stations may comprise at least one of a first TRP and a second TRP (as described in connection with FIG. 8), may comprise a first RRH and a second RRH (as described in connection with FIGS. 6 and 7), or may comprise at least one TRP and at least one RRH.

In some examples, the network entity 902 may transmit SFN beam indicators 912 that are received by the UE 904. In some examples, the SFN beam indicators 912 may identify transmit beams that are SFN beams among a plurality of beams for downlink transmission. For example, with respect to FIG. 4, the first base station 402 may transmit the SFN beam indicators indicating that the third beam, fourth beam, and fifth beams of the first base station 402 are SFN beams. In some examples, the SFN beam indicators 912 and/or the indication 910 may map a respective SFN receiver processing mode of the indicated SFN receiver processing modes to a corresponding SFN beam. For example, the SFN beam indicators 912 and/or the indication 910 may indicate that the third beam of the first base station 402 maps to the selective processing mode.

In the illustrated example, the network entity 902 transmits an SFN beam 914 that is received by the UE 904. The SFN beam 914 may be SFN transmitted by a set of two or more base stations that are configured for SFN communication. For example, with respect to FIG. 4, the first base station 402 may transmit the third beam corresponding to its third SSB occasion and the second base station 403 may transmit the first beam corresponding to its third SSB occasion.

At 916, the UE 904 may determine to transmit an uplink signal based on the SFN beam 914. For example, the UE 904 may select a RACH occasion based on an SSB measurement associated with the SFN beam 914. The UE 904 may determine to transmit at least one of a PRACH, a PUCCH, a PUSCH, and an SRS.

At 918, the UE 904 may adapt one or more transmit parameters associated with transmitting an SFN-based uplink signal 920. The one or more transmit parameters may comprise an uplink transmit power, beam selection, panel selection and link adaptation. In some examples, the UE 904 may adapt one or more transmit parameters based on at least one of the SFN receiver processing modes indicated via the indication 910. In some examples, the UE 904 may map the SFN beam 914 to one of the indicated SFN receiver processing modes (e.g., via the SFN beam indicators 912) and adapt one or more transmit parameters based on the mapped SFN receiver processing mode.

In the illustrated example, the UE 904 transmits the SFN-based uplink signal 920 that is received by the network entity 902. The UE 904 also transmits the SFN-based uplink signal 920 to the one or more additional base stations associated with the SFN beam 914. For example, with respect to FIG. 6, the UE 604 may transmit the SFN-based uplink signal to the first base station 602 (e.g., as the uplink signal 608a) and the second base station 603 (e.g., as the uplink signal 608b). With respect to FIG. 7, the UE 704 may transmit the SFN-based uplink signal to the first base station 702 (e.g., as the uplink signal 708a) and the second base station 703 (e.g., as the uplink signal 708b). With respect to FIG. 8, the UE 804 may transmit the SFN-based uplink signal to the first base station 802 (e.g., as the uplink signal 808a) and the second base station 803 (e.g., as the uplink signal 808b).

At 922, the network entity 902 determines an SFN receiver processing mode to apply to the SFN-based uplink signal 920. In some examples, the network entity 902 may determine which SFN receiver processing mode to apply based on an instantaneous receiver power associated with the SFN-based uplink signal 920 and/or based on a receiver power delta associated with the SFN-based uplink signal 920 across the set of base stations. In some examples, the network entity 902 may determine which SFN receiver processing mode to apply based on an uplink channel (e.g., PRACH, PUCCH, PUSCH, or SRS) associated with the SFN-based uplink signal 920. In some examples, the network entity 902 may determine which SFN receiver processing mode to apply based on an average receiver power associated with the uplink signal, cell loading associated with the uplink signal, and/or interference conditions associated with the uplink signal.

At 924, the network entity 902 processes the SFN-based uplink signal 920 based on the determined SFN receiver processing mode. For example, the network entity 902 may determine (e.g., at 922) to apply the selective processing mode (e.g., as described in connection with the example of FIG. 6). In some such examples, the network entity 902 may select a subset of received SFN-based uplink signals for processing from a subset of RRHs that received the SFN-based uplink signal 920. For example, referring to the example of FIG. 6, the network entity 650 may select to process the uplink signal 608a received by the first base station 602 and/or may select to process the uplink signal 608b received by the second base station 603. In some examples, the subset of RRHs may be selected based on at least one of a configuration or a criterion associated with the received SFN-based uplink signal. In some examples, the criterion may comprise the largest receiver power associated with the uplink signal, the largest SINR associated with the uplink signal, etc. In some examples, processing the selected subset of uplink signals may comprise performing PRACH preamble detection using the selected subset of uplink signals.

In some examples, the network entity 902 may determine (e.g., at 922) to apply the combined processing mode (e.g., as described in connection with the example of FIG. 7). In some such examples, the network entity 902 may combine received SFN-based uplink signals for processing from two or more base stations. For example, referring to the example of FIG. 7, the network entity 750 may combine the uplink signal 708a received by the first base station 702 and the uplink signal 708b received by the second base station 703. In some examples, the combining of the uplink signals may be based on a combining scheme, such as using equal gain combining, using maximal-ratio combining (MRC), etc. to combine the respective uplink signals. In some examples, processing the combined uplink signal may comprise performing PRACH preamble detection using the combined uplink signal.

In some examples, the network entity 902 may determine (e.g., at 922) to apply the independent processing mode (e.g., as described in connection with the example of FIG. 8). In some such examples, the received SFN-based uplink signal may be separately processed by each base station of the set of base stations. For example, referring to the example of FIG. 8, the first base station 802 may process the uplink signal 808a and the second base station 803 may separately process the uplink signal 808b. In some examples, processing the SFN-based uplink signal 920 may further include determining whether at least one of the base stations detected a PRACH preamble when processing the respective uplink signal.

When performing a RACH procedure (as described in connection with the examples of FIG. 5A and FIG. 5B), the UE may be configured with a transmit power control. For example, an SSB transmit power (e.g., an energy per resource element (EPRE) of an SSS and PBCH) may be determined by a higher layer parameter (e.g., a synchronization signal PBCH block power parameter "ss-PBCH-BlockPower"). In some examples, the SSB transmit power may be configured using system information (e.g., SIB1) or may be RRC configured.

In some examples, the UE may operate with the assumption that the EPRE (e.g., as determined by the synchronization signal PBCH block power parameter) is constant over all SSBs of different transmit beams. For example, even when an SSB burst comprises different transmit beams, the UE may assume that the transmit power for each transmit beam is the same. However, depending on transmit beam and/or receive beam characteristics, the receive power of each SSB may be different. For example, the receive power of an SSB may be different based on a beam direction, a beam shape, a beamforming gain, etc.

In some examples, a PRACH transmit power may be determined by applying Equation 1 (below).

$$P_{RACH,b,f,c}(i)=\min\{P_{CMAX,f,c}(i), P_{RACH,target,f,c}+PL_{b,f,c}\} \quad \text{Equation 1:}$$

In Equation 1, the variable "b" refers to a bandwidth part (BWP) index, the variable "f" refers to a carrier index, and the variable "c" refers to a cell index. The variable "$P_{RACH,target,f,c}$" refers to the RACH target reception power. In some examples, the value of the RACH target reception power may be provided via system information (e.g., SIB1). For example, the parameter "preambleReceivedTargetPower" of SIB1 may provide the RACH target reception power. The variable "$PL_{b,f,c}$" refers to a pathloss measurement at the UE for the BWP index (b), the carrier index (f), and the cell index (c). In some examples, the value of the pathloss measurement (sometimes referred to as a "pathloss estimate") at the UE may be calculated based on the difference of an RSRP measured for an SSB from the value of the PBCH block power parameter (e.g., the value of the PBCH block power parameter—the value of the RSRP measured for an SSB). The variable "$P_{CMAX,f,c}(i)$" may also be provided by system information (e.g., the SIB1). As the values of the different variables are provided to the UE (e.g., via system information or RRC signaling), the UE may calculate the PRACH transmit power for the BWP index (b), the carrier index (f), and the cell index (c).

As described in connection with FIG. 8, when a base station receives an uplink signal that is transmitted by a UE based on a downlink SFN SSB, the base station may be configured to apply different techniques for processing the uplink signal. For example, the base station (e.g., an SFN receiver) may be configured to apply a selective processing mode (e.g., as described in connection with FIG. 6), may be configured to apply a combined processing mode (e.g., as described in connection with FIG. 7), and/or may be configured to apply an independent processing mode (e.g., as described in connection with FIG. 8).

As SFN SSBs may be configured with different parameters than non-SFN SSBs, it may be appreciated that using Equation 1 (above) to calculate the PRACH transmit power for SFN may be inapplicable in some scenarios. That is, determining the PRACH transmit power may be different based on whether the SSB used to determine the RACH occasion is an SFN SSB or a non-SFN SSB.

For example, when a base station performs selective processing or individual processing, the SFN SSB may indicate additional power gain as the SFN SSB is transmitted from multiple base stations. As a result, the UE may underestimate the pathloss associated with the SFN SSB and may then transmit a PRACH preamble with less power than needed to achieve the target received power, resulting in an increased chance of RACH failure.

For example, a variable "$P_1$" may refer to an SSB transmit power, and a variable "$P_2$" may refer to a PRACH target receive power. Then the SFN SSB receive power may be determined by applying Equation 2 (below).

$$\text{SFN SSB Rx power} = \alpha_1 * P_1 + \alpha_2 * P_1 \quad \text{Equation 2:}$$

In Equation 2 (above), the variable "$\alpha_1$" refers to the pathloss from a first base station to the UE, and the variable "$\alpha_2$" refers to the pathloss from a second base station to the UE. It may be appreciated that the pathloss $\alpha_1$ and the pathloss $\alpha_2$ may be determined based on the value of the pathloss measurement calculation described in connection with Equation 1 (e.g., the value of the PBCH block power parameter—the value of the RSRP measured for an SSB).

Additionally, the pathloss measurement may be calculated by applying Equation 3 (below).

$$\text{PL estimate} = \alpha_1 + \alpha_2 \quad \text{Equation 3:}$$

By providing the SFN values to the PRACH transmit power calculation of Equation 1 (above), the PRACH transmit power for SFN may be calculated by Equation 4 (below).

$$\text{PRACH Tx Power} = P_2 / (\alpha_1 + \alpha_2) \quad \text{Equation 4:}$$

If the UE transmits the PRACH using a value calculated by Equation 4, then the PRACH receive power at the first base station may be determined using Equation 5 (below) and the PRACH receive power at the second base station may be determined using Equation 6 (below).

$$\text{PRACH Rx Power at first base station} = \frac{\alpha_1 * P_2}{\alpha_1 + \alpha_2} \leq P_2 \quad \text{Equation 5}$$

$$\text{PRACH Rx Power at second base station} = \frac{\alpha_2 * P_2}{\alpha_1 + \alpha_2} \leq P_2 \quad \text{Equation 6}$$

As shown in Equation 5, the PRACH receive power at the first base station is less than the PRACH target receive power $P_2$. Additionally, as shown in Equation 6, the PRACH receive power at the second base station is also less than the PRACH target receive power $P_2$. Thus, as the PRACH receiver power at the respective base stations is less than the PRACH target receive power $P_2$, there may be an increased chance of RACH failure.

In examples in which the base station performs combined processing (e.g., as described in connection with the example of FIG. 7), even though the UE may underestimate the pathloss to an individual base station, the combined PRACH receive power may attain the target reception power. However, if the Rx signals at different SFN base stations are blindly combined (e.g., by applying equal gain combining), the noise power may be enhanced and the signal to interference plus noise ratio (SINR) may be degraded (e.g., by 3 decibels (dB)). For example, the noise power from the first base station and the noise power from the second base station may result in a doubling of the noise power, which may correspond to a 3 dB loss in SINR.

Aspects disclosed herein provide a RACH configuration associated with SFN SSBs transmitted by a set of two or more base stations configured for SFN communication. For example, disclosed techniques enable applying a RACH configuration associated with SFN when performing a random access procedure based on an SFN SSB. In some examples, the RACH configuration associated with an SFN SSB may be separate from a RACH configuration associated with a non-SFN SSB. For example, the RACH configuration associated with the SFN SSB may include one or more parameter that are different than for a RACH configuration associated with a non-SFN SSB.

Aspects disclosed herein provide techniques for determining an improved uplink transmission power for providing reception at a network in an SFN. For example, disclosed techniques include determining a transmission power for an uplink transmission based on a pathloss measurement for an SFN reference signal and a compensation factor (sometimes referred to as a "scaling factor") associated with the SFN reference signal. In some examples, the SFN reference signal may comprise an SFN SSB.

Figure 10:
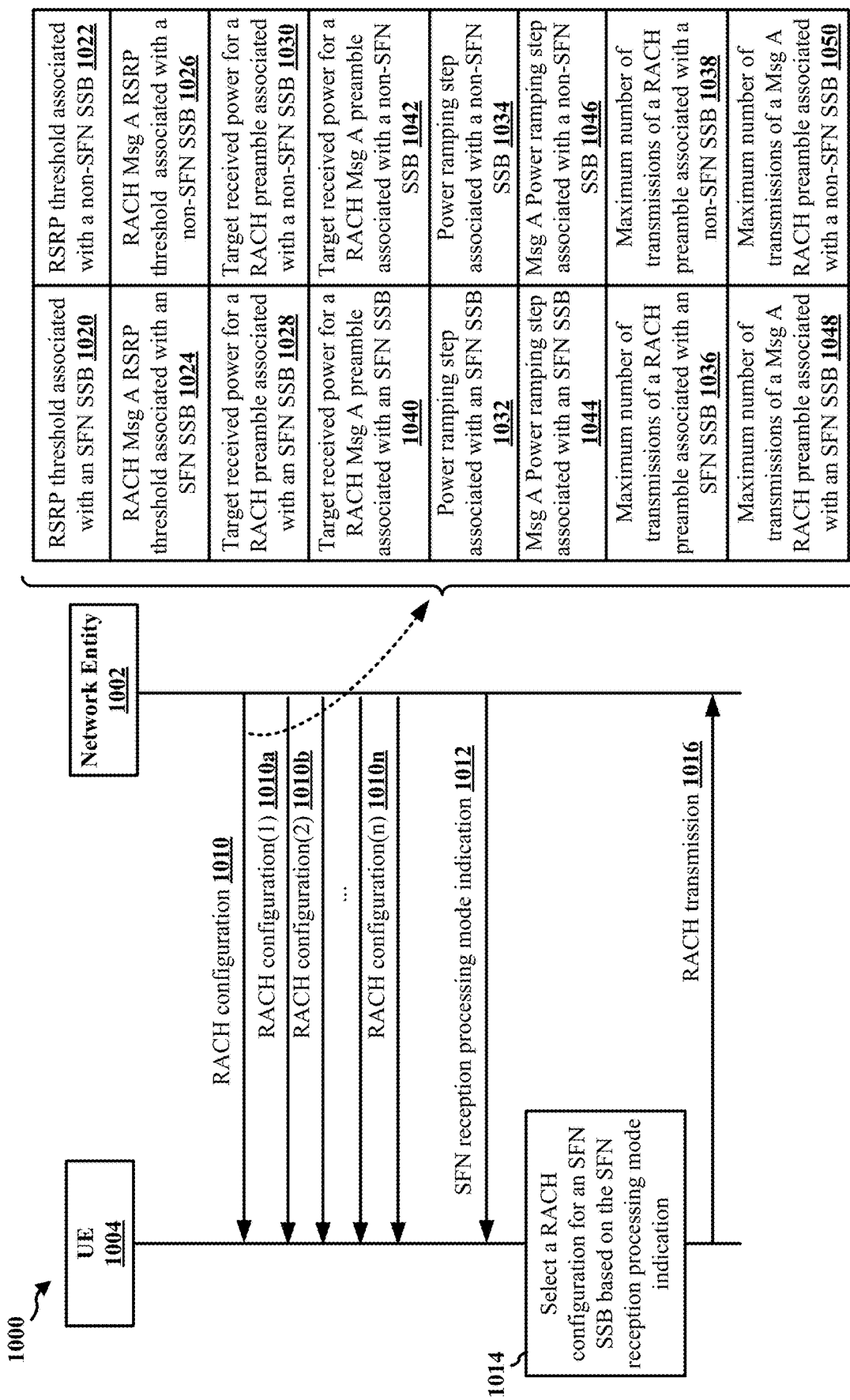
FIG. 10 is an example communication flow between base stations and a UE, in accordance with the teachings disclosed herein.

FIG. 10 illustrates an example communication flow 1000 between a network entity 1002 and a UE 1004, as presented herein. In the illustrated example, the communication flow 1000 facilitates providing separate RACH configurations for SFN SSBs and for non-SFN SSBs. Aspects of the network entity 1002 may be implemented by the base stations 102/180 of FIG. 1, the base station 310 of FIG. 3, the first base station 402 and/or the second base station 403 of FIG. 4, the base station 502 of FIG. 5A and/or FIG. 5B, the first base station 602 and/or the second base station 603 of FIG. 6, the first base station 702 and/or the second base station 703 of FIG. 7, the first base station 802 and/or the second base station 803 of FIG. 8, and/or the network entity 902 of FIG. 9. Aspects of the UE 1004 may be implemented by the UE 104 of FIG. 1, the UE 350 of FIG. 3, the UE 404 of FIG. 4, the UE 504 of FIG. 5A and/or FIG. 5B, the UE 604 of FIG. 6, the UE 704 of FIG. 7, the UE 804 of FIG. 8, and/or the UE 904 of FIG. 9. Although not shown in the illustrated example of FIG. 10, it may be appreciated that in additional or alternative examples, the network entity 1002 may be in communication with one or more network entities or UEs, and/or the UE 1004 may be in communication with one or more other network entities or UEs.

In the illustrated example of FIG. 10, the network entity 1002 transmits a RACH configuration 1010 that is received by the UE 1004. The RACH configuration 1010 may be associated with an SFN SSB transmitted by a set of two or more base stations configured for SFN communication. For example, and referring to the example of FIG. 4, the RACH configuration may be associated with the third SSB occasion that is mapped to the third beam of the first base station 402 and to the first beam of the second base station 403.

In some examples, the network entity 1002 may transmit the RACH configuration associated with the SFN SSB in system information (e.g., a SIB1). In some examples, the network entity 1002 may transmit the RACH configuration 1010 associated with the SFN SSB in dedicated RRC signaling to the UE.

In the illustrated example of FIG. 10, the UE 1004 transmits a RACH transmission 1016 that is received by the network entity 1002. For example, the RACH transmission 1016 may comprise a PRACH preamble. In some examples, the UE 1004 may transmit the RACH transmission 1016 based on the RACH configuration 1010. For example, the UE 1004 may transmit the RACH transmission 1016 using a PRACH transmit power determined based on one or more parameters of the RACH configuration 1010.

In some examples, the network entity 1002 may transmit a common RACH configuration for each SFN SSB in an SFN SSB burst set. For example, an SFN SSB burst set may include n SFN SSBs. In some such examples, the RACH configuration 1010 may be a common RACH configuration that is associated with each of the n SFN SSBs of the SFN SSB burst set. In some examples, the network entity 1002 may transmit a different RACH configuration for each SFN SSB in an SFN SSB burst set. For example, the network entity 1002 may transmit a first RACH configuration 1010a associated with a first SFN SSB of the SFN SSB burst set, may transmit a second RACH configuration 1010b associated with a second SFN SSB of the SFN SSB burst set, . . . and may transmit an n-th RACH configuration 1010n associated with an n-th SFN SSB of the SFN SSB burst set.

In some examples, the network entity 1002 may transmit multiple RACH configurations for the SFN SSB and where each of the multiple RACH configurations may be associated with a different SFN processing mode. For example, the first RACH configuration 1010a may be associated with a selective processing mode for the SFN SSB, the second RACH configuration 1010b may be associated with a combined processing mode for the SFN SSB, and the n-th RACH configuration 1010n may be associated with an independent processing mode.

In the illustrated example of FIG. 10, the RACH configuration 1010 associated with the SFN SSB may include one or more parameters that are different than for a non-SFN SSB. For example, the RACH configuration 1010 may include an SFN RSRP threshold 1020 associated with an SFN SSB (which may be referred to as "rsrp-ThresholdSSB-SFN" or by another name) that is different than a non-SFN RSRP threshold 1022 associated with a non-SFN SSB (which may be referred to as "rsrp-ThresholdSSB" or by another name). In some examples, the value of the SFN RSRP threshold 1020 may a higher RSRP threshold than the non-SFN RSRP threshold 1022 to compensate for the change in power gain. In some examples, the SFN RSRP threshold 1020 and/or the non-SFN RSRP threshold 1022 may be associated with the four-step RACH procedure, as described in connection with FIG. 5A.

In some examples, the one or more parameters may be associated with a RACH Msg A RSRP threshold. For example, the RACH configuration 1010 associated with the SFN SSB may comprise an SFN RACH Msg A RSRP threshold 1024 associated with an SFN SSB (which may be referred to as "msgA-RSRP-ThresholdSSB-SFN" or by another name) that is different than a non-SFN RACH Msg A RSRP threshold 1026 associated with a non-SFN SSB (which may be referred to as "msgA-RSRP-ThresholdSSB" or by another name). In some examples, the SFN RACH Msg A RSRP threshold 1024 and/or the non-SFN RACH Msg A RSRP threshold 1026 may be associated with the two-step RACH procedure, as described in connection with FIG. 5B.

In some examples, the one or more parameters may be associated with a target received power for a RACH preamble. For example, the RACH configuration 1010 associated with the SFN SSB may comprise an SFN target received power for a RACH preamble 1028 associated with an SFN SSB (which may be referred to as "preambleReceivedTargetPower-SFN" or by another name) that is different than a non-SFN target received power for a RACH preamble 1030 associated with a non-SFN SSB (which may be referred to as "preambleReceivedTargetPower" or by another name). In some examples, the value of the SFN target received power for a RACH preamble 1028 may be a higher target received power than the non-SFN target received power for a RACH preamble 1030 to compensate for the pathloss underestimation that may occur.

In some examples, the RACH configuration 1010 associated with the SFN SSB may comprise an SFN target received power for a RACH Msg A preamble 1040 associated with an SFN SSB (which may be referred to as "msgA-PreambleReceivedTargetPower-SFN" or by another name) that is different than a non-SFN target received power for a RACH Msg A preamble 1042 associated with a non-SFN SSB (which may be referred to as "msgA-PreambleReceivedTargetPower" or by another name). In some examples, the value of the SFN target received power for a RACH Msg A preamble 1040 may be a higher target received power than the non-SFN target received power for a RACH Msg A preamble 1042 to compensate for the pathloss underestimation that may occur.

In some examples, the one or more parameters may be associated with a 4-step power ramping step or a 2-step power ramping step. For example, the RACH configuration 1010 associated with the SFN SSB may comprise an SFN power ramping step 1032 associated with an SFN SSB (which may be referred to as "powerRampingStep-SFN" or by another name) that is different than a non-SFN power ramping step 1034 associated with a non-SFN SSB (which may be referred to as "powerRampingStep" or by another name). In some examples, the value of the SFN power ramping step 1032 associated with the SFN SSB may be a higher power ramping than the non-SFN power ramping step 1034 to compensate for the pathloss underestimation that may occur.

In some examples, the RACH configuration 1010 associated with the SFN SSB may comprise an SFN Msg A power ramping step 1044 associated with an SFN SSB (which may be referred to as "msgA-PreamblePowerRampingStep-SFN" or by another name) that is different than a non-SFN Msg A power ramping step 1046 associated with a non-SFN SSB (which may be referred to as "msgA-PreamblePowerRampingStep" or by another name). In some examples, the value of the SFN Msg A power ramping step 1044 may be a higher power ramping than the non-SFN Msg A power ramping step 1046 to compensate for the pathloss underestimation that may occur.

In some examples, the one or more parameter may be associated with a 4-step maximum number of transmissions of a RACH preamble or a 2-step maximum number of transmissions of a RACH preamble. For example, the RACH configuration 1010 associated with the SFN SSB may comprise an SFN maximum number of transmissions of a RACH preamble 1036 associated with an SFN SSB (which may be referred to as "preambleTransMax-SFN" or by another name) that is different than a non-SFN maximum number of transmissions of a RACH preamble 1038 associated with a non-SFN SSB (which may be referred to as "preambleTransMax" or by another name).

In some examples, the RACH configuration 1010 associated with the SFN SSB may comprise an SFN maximum number of transmissions of a Msg A RACH preamble 1048 associated with an SFN SSB (which may be referred to as "msgA-preambleTransMax-SFN" or by another name) that is different than a non-SFN maximum number of transmissions of a Msg-A RACH preamble 1050 associated with a non-SFN SSB (which may be referred to as "msgA-preambleTransMax" or by another name).

However, it may be appreciated that the example parameters of the RACH configuration 1010 are illustrative and non-limiting. For example, other example RACH configurations may include one or more additional or alternative parameters that may different for the SFN SSB than for the non-SFN SSB.

In some examples, the RACH configuration 1010 associated with the SFN SSB may be transmit in an RRC information element (IE) for RACH that is associated with an SFN (which may be referred to as "RACH-ConfigCommon-SFN" or by another name). In some examples, the RACH configuration 1010 associated with the SFN SSB may be transmit in an RRC IE for RACH parameters for an SFN and a non-SFN. For example, the RRC IE for RACH parameters for a non-SFN may be modified to include one or more RACH parameter for an SFN.

In some examples, to compensate for pathloss underestimation, disclosed techniques may apply a compensation factor "γ" to a pathloss measurement. However, i in some examples, the compensation factor γ may be applied to the synchronization signal PBCH block power parameter (which may be referred to as "ss-PBCH-BlockPower" or by another name).

In some examples, the UE may determine a PRACH transmit power for SFN SSBs by modifying the PRACH transmit power calculation of Equation 1 (above). For example, the UE may apply Equation 7 (below) to calculate the PRACH transmit power for SFN SSBs.

$$P_{RACH,b,f,c}(i) = \min\{P_{CMAX,f,c}(i), P_{RACH,target,f,c} + PL_{b,f,c} + \gamma_{b,f,c}\}$$ Equation 7:

In Equation 7, the variable "$\gamma_{b,f,c}$" refers to a compensation factor (sometimes referred to as an "SFN compensation factor" or a "scaling factor"), in decibels (dB), for the BWP index (b), the carrier index (f), and the cell index (c). In some examples, the UE may receive the compensation factor γ via system information (e.g., SIB1). In some examples, the UE may receive the compensation factor γ in dedicated signaling for the UE. For example, the UE may receive the compensation factor γ in one or more of RRC signaling, a medium access control—control element (MAC-CE), or DCI.

In some examples, the SFN SSB may comprise a burst set. In some such examples, a common compensation factor may be applied to each SFN SSB of the burst set. In some examples, different compensation factors may be applied to each SFN SSB of the burst set. In some examples, a set of one or more compensation factors may be indicated for an SFN SSB. In some such examples, the compensation factor to apply for the SFN SSB may be selected based on, for example, an SFN receiver processing mode indicated for the SFN SSB. For example, the UE may map the SFN SSB to an SFN receiver processing mode associated with the SFN SSB and select a compensation factor from the set of one or more compensation factors based on the mapped SFN receiver processing mode.

Although the description herein provides examples directed to PRACH power control, the concepts described herein may be applicable to other transmit power control mechanisms for other channels in which a pathloss measurement is based on an SFN reference signal.

In some examples, applying the disclosed compensation factor γ may increase the PRACH receive power at the respective base stations. For example, the UE may transmit the PRACH using a value calculated by applying the compensation factor γ. In some examples, the PRACH receive power at the first base station may be determined using Equation 8 (below) and the PRACH receive power at the second base station may be determined using Equation 9 (below). It may be appreciated that Equation 8 may be similar to Equation 5 (above), but differs from Equation 5 by including the compensation factor γ. In a similar manner, Equation 9 may be similar to Equation 6 (above), but differs from Equation 6 by including the compensation factor γ.

$$PRACH\ Rx\ \text{Power at first base station} = \frac{\gamma\alpha_1 * P_2}{\alpha_1 + \alpha_2} \cong P_2$$ Equation 8

$$PRACH\ Rx\ \text{Power at second base station} = \frac{\gamma\alpha_2 * P_2}{\alpha_1 + \alpha_2} \cong P_2$$ Equation 9

As shown in Equation 8, the PRACH receive power at the first base station is similar to the PRACH target receive power $P_2$. Additionally, as shown in Equation 9, the PRACH receive power at the second base station is also similar to the PRACH target receive power $P_2$. Thus, as the PRACH receiver power at the respective base stations is similar to the PRACH target receive power $P_2$, there may be improved uplink transmission power for providing reception at the network in an SFN.

In some examples, aspects may apply different compensation factors for different SFN SSBs. For example, the pathloss from a base station may vary based on the distance of the base stations relative to a position.

Referring again to FIG. 4, the second region 421 may correspond to a mid-point between the first base station 402 and the second base station 403. In such a location, the pathloss from each of the base stations may be similar. For example, the pathloss from the first base station 402 to the UE 404 may be similar to the pathloss from the second base station 403 to the UE 404 (e.g., $\alpha_1 \cong \alpha_2$). In some such examples, the UE may apply a compensation factor γ=2 (in linear scale) to apply a 3 dB compensation to the pathloss.

When the UE 404 is located at a position off the mid-point between the base stations (e.g., at the first region 420 or the third region 422 of FIG. 4), the pathloss from one base station may be smaller than the pathloss from the other base station. For example, at the first region 420, the pathloss from the first base station 402 to the UE 404 may be smaller than the pathloss from the second base station 403 to the UE 404 (e.g., $\alpha_1 < \alpha_2$). In some such examples, the UE may apply a compensation factor γ<2 to apply less than a 3 dB compensation to the pathloss.

It may be appreciated that for a location that is not associated with an SFN SSB (e.g., the SSB occasions located within the first non-SFN area 412 and/or the second non-SFN area 413), the UE 404 may not apply a compensation factor (e.g., may apply a compensation factor γ=1).

Additionally, it may be appreciated that in scenarios in which an SFN SSB is blocked, then the UE 404 may proceed as if the UE 404 is located in a non-SFN area. For example, the third beam from the second base station 403 (associated with the fifth SSB occasion) may be blocked and, thus, the pathloss from the second base station 403 may be zero (e.g., $\alpha_2=0$). In some such examples, the UE 404 may apply a compensation factor γ=1.

In some examples, the UE may apply a compensation factor that is different than an indicated compensation factor. For example, the UE may apply a compensation factor that is within a range of the indicated compensation factor. In some such examples, the range may be pre-determined. In some examples, the range may be configurable.

In some examples, the UE may adjust the compensation factor to determine the transmission power based on a beam width. For example, FIG. 11A and FIG. 11B depict examples in which a UE may adjust a compensation factor based on a beam width.

Figures 11A, 11B:
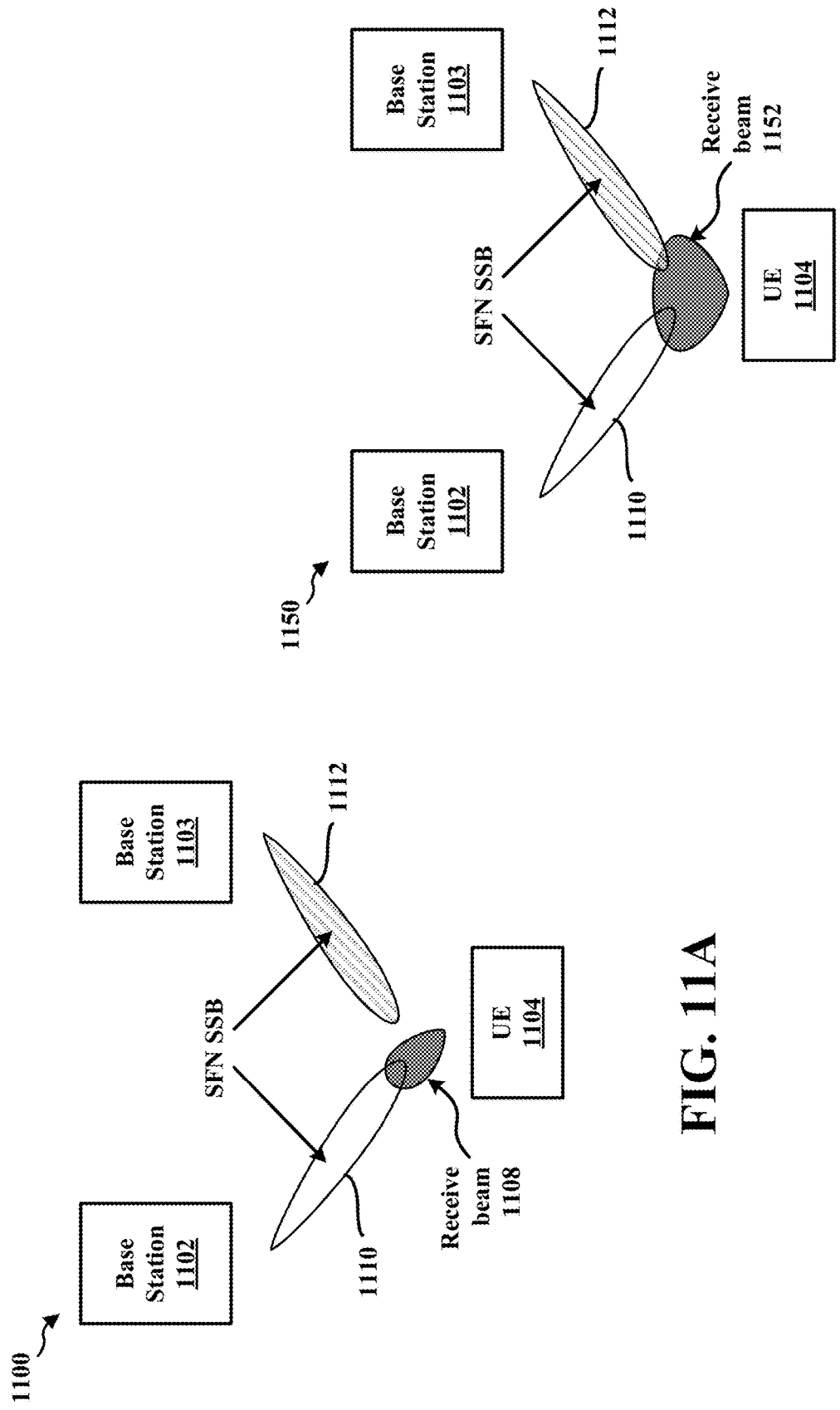
FIG. 11A is a diagram illustrating wireless communication between base stations and a UE capable of SFN communications, in accordance with various aspects of the present disclosure.
FIG. 11B is a diagram illustrating wireless communication between base stations and a UE capable of SFN communications, in accordance with various aspects of the present disclosure.

FIG. 11A is a diagram 1100 illustrating wireless communication between a first base station 1102, a second base station 1103, and a UE 1104 capable of SFN communications, in accordance with various aspects of the present disclosure. FIG. 11B is a diagram 1150 illustrating wireless communication between the first base station 1102, the second base station 1103, and the UE 1105 capable of SFN communications, in accordance with various aspects of the present disclosure. Aspects of the first base station 1102 and/or the second base station 1103 may be implemented by the base stations 102/180 of FIG. 1, the base station 310 of FIG. 3, the first base station 402 and/or the second base station 403 of FIG. 4, the base station 502 of FIG. 5A and/or FIG. 5B, the first base station 602 and/or the second base station 603 of FIG. 6, the first base station 702 and/or the second base station 703 of FIG. 7, the first base station 802 and/or the second base station 803 of FIG. 8, the network entity 902 of FIG. 9, and/or the network entity 1002 of FIG. 10. Aspects of the UE 1104 may be implemented by the UE 104 of FIG. 1, the UE 350 of FIG. 3, the UE 404 of FIG. 4, the UE 504 of FIG. 5A and/or FIG. 5B, the UE 604 of FIG. 6, the UE 704 of FIG. 7, the UE 804 of FIG. 8, the UE 904 of FIG. 9, and/or the UE 1004 of FIG. 10.

In the illustrated example of FIG. 11A, the UE 1104 may apply a narrow receive beam 1108 to receive first SFN SSBs 1110 from the first base station 1102 and to receive second SFN SSBs 1112 from the second base station 1103. As shown in FIG. 11A, by using the narrow receive beam 1108, the narrow receive beam 1108 is focusing on the first base station 1102. As a result, the pathloss measurement associated with the second base station 1103 may have limited (e.g., negligible) impact on the pathloss measurement for the SFN SSB. In some such examples, the UE 1104 may functionally be in a non-SFN area and, thus, may determine not to apply a compensation (e.g., may apply a compensation factor $\gamma=1$). For example, the pathloss underestimation that may occur in an SFN-area based on the combination of pathlosses from the first base station 1102 and the second base station 1103 may not occur and, thus, the UE 1104 may determine not to apply a compensation.

In the illustrated example of FIG. 11B, the UE 1104 may apply a wide receive beam 1152 to receive the first SFN SSBs 1110 from the first base station 1102 and to receive the second SFN SSBs 1112 from the second base station 1103. By using the wide receive beam 1152, the pathloss measurement may be a mixture of pathloss measurements associated with the base stations. In some such examples, the UE 1104 may determine to apply a compensation (e.g., may apply a compensation factor $\gamma \neq 1$).

In some examples, a UE may be configured to simultaneously receive and transmit. For example, the UE may be configured to receive and transmit using multiple beams or panels. In some such examples, each beam or panel may separately estimate pathloss from a respective base station and determine a corresponding transmit power. Additionally, in some such examples, the UE may determine not to apply a compensation (e.g., may apply a compensation factor $\gamma=1$). Thus, it may be appreciated that the UE may apply a smaller compensation factor than an indicated compensation factor based on, for example, a beam width (e.g., the narrow receive beam 1108 and/or the wide receive beam 1152) and/or a beamforming gain.

Figure 12:
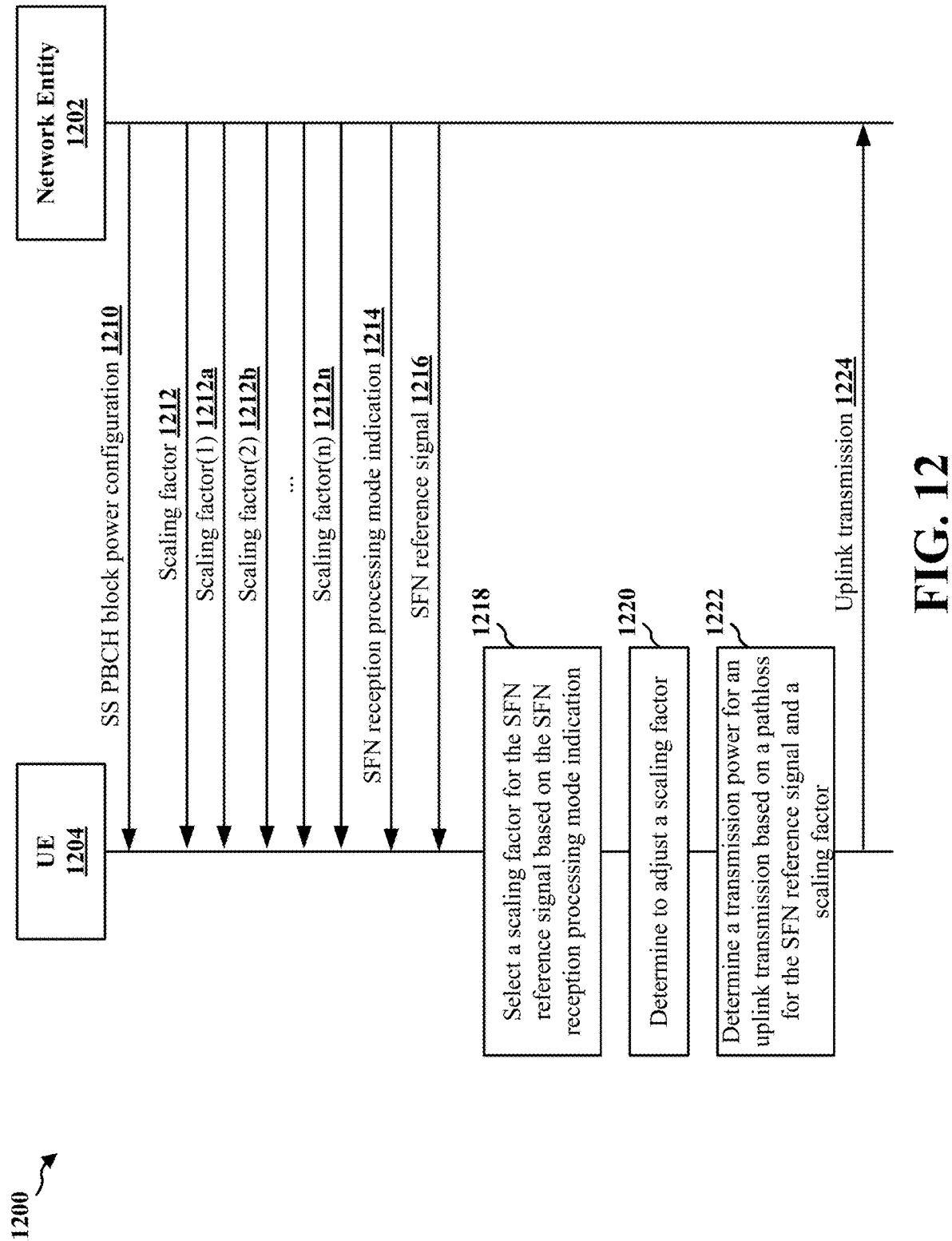
FIG. 12 is an example communication flow between a base station and a UE, in accordance with the teachings disclosed herein.

FIG. 12 illustrates an example communication flow 1200 between a network entity 1202 and a UE 1204, as presented herein. In the illustrated example, the communication flow 1200 facilitates applying a scaling factor to determine a transmission power for an uplink transmission. Aspects of the network entity 1202 may be implemented by the base stations 102/180 of FIG. 1, the base station 310 of FIG. 3, the first base station 402 and/or the second base station 403 of FIG. 4, the base station 502 of FIG. 5A and/or FIG. 5B, the first base station 602 and/or the second base station 603 of FIG. 6, the first base station 702 and/or the second base station 703 of FIG. 7, the first base station 802 and/or the second base station 803 of FIG. 8, the network entity 902 of FIG. 9, the network entity 1002 of FIG. 10, and/or the first base station 1102 and/or the second base station 1103 of FIG. 11. Aspects of the UE 1204 may be implemented by the UE 104 of FIG. 1, the UE 350 of FIG. 3, the UE 404 of FIG. 4, the UE 504 of FIG. 5A and/or FIG. 5B, the UE 604 of FIG. 6, the UE 704 of FIG. 7, the UE 804 of FIG. 8, the UE 904 of FIG. 9, the UE 1004 of FIG. 10, and/or the UE 1104 of FIG. 11. Although not shown in the illustrated example of FIG. 12, in additional or alternative examples, the network entity 1202 may be in communication with one or more base stations or UEs, and/or the UE 1204 may be in communication with one or more other base stations or UEs.

In the illustrated example of FIG. 12, the network entity 1202 transmits a scaling factor 1212 that is received by the UE 1204. The scaling factor 1212 may be associated with transmission power control of an uplink transmission associated with an SFN reference signal transmitted by two or more base stations configured for SFN communication. In some examples, the network entity 1202 may transmit the scaling factor 1212 in system information (e.g., a SIB1). In some examples, the network entity 1202 may transmit the scaling factor 1212 in dedicated signaling for the UE 1204. For example, the network entity 1202 may transmit the scaling factor 1212 using one or more of RRC signaling, a MAC-CE, or DCI.

In the illustrated example of FIG. 12, the network entity 1202 transmits an SFN reference signal 1216 that is received by the UE 1204. In some examples, the SFN reference signal 1216 may comprise an SSB (e.g., may comprise an SFN SSB).

At 1222, the UE 1204 determines a transmission power for an uplink transmission 1224 based on a pathloss measurement for the SFN reference signal 1216 and the scaling factor 1212. In some examples, the UE 1204 may determine the transmission power for the uplink transmission 1224 by applying the scaling factor to a pathloss measurement for the SFN reference signal 1216. For example, the UE 1204 may apply Equation 7 (above) to determine the transmission power for transmitting PRACH associated with an SFN SSB.

In the illustrated example of FIG. 12, the UE 1204 transmits the uplink transmission 1224 that is received by the network entity 1202. In some examples, the uplink transmission 1224 may comprise a PRACH transmission. The receive power of the uplink transmission 1224 at the network entity 1202 may be based, at least in part, on the scaling factor 1212. For example, the receive power of the uplink transmission 1224 at the network entity 1202 may be determined by applying Equation 8 (above) or Equation 9 (above).

In some examples, the network entity 1202 may transmit an SS PBCH block power configuration 1210 that is received by the UE 1204. For example, the SS PBCH block power configuration 1210 may indicate an SSB transmit power (e.g., an EPRE of an SSS and PBCH). In some such examples, the UE 1204 may determine (at 1222) the transmission power for the uplink transmission 1224 by applying the scaling factor 1212 to the SSB transmit power provided by the SS PBCH block power configuration 1210.

In some examples, the network entity 1202 may transmit a common scaling factor for each SFN reference signal in a burst set. For example, a burst set may include n SFN reference signals. In some such examples, the scaling factor 1212 may be a common scaling factor that is associated with each SFN reference signal of the n SFN reference signals of the burst set. In some examples, the network entity 1202 may transmit a different scaling factor for each SFN reference signal in a burst set. For example, network entity 1202 may transmit a first scaling factor 1212a associated with a first SFN reference signal of the burst set, may transmit a second scaling factor 1212b associated with a second SFN reference signal of the burst set, . . . and may transmit an n-th scaling factor 1212n associated with an n-th SFN reference signal of the burst set.

In some examples, the network entity 1202 may transmit multiple scaling factors for the SFN reference signal and where each of the multiple scaling factors may be associated with a different SFN processing mode. For example, the first scaling factor 1212a may be associated with a selective processing mode for the SFN reference signal, the second scaling factor 1212b may be associated with a combined processing mode for the SFN reference signal, and the n-th scaling factor 1212n may be associated with an independent processing mode.

In the illustrated example, the network entity 1202 may transmit an SFN reception processing mode indication 1214 that is received by the UE 1204. In some examples, the SFN reception processing mode indication 1214 may indicate one or more SFN reception processing modes that are supported by the two or more base stations configured for SFN communication and that may transmit the SFN reference signal 1216.

In some examples, at 1218, the UE 1204 may select a scaling factor for the SFN reference signal 1216 based on the SFN reception processing mode indication 1214. For example, the UE 1204 may map the SFN reference signal 1216 to an SFN receiver processing mode indicated by the SFN reception processing mode indication 1214 and select a scaling factor based on the mapped SFN receiver processing mode. In some examples, the UE 1204 may select the scaling factor from a set of scaling factors (e.g., the first scaling factor 1212a to the n-th scaling factor 1212n).

In some examples, the UE 1204 may determine to adjust a scaling factor and apply a scaling factor different than an indicated scaling factor (e.g., the scaling factor 1212). For example, at 1220, the UE 1204 may determine to adjust the scaling factor 1212 to determine the transmission power for the uplink transmission 1224. In some examples, the UE 1204 may adjust the scaling factor 1212 within a range. In some examples, the range may be pre-determined (or fixed). In some examples, the range may be configurable. In some examples, the UE 1204 may adjust the scaling factor 1212 based on a beam width, as described in connection with FIG. 11A and FIG. 11B. In some examples, the UE 1204 may adjust the scaling factor 1212 based on a number of beams or panels that the UE 1204 uses to receive the SFN reference signal 1216. In some examples, the UE 1204 may reduce the scaling factor 1212.

Figure 13:
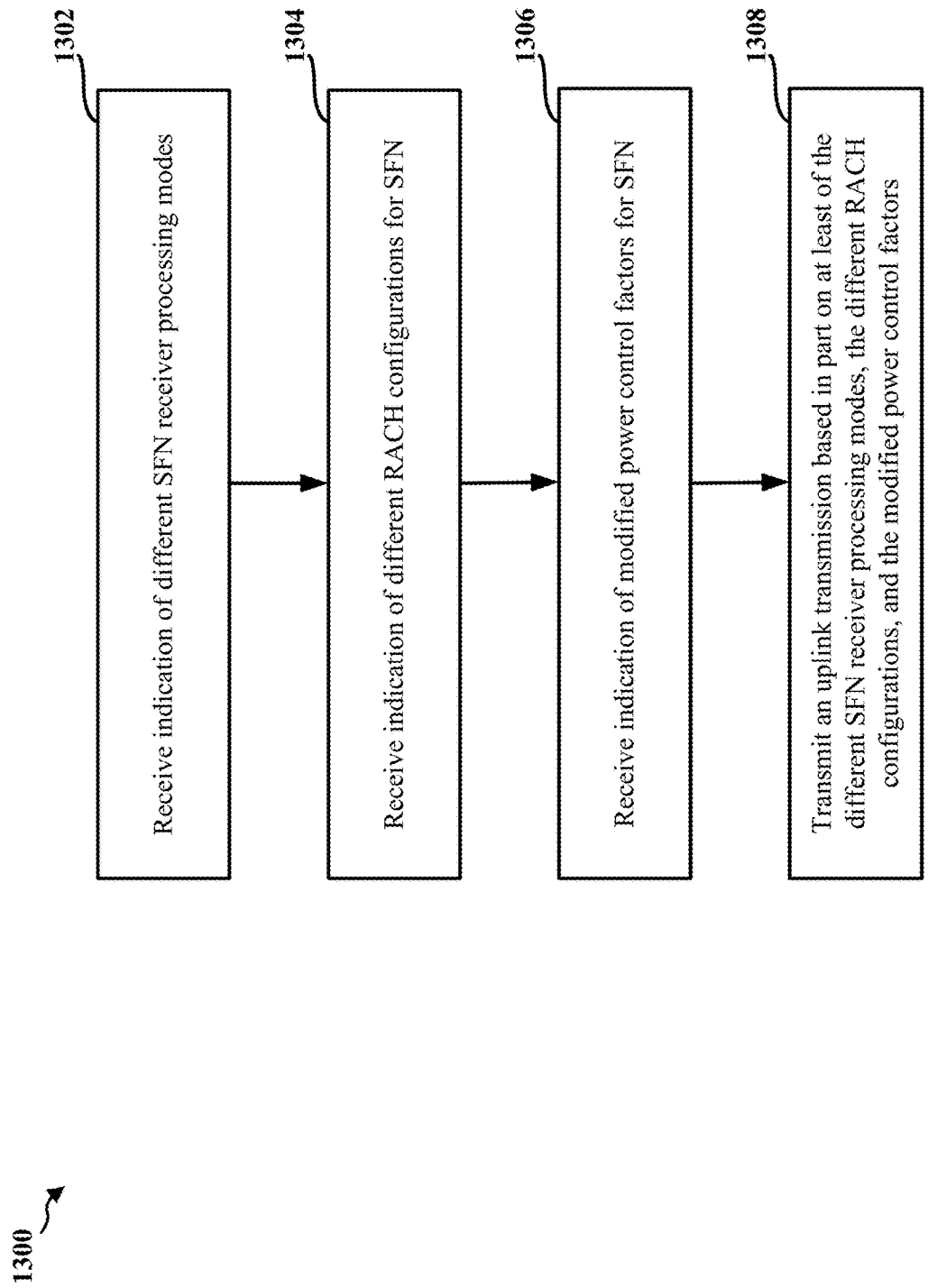
FIG. 13 is a flowchart of a method of wireless communication at a UE, in accordance with the teachings disclosed herein.

FIG. 13 is a flowchart 1300 of a method of wireless communication. The method may be performed by a UE (e.g., the UE 104, the UE 350, and/or an apparatus 2002 of FIG. 20). The method may improve reception of uplink signals from the UE in an SFN including two or more base stations.

At 1302, the UE receives an indication of different SFN receiver processing modes, as described in connection with the example indication 910 of FIG. 9. For example, an indication of a set of SFN receiver processing modes may identify at least one SFN receiver processing mode supported by a network entity. Aspects of receiving the indication of the different SFN receiver processing modes are described in connection with FIG. 9, FIG. 14, and FIG. 15. The set of SFN receiver processing modes include, e.g., at least one of a selective processing mode (e.g., as described in connection with FIG. 6), a combined processing mode (e.g., as described in connection with FIG. 7), and an independent processing mode (e.g., as described in connection FIG. 8).

At 1304, the UE receives an indication of different RACH configurations for SFN, as described in connection with the example RACH configuration 1010 of FIG. 10. Aspects of receiving the indication of the different RACH configurations for SFN are described in connection with FIG. 10, FIG. 16, and FIG. 17.

At 1306, the UE receives an indication of modified power control factors for SFN, as described in connection with the example scaling factor 1212 of FIG. 12. Aspects of receiving the indication of the modified power control factors are described in connection with FIG. 12, FIG. 18, and FIG. 19.

At 1308, the UE transmits an uplink transmission based in part on at least one of the different SFN receiver processing modes, the different RACH configurations, and the modified power control factors, as described in connection with the example SFN-based uplink signal 920 of FIG. 9, the example RACH transmission 1016 of FIG. 10, and/or the example uplink transmission 1224 of FIG. 12.

Figure 14:
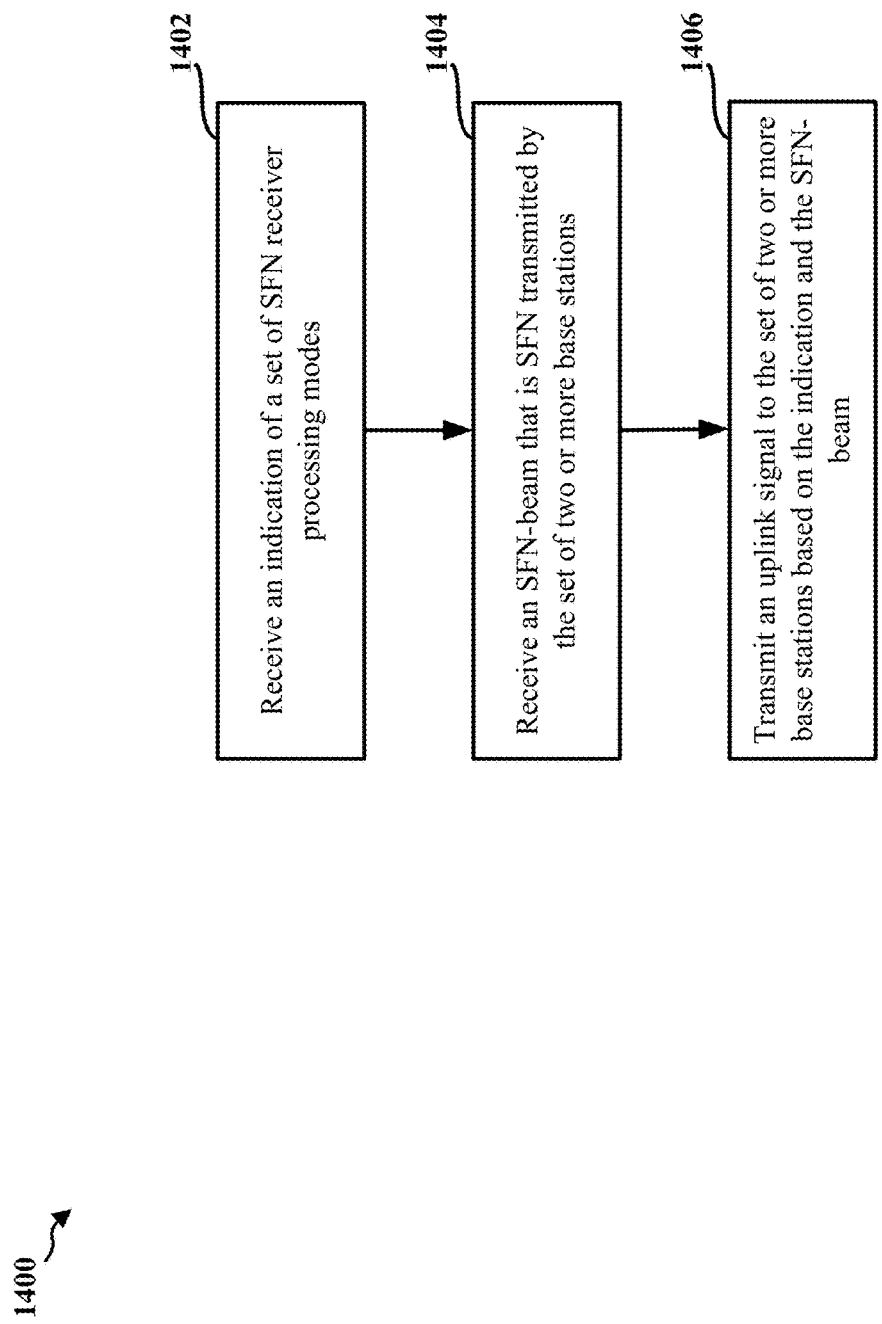
FIG. 14 is a flowchart of a method of wireless communication at a UE, in accordance with the teachings disclosed herein.

FIG. 14 is a flowchart 1400 of a method of wireless communication. The method may be performed by a UE (e.g., the UE 104, the UE 350, and/or an apparatus 2002 of FIG. 20). The method may enable the network entity to improve uplink SFN reception based on multiple base stations.

At 1402, the UE receives an indication of a set of SFN receiver processing modes supported by a set of two or more base stations configured for SFN communication, as described in connection with the example indication 910 of FIG. 9. The reception of the indication of the set of SFN receiver processing modes, at 1402, may be performed, for example, by a mode component 2040 of the apparatus 2002 of FIG. 20.

The set of two or more base stations may be capable of supporting the indicated SFN receiver processing modes. The set of two or more base stations may include a first TRP and a second TRP. The set of two or more base stations may include a first RRH and a second RRH. The set of two or more base stations may include at least one TRP and at least one RRH. The set of SFN receiver processing modes include, e.g., at least one of a selective processing mode (e.g., as described in connection with FIG. 6), a combined processing mode (e.g., as described in connection with FIG. 7), and an independent processing mode (e.g., as described in connection FIG. 8). In some examples, the indication of the set of SFN receiver processing modes identifies at least one SFN receiver processing mode supported by the network entity. The UE may receive the indication using at least one of system information (e.g., a SIB), RRC signaling, a MAC-CE, and L1 signaling.

At 1404, the UE receives an SFN-beam that is SFN transmitted by the set of two or more base stations, as described in connection with the example SFN beam 914 of FIG. 9. The receiving of the SFN-beam, at 1404, may be performed, for example, by the SFN beam component 2042 of the apparatus 2002 of FIG. 20.

At 1406, the UE transmits an uplink signal to the set of two or more base stations based on the indication and the SFN-beam, as described in connection with the example SFN-based uplink signal 920 of FIG. 9. In some examples, the uplink signal may include a PRACH, and where the UE selects a RACH occasion to transmit the PRACH based on a measurement of the SFN-beam. In some examples, the uplink signal includes at least one of a PRACH, a PUCCH, a PUSCH, and an SRS. The transmitting of the uplink signal, at 1406, may be performed, for example, by an uplink signal component 2044 of the apparatus 2002 of FIG. 20.

Figure 15:
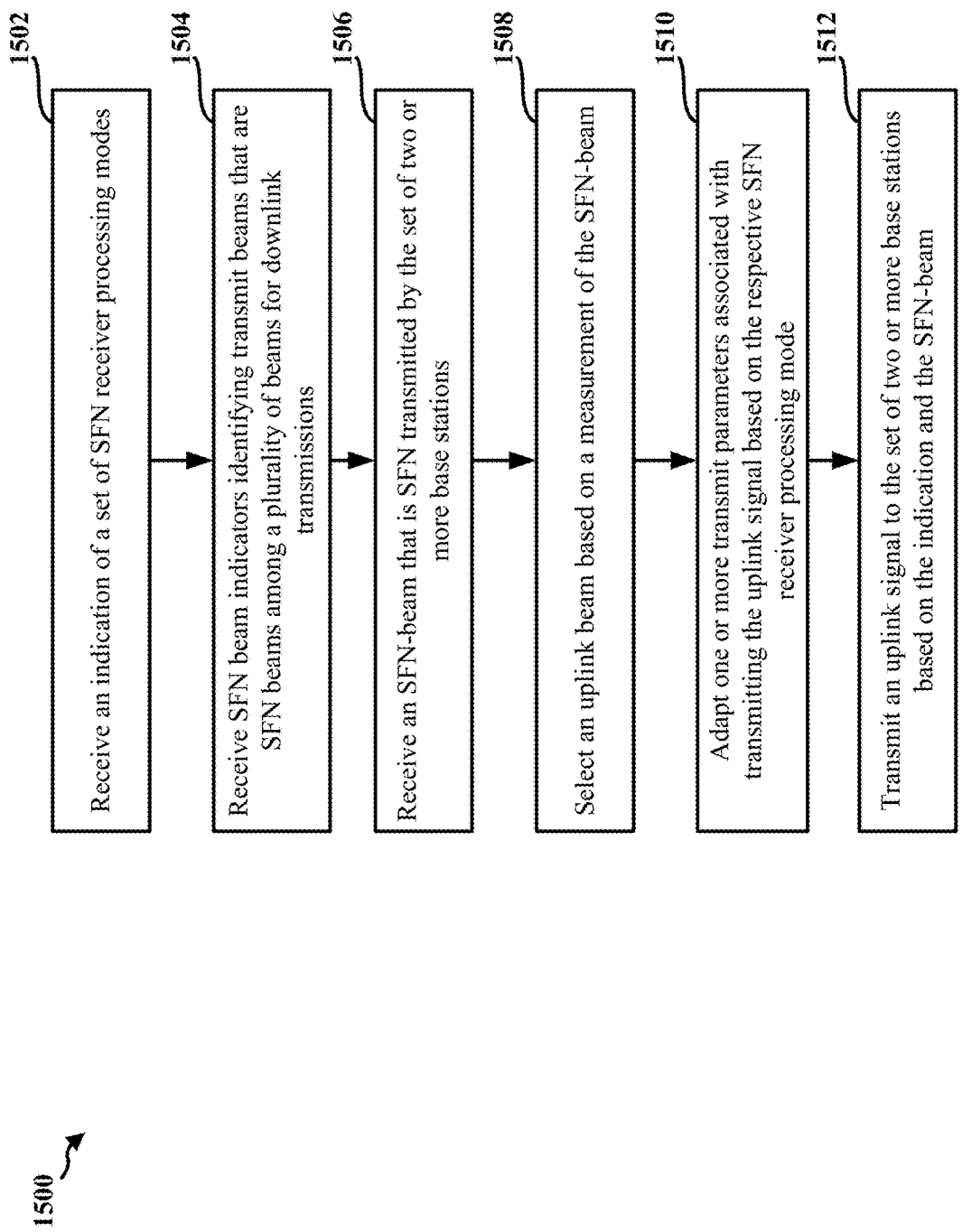
FIG. 15 is a flowchart of a method of wireless communication at a UE, in accordance with the teachings disclosed herein.

FIG. 15 is a flowchart 1500 of a method of wireless communication. The method may be performed by a UE (e.g., the UE 104, the UE 350, and/or an apparatus 2002 of FIG. 20). The method may enable the network entity to improve uplink SFN reception based on multiple base stations.

At 1502, the UE receives an indication of a set of SFN receiver processing modes supported by a set of two or more base stations configured for SFN communication, as described in connection with the example indication 910 of FIG. 9. The reception of the indication of the set of SFN receiver processing modes, at 1502, may be performed, for example, by a mode component 2040 of the apparatus 2002 of FIG. 20.

The set of two or more base stations may be capable of supporting the indicated SFN receiver processing modes. The set of two or more base stations may include a first TRP and a second TRP. The set of two or more base stations may include a first RRH and a second RRH. The set of two or more base stations may include at least one TRP and at least one RRH. The set of SFN receiver processing modes include, e.g., at least one of a selective processing mode (e.g., as described in connection with FIG. 6), a combined processing mode (e.g., as described in connection with FIG. 7), and an independent processing mode (e.g., as described in connection FIG. 8). In some examples, the indication of the set of SFN receiver processing modes identifies at least one SFN receiver processing mode supported by the network entity. The UE may receive the indication using at least one of system information (e.g., a SIB), RRC signaling, a MAC-CE, and L1 signaling.

As illustrated at 1504, the UE may further receive SFN-beam indicators identifying transmit beams that are SFN-beams among a plurality of beams for downlink transmission, as described in connection with the example SFN beam indicators 912 of FIG. 9. The indication may map a respective SFN receiver processing mode of the set of SFN receiver processing modes to a corresponding SFN-beam, for example, in order to determine particular receiver processing mode to SFN beam pairings. The receiving of the SFN-beam indicators, at 1504, may be performed, for example, by an SFN beam component 2042 of the apparatus 2002 of FIG. 20.

At 1506, the UE receives an SFN-beam that is SFN transmitted by the set of two or more base stations, as described in connection with the example SFN beam 914 of FIG. 9. The receiving of the SFN-beam, at 1506, may be performed, for example, by the SFN beam component 2042 of the apparatus 2002 of FIG. 20.

At 1508, the UE may select an uplink beam based on a measurement of the SFN-beam, as described in connection with 916 of FIG. 9. As an example, the uplink signal may comprise a PRACH, and the UE may select a RACH occasion to transmit the PRACH based on a measurement of the SFN-beam. The selecting of the uplink beam, at 1508, may be performed, for example, by a selection component 2048 of the apparatus 2002 of FIG. 20.

As illustrated, at 1510, the UE may adapt one or more transmit parameters associated with transmitting the uplink signal based on the respective SFN receiver processing mode, as described in connection with 918 of FIG. 9. In some examples, the SFN receiver processing mode may map to the received SFN-beam. In some examples, the indication of the set of SFN receiver processing modes, at 1502, may identify at least one SFN receiver processing mode supported by the set of two or more base stations. The UE may adapt one or more transmit parameters associated with transmitting the uplink signal based on the at least one identified SFN receiver processing modes. The one or more transmit parameters may comprise an uplink transmit power, beam selection, panel selection, and link adaptation. The adapting of the one or more transmit parameters, at 1510, may be performed, for example, by an adaptation component 2046 of the apparatus 2002 of FIG. 20.

At 1512, the UE transmits an uplink signal to the set of two or more base stations based on the indication and the SFN-beam, as described in connection with the example SFN-based uplink signal 920 of FIG. 9. In some examples, the uplink signal may include a PRACH, and where the UE selects a RACH occasion to transmit the PRACH based on a measurement of the SFN-beam. In some examples, the uplink signal includes at least one of a PRACH, a PUCCH, a PUSCH, and an SRS. The transmitting of the uplink signal, at 1512, may be performed, for example, by an uplink signal component 2044 of the apparatus 2002 of FIG. 20.

Figure 16:
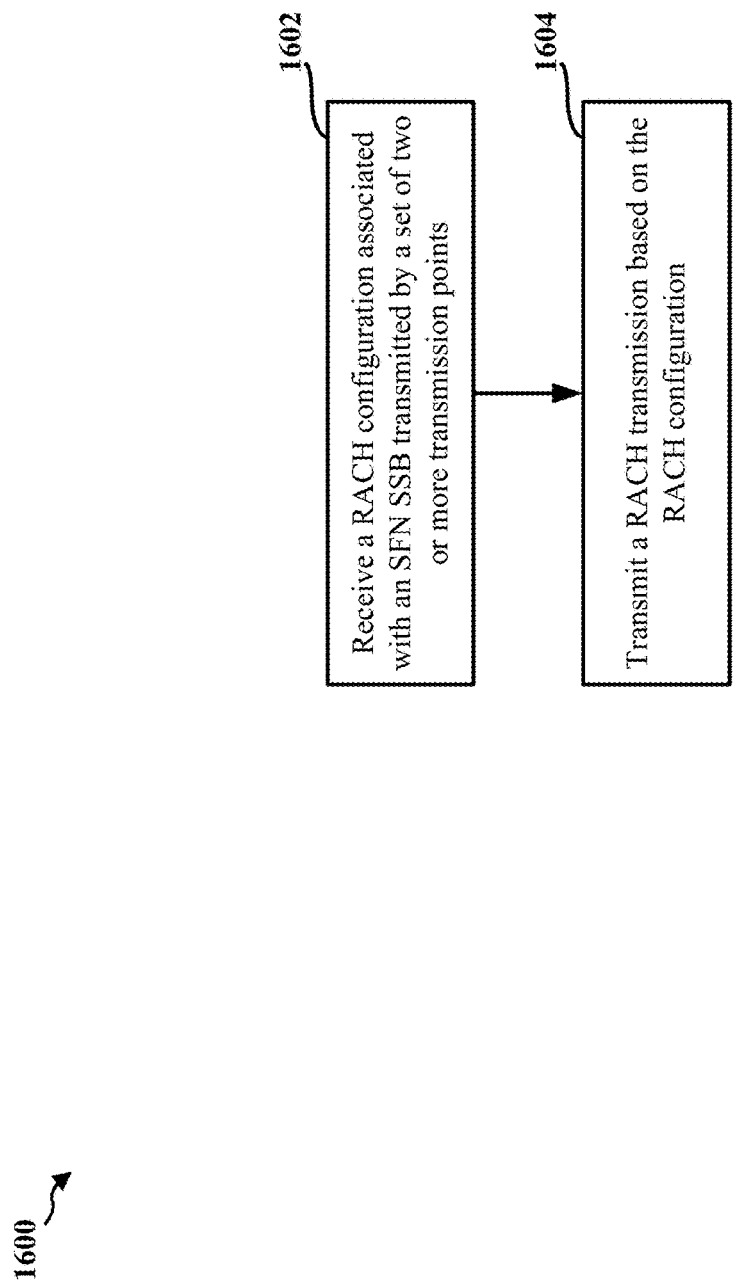
FIG. 16 is a flowchart of a method of wireless communication at a UE, in accordance with the teachings disclosed herein.

FIG. 16 is a flowchart 1600 of a method of wireless communication. The method may be performed by a UE (e.g., the UE 104, the UE 350, and/or an apparatus 2002 of FIG. 20). The method may help enable the UE to perform RACH in a SFN.

At 1602, the UE receives a RACH configuration associated with a SFN synchronization SSB transmitted by a set of two or more base stations configured for SFN communication, as described in connection with the example RACH configuration 1010. The RACH configuration may be associated with the SFN SSB includes one or more parameter that are different than for a non-SFN SSB. The receiving of the RACH configuration, at 1602, may be performed, for example, by a reception component 2030 and/or a RACH configuration component 2050 of the apparatus 2002 of FIG. 20.

At 1604, the UE transmits a RACH transmission based on the RACH configuration, as described in connection with the example RACH transmission 1016 of FIG. 10. For example, the UE may transmit a RACH Msg 1, Msg A, preamble, etc. based on at least one parameter received in the RACH configuration for the SFN SSB(s). The transmitting of the RACH transmission, at 1604, may be performed, for example, by a transmission component 2034 and/or an uplink signal component 2044 of the apparatus 2002 of FIG. 20.

Figure 17:
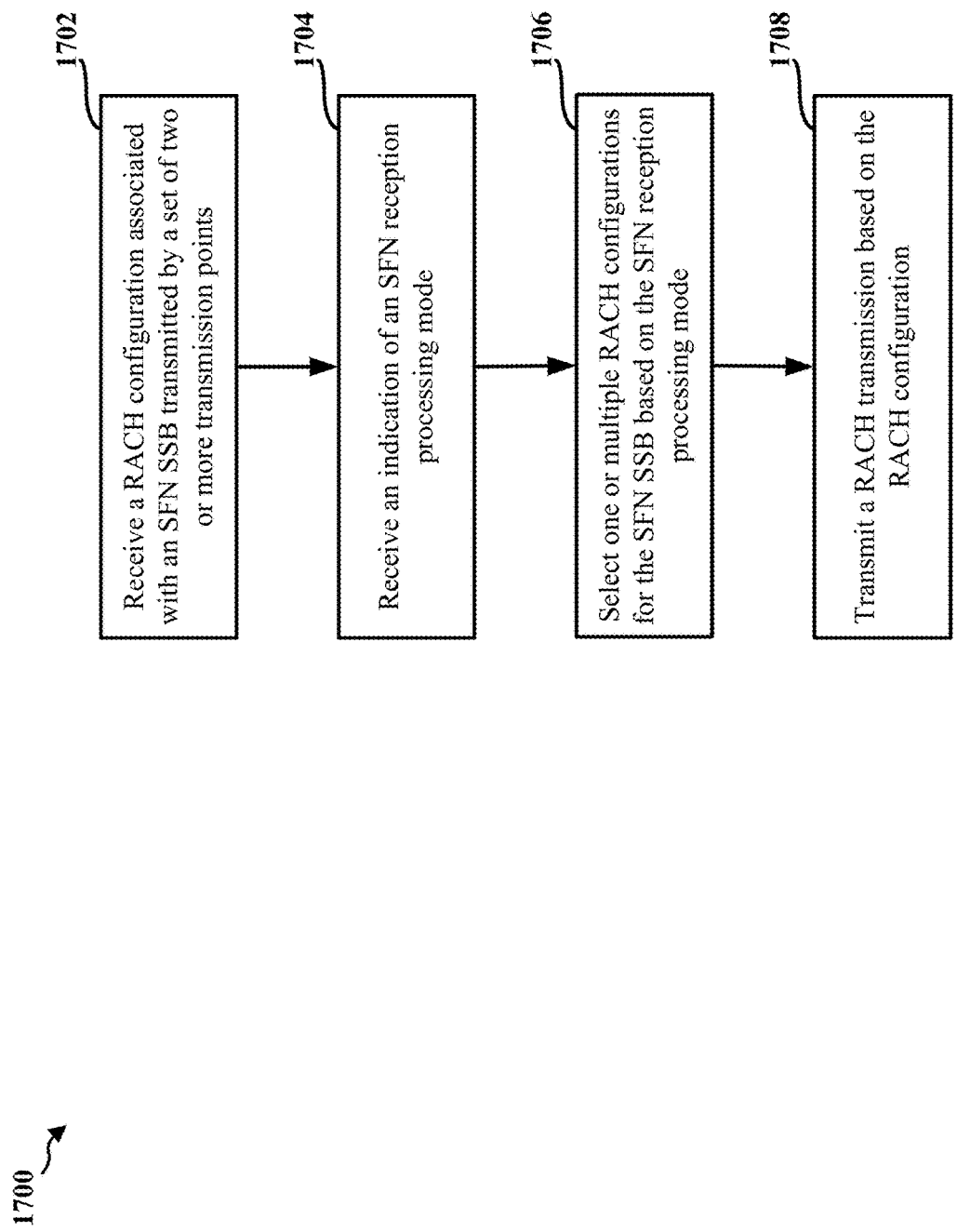
FIG. 17 is a flowchart of a method of wireless communication at a UE, in accordance with the teachings disclosed herein.

FIG. 17 is a flowchart 1700 of a method of wireless communication. The method may be performed by a UE (e.g., the UE 104, the UE 350, and/or an apparatus 2002 of FIG. 20). The method may help enable the UE to perform RACH in a SFN.

At 1702, the UE receives a RACH configuration associated with a SFN synchronization SSB transmitted by a set of two or more base stations configured for SFN communication, as described in connection with the example RACH configuration 1010. The RACH configuration may be associated with the SFN SSB includes one or more parameter that are different than for a non-SFN SSB. The receiving of the RACH configuration, at 1702, may be performed, for example, by a reception component 2030 and/or a RACH configuration component 2050 of the apparatus 2002 of FIG. 20.

At 1708, the UE transmits a RACH transmission based on the RACH configuration, as described in connection with the example RACH transmission 1016 of FIG. 10. For example, the UE may transmit a RACH Msg 1, Msg A, preamble, etc. based on at least one parameter received in the RACH configuration for the SFN SSB(s). The transmitting of the RACH transmission, at 1708, may be performed, for example, by a transmission component 2034 and/or an uplink signal component 2044 of the apparatus 2002 of FIG. 20.

The one or more parameter (e.g., at 1702) may include an RSRP threshold associated with the SFN SSB. For example, the RSRP threshold associated with the SFN SSB may be higher than for the non-SFN SSB. The one or more parameter may include a RACH message A (Msg A) RSRP threshold for the SFN SSB. The one or more parameter may include a target received power for a RACH preamble associated with the SFN SSB. The target received power for the RACH preamble associated with the SFN SSB may be higher than for a non-SFN SSB, for example. The one or more parameter may include a power ramping step associated with the SFN SSB. The power ramping step associated with the SFN SSB may be higher than for a non-SFN SSB, for example. The one or more parameter may include a maximum number of transmissions of a RACH preamble associated with the SFN SSB.

The UE may receive the RACH configuration associated with the SFN SSB in an RRC IE for RACH associated with an SFN. The RRC IE may be different than an RRC IE for non-SFN RACH, for example. In other examples, the UE may receive the RACH configuration associated with the SFN SSB in an RRC IE for RACH parameters for an SFN and a non-SFN.

The UE may receive the RACH configuration associated with the SFN SSB in system information, such as a SIB 1. The UE may receive the RACH configuration associated with the SFN SSB in dedicated signaling, such as RRC signaling, a MAC-CE, and/or DCI, to the UE.

The SFN SSB may be part of an SSB burst set. The UE may receive a common RACH configuration for each SFN SSB in an SFN SSB burst set. The UE may receive a different RACH configuration for each SFN SSB in an SFN SSB burst set.

In some examples, the UE may receive multiple RACH configurations for the SFN SSB, as described in connection with the example first RACH configuration 1010*a*, the example second RACH configuration 1010*b*, and the example n-th RACH configuration 1010*n*. In some examples of the multiple RACH configurations may be associated with a different SFN reception processing mode. For example, the first RACH configuration 1010*a* may be associated with a selective processing mode for the SFN SSB, the second RACH configuration 1010*b* may be associated with a combined processing mode for the SFN SSB, and the n-th RACH configuration 1010*n* may be associated with an independent processing mode.

The UE may determine the applicable RACH configuration associated with the SFN SSB based on the SFN reception processing mode of the base station. For example, at 1704, the UE may receive an indication of an SFN reception processing mode, as described in connection with the example SFN reception processing mode indication 1012 of FIG. 10. The UE may receive an indication from the base station indicating a selective processing mode (e.g., in which the network selects a signal from one of multiple reception points to process an uplink signal from the UE), a combined processing mode (e.g., in which the network combines a received signal from multiple reception points to process an uplink signal from the UE), or an independent processing mode (e.g., in which an uplink signal from the UE is processed with independent baseband processors at different reception points such as TRPs). The reception of the indication of the SFN reception processing mode, 1704 may be performed by the reception component 2030 and/or a mode component 2040 of the apparatus 2002 of FIG. 20.

At 1706, the UE may select one of the multiple RACH configurations for the SFN SSB based on the SFN reception processing mode used by the network, as described in connection with 1014 of FIG. 10. The selecting of the one of the multiple RACH configuration, at 1706, may be performed, for example, by a selection component 2048 of the apparatus 2002 of FIG. 20.

Figure 18:
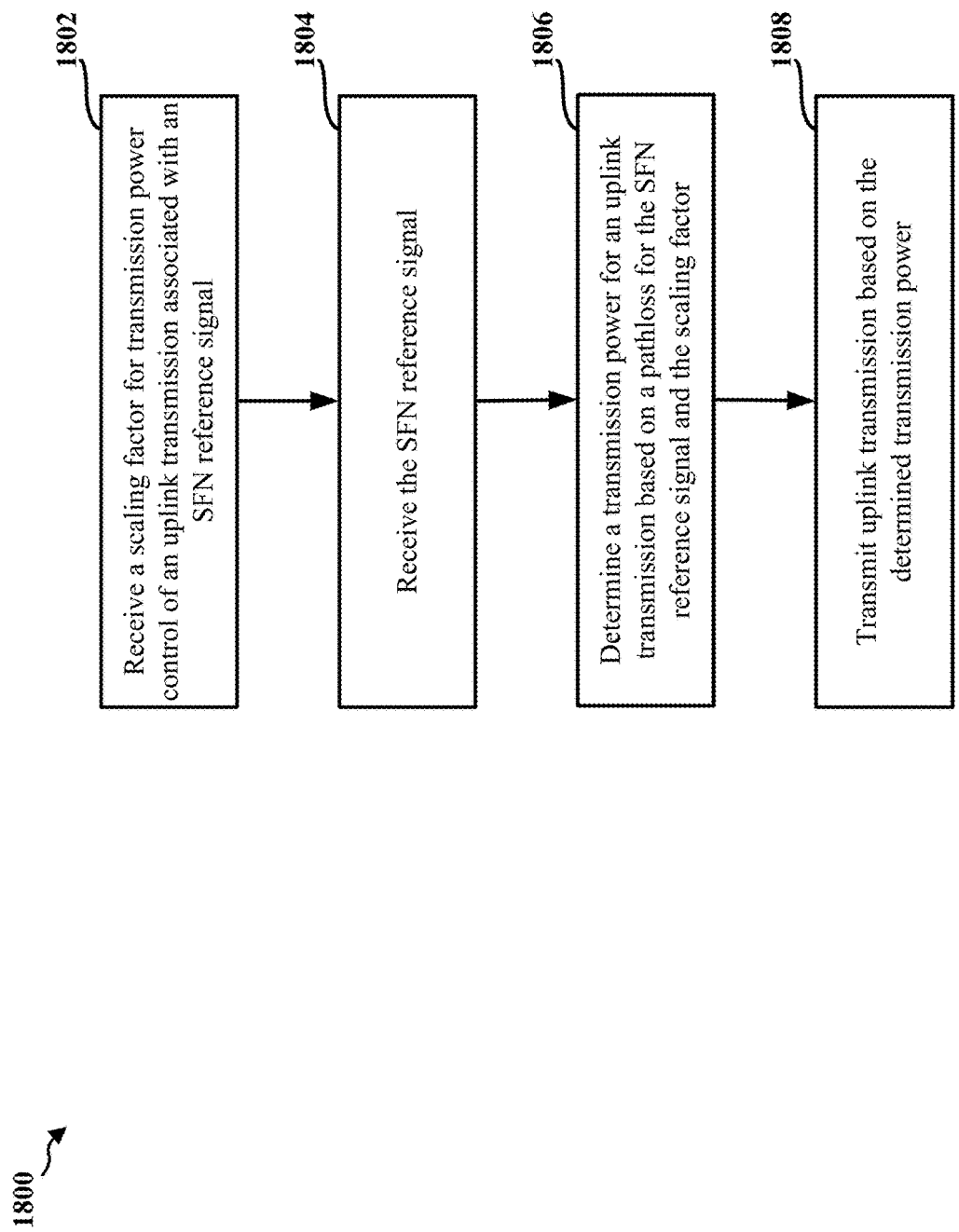
FIG. 18 is a flowchart of a method of wireless communication at a UE, in accordance with the teachings disclosed herein.

FIG. 18 is a flowchart 1800 of a method of wireless communication. The method may be performed by a UE (e.g., the UE 104, the UE 350, and/or an apparatus 2002 of FIG. 20). The method may help enable the UE to determine an improved uplink transmission power for improved reception at a network in an SFN.

At 1802, the UE receives, from a network, a scaling factor for transmission power control of an uplink transmission associated with a SFN reference signal transmitted by a set of two or more base stations configured for SFN communication, as described in connection with the example scaling factor 1212 and/or the example first scaling factor 1212*a* to the n-th scaling factor 1212*n* of FIG. 12. In some examples, the SFN reference signal may be an SFN SSB. The UE may receive the scaling factor in system information, e.g., in a SIB such as SIB 1. The UE may receive the scaling factor in dedicated signaling for the UE comprising one or more of an RRC message, a MAC-CE, or DCI. The receiving of the scaling factor, at 1802, may be performed, for example, by a reception component 2030 and/or a scaling factor component 2052 of the apparatus 2002 of FIG. 20.

At 1804, the UE receives the SFN reference signal, as described in connection with the example SFN reference signal 1216 of FIG. 12. In some examples, the UE may determine a pathloss measurement for the received SFN reference signal. In some examples, the SFN reference signal may be part of a burst set. The UE may receive a different scaling factor for each SFN reference signal in a burst set, e.g., a different scaling factor for each SFN SSB in an SSB burst set. The UE may receive a common scaling factor for each SFN reference signal in a burst set, e.g., a common scaling factor for each SFN SSB in an SSB burst set. The receiving of the SFN reference signal, at 1804, may be performed, for example, by the reception component 2030 and/or an SFN beam component 2042 of the apparatus 2002 of FIG. 20.

At 1806, the UE determines the transmission power for the uplink transmission based on a pathloss measurement for the SFN reference signal and using the scaling factor, as described in connection with 1222 of FIG. 12. In some examples, the pathloss measurement may be based on pathlosses associated with the set of two or more base stations. The determining of the transmission power, at 1806, may be performed, for example, by a power handling component 2054 of the apparatus 2002 of FIG. 20.

In some examples, determining the transmission power of the uplink transmission using the scaling factor may include applying the scaling factor to a pathloss measurement for the SFN reference signal. In some such examples, determining the transmission power (e.g., the PRACH transmission power) using the scaling factor may include applying the scaling factor to a synchronization signal physical broadcast channel block power. In some examples, determining the transmission power may include applying an adjusted scaling factor. For example, the UE may adjust the scaling factor based on a beam width. The UE may adjust the scaling factor based on a number of beams or panels that the UE uses to receive the SFN reference signal. In some examples, applying the adjusted scaling factor may include reducing the scaling factor.

At 1808, the UE transmits the uplink transmission based on the determined transmission power, as described in connection with the example uplink transmission 1224 of FIG. 12. The uplink transmission may include a PRACH. The transmitting of the uplink transmission, at 1808, may be performed, for example, by a transmission component 2034 and/or an uplink signal component 2044 of the apparatus 2002 of FIG. 20.

Figure 19:
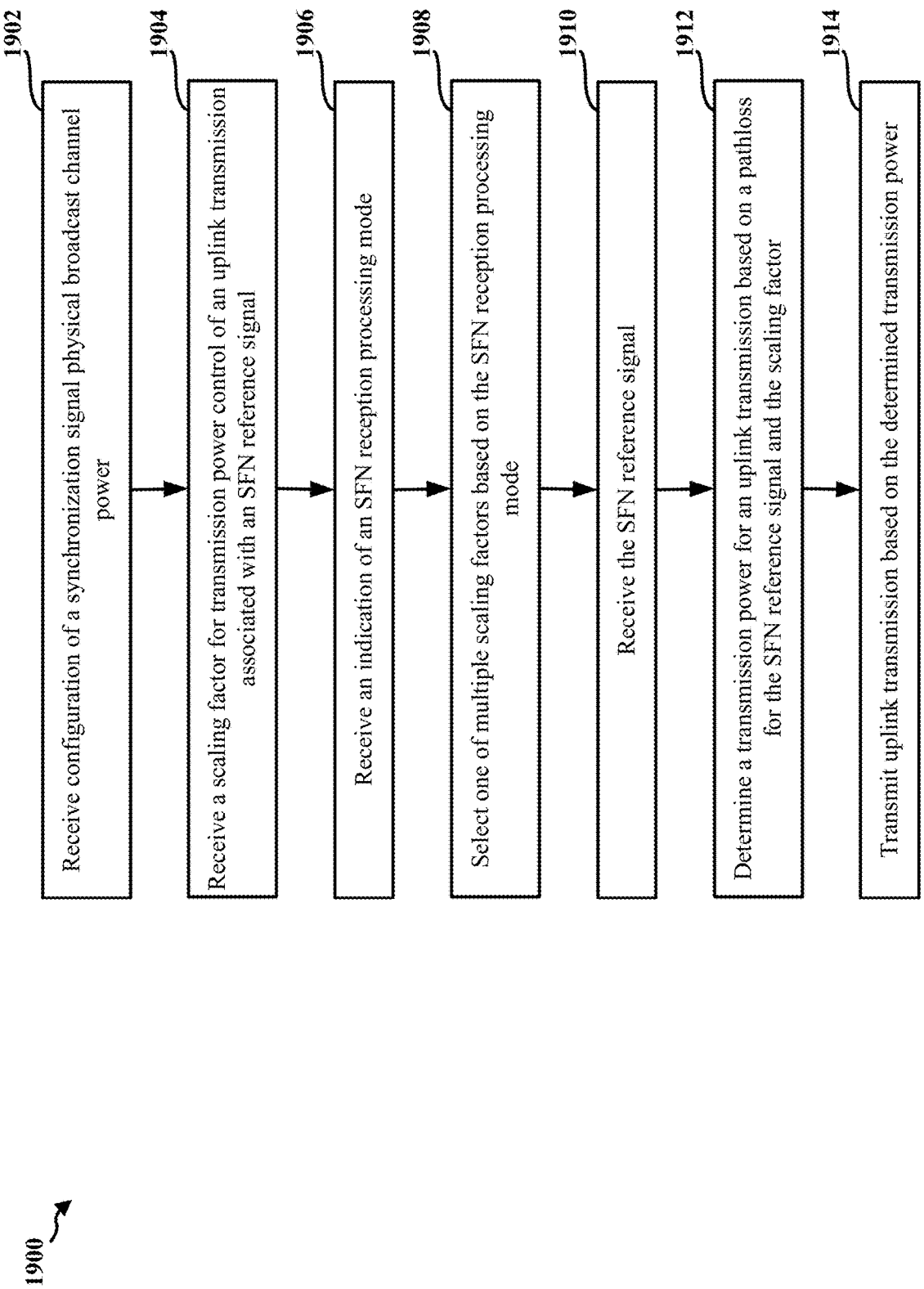
FIG. 19 is a flowchart of a method of wireless communication at a UE, in accordance with the teachings disclosed herein.

FIG. 19 is a flowchart 1900 of a method of wireless communication. The method may be performed by a UE (e.g., the UE 104, the UE 350, and/or an apparatus 2002 of FIG. 20). The method may help enable the UE to determine an improved uplink transmission power for improved reception at a network in an SFN.

At 1904, the UE receives, from a network, a scaling factor for transmission power control of an uplink transmission associated with a SFN reference signal transmitted by a set of two or more base stations configured for SFN communication, as described in connection with the example scaling factor 1212 and/or the example first scaling factor 1212a to the n-th scaling factor 1212n of FIG. 12. In some examples, the SFN reference signal may be an SFN SSB. The UE may receive the scaling factor in system information, e.g., in a SIB such as SIB 1. The UE may receive the scaling factor in dedicated signaling for the UE comprising one or more of an RRC message, a MAC-CE, or DCI. The receiving of the scaling factor, at 1904, may be performed, for example, by a reception component 2030 and/or a scaling factor component 2052 of the apparatus 2002 of FIG. 20.

At 1910, the UE receives the SFN reference signal, as described in connection with the example SFN reference signal 1216 of FIG. 12. In some examples, the UE may determine a pathloss measurement for the received SFN reference signal. The receiving of the SFN reference signal, at 1910, may be performed, for example, by the reception component 2030 and/or an SFN beam component 2042 of the apparatus 2002 of FIG. 20.

At 1912, the UE determines the transmission power for the uplink transmission based on a pathloss measurement for the SFN reference signal and using the scaling factor, as described in connection with 1222 of FIG. 12. In some examples, the pathloss measurement may be based on pathlosses associated with the set of two or more base stations. The determining of the transmission power, at 1912, may be performed, for example, by a power handling component 2054 of the apparatus 2002 of FIG. 20.

In some examples, determining the transmission power of the uplink transmission using the scaling factor may include applying the scaling factor to a pathloss measurement for the SFN reference signal.

In some examples, determining the transmission power may include applying an adjusted scaling factor. For example, the UE may adjust the scaling factor based on a beam width. The UE may adjust the scaling factor based on a number of beams or panels that the UE uses to receive the SFN reference signal. In some examples, applying the adjusted scaling factor may include reducing the scaling factor.

In some examples, at 1902, the UE may receive a configuration of a synchronization signal physical broadcast channel block power (e.g., which may be referred to as "ss-PBCH-BlockPower" or by another name), as described in connection with the example SS PBCH block power configuration 1210 of FIG. 12. In some such examples, determining the transmission power (e.g., the PRACH transmission power) using the scaling factor may include applying the scaling factor to the synchronization signal physical broadcast channel block power. The receiving of the configuration, at 1902, may be performed, for example, by the reception component 2030 and/or the power handling component 2054 of the apparatus 2002 of FIG. 20.

At 1914, the UE transmits the uplink transmission based on the determined transmission power, as described in connection with the example uplink transmission 1224 of FIG. 12. The uplink transmission may include a PRACH. The transmitting of the uplink transmission, at 1914, may be performed, for example, by a transmission component 2034 and/or an uplink signal component 2044 of the apparatus 2002 of FIG. 20.

In some examples, the SFN reference signal may be part of a burst set. The UE may receive a different scaling factor for each SFN reference signal in a burst set, e.g., a different scaling factor for each SFN SSB in an SSB burst set. The UE may receive a common scaling factor for each SFN reference signal in a burst set, e.g., a common scaling factor for each SFN SSB in an SSB burst set.

In some examples, the UE may receive (e.g., at 1904) multiple scaling factors for the SFN reference signal, as described in connection with the first scaling factor 1212a, the second scaling factor 1212b, and the n-th scaling factor 1212n. In some examples, each of the multiple scaling factors may be associated with a different SFN reception processing mode. For example, the first scaling factor 1212a may be associated with a selective processing mode, the second scaling factor 1212b may be associated with a combined processing mode, . . . and the n-th scaling factor 1212n may be associated with an independent processing mode.

As illustrated at 1906, the UE may receive an indication of an SFN reception processing mode, as described in connection with the example SFN reception processing mode indication 1214 of FIG. 12. The UE may receive an indication from the network entity indicating a selective processing mode (e.g., in which the network selects a signal from one of multiple reception points to process an uplink signal from the UE), a combined processing mode (e.g., in which the network combines a received signal from multiple reception points to process an uplink signal from the UE), or an independent processing mode (e.g., in which an uplink signal from the UE is processed with independent baseband processors at different reception points such as TRPs). The reception of the indication of the SFN reception processing mode, at 1906, may be performed, for example, by the reception component 2030 and/or a mode component 2040 of the apparatus 2002 of FIG. 20.

At 1908, the UE may select one of the multiple scaling factors for the SFN SSB based on the SFN reception processing mode as described in connection with 1218 of FIG. 12. The selecting of the one of the multiple scaling factors, at 1908, may be performed, for example, by a selection component 2048 of the apparatus 2002 of FIG. 20.

Figure 20:
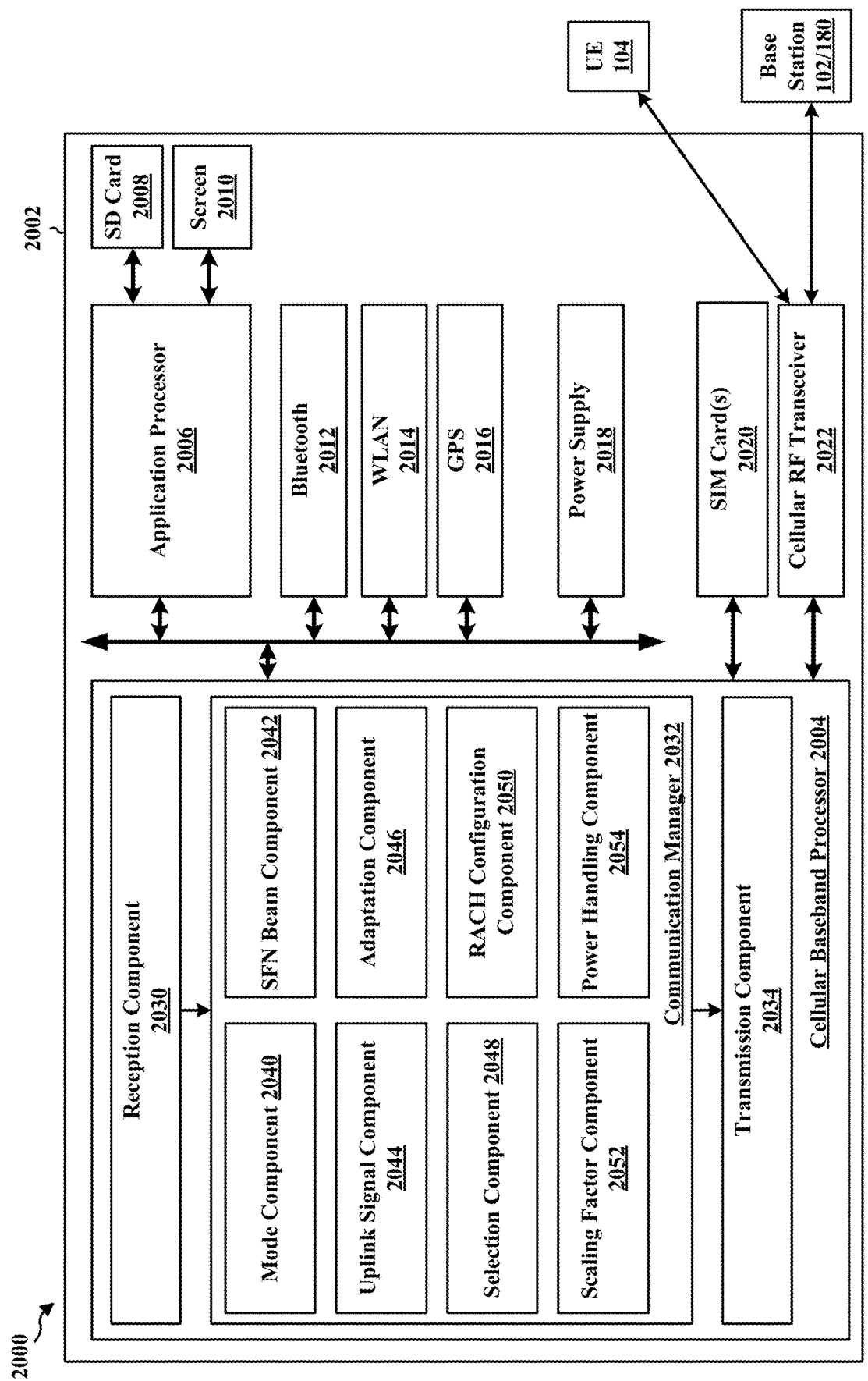
FIG. 20 is a diagram illustrating an example of a hardware implementation for an example apparatus, in accordance with the teachings disclosed herein.

FIG. 20 is a diagram 2000 illustrating an example of a hardware implementation for an apparatus 2002. The apparatus 2002 may be a UE, a component of a UE, or may implement UE functionality. In some aspects, the apparatus 2002 may include a cellular baseband processor 2004 (also referred to as a modem) coupled to a cellular RF transceiver 2022. In some aspects, the apparatus 2002 may further include one or more subscriber identity modules (SIM) cards 2020, an application processor 2006 coupled to a secure digital (SD) card 2008 and a screen 2010, a Bluetooth module 2012, a wireless local area network (WLAN) module 2014, a Global Positioning System (GPS) module 2016, or a power supply 2018. The cellular baseband processor 2004 communicates through the cellular RF transceiver 2022 with the UE 104 and/or base station 102/180. The cellular baseband processor 2004 may include a computer-readable medium/memory. The computer-readable medium/memory may be non-transitory. The cellular baseband processor 2004 is responsible for general processing, including the execution of software stored on the computer-readable medium/memory. The software, when executed by the cellular baseband processor 2004, causes the cellular baseband processor 2004 to perform the various functions described supra. The computer-readable medium/memory may also be used for storing data that is manipulated by the cellular baseband processor 2004 when executing software. The cellular baseband processor 2004 further includes a reception component 2030, a communication manager 2032, and a transmission component 2034. The communication manager 2032 includes the one or more illustrated components. The components within the communication manager 2032 may be stored in the computer-readable medium/memory and/or configured as hardware within the cellular baseband processor 2004. The cellular baseband processor 2004 may be a component of the UE 350 and may include the memory 360 and/or at least one of the TX processor 368, the RX processor 356, and the controller/processor 359. In one configuration, the apparatus 2002 may be a modem chip and include just the cellular baseband processor 2004, and in another configuration, the apparatus 2002 may be the entire UE (e.g., see the UE 350 of FIG. 3) and include the additional modules of the apparatus 2002.

The communication manager 2032 includes a mode component 2040 that is configured to receive an indication of a set of SFN receiver processing modes, for example, as described in connection with 1402 of FIG. 14 and/or 1502 of FIG. 15. The example mode component 2040 may also be configured to receive an indication of an SFN reception processing mode, for example, as described in connection with 1704 of FIG. 17. The example mode component 2040 may also be configured to receive an indication of an SFN reception processing mode, for example, as described in connection with 1906 of FIG. 19.

The communication manager 2032 also includes an SFN beam component 2042 that is configured to receive an SFN-beam that is SFN transmitted by the set of two or more base stations, for example, as described in connection with 1404 of FIG. 14 and/or 1506 of FIG. 15. The example SFN beam component 2042 may also be configured to receive SFN beam indicators identifying transmit beams that are SFN beams among a plurality of beams for downlink transmissions, for example, as described in connection with 1504 of FIG. 15. The example SFN beam component 2042 may also be configured to receive an SFN reference signal, for example, as described in connection with 1804 of FIG. 18 and/or 1910 of FIG. 19.

The communication manager 2032 also includes an uplink signal component 2044 that is configured to transmit an uplink signal to the set of two or more base stations based on the indication and the SFN-beam, for example, as described in connection with 1406 of FIG. 14 and/or 1512 of FIG. 15. The example uplink signal component 2044 may also be configured to transmit a RACH transmission based on the RACH configuration, for example, as described in connection with 1604 of FIG. 16 and/or 1708 of FIG. 17. The example uplink signal component 2044 may also be configured to transmit uplink transmission based on the determined transmission power, for example, as described in connection with 1808 of FIG. 18 and/or 1914 of FIG. 19.

The communication manager 2032 also includes an adaptation component 2046 that is configured to adapt one or more transmit parameters associated with transmitting the uplink signal based on the respective SFN receiver processing mode, for example, as described in connection with 1510 of FIG. 15.

The communication manager 2032 also includes a selection component 2048 that is configured to select an uplink beam based on a measurement of the SFN-beam, for example, as described in connection with 1508 of FIG. 15. The example selection component 2048 may also be configured to select one or multiple RACH configurations for the SFN SSB based on the SFN reception processing mode, for example, as described in connection with 1706 of FIG. 17. The example selection component 2048 may also be configured to select one of multiple scaling factors based on the SFN reception processing mode, for example, as described in connection with 1908 of FIG. 19.

The communication manager 2032 also includes a RACH configuration component 2050 that is configured to receive a RACH configuration associated with an SFN SSB transmitted by a set of two or more transmission points, for example, as described in connection with 1602 of FIG. 16 and/or 1702 of FIG. 17.

The communication manager 2032 also includes a scaling factor component 2052 that is configured to receive a scaling factor for transmission power control of an uplink transmission associated with an SFN reference signal, for example, as described in connection with 1802 of FIG. 18 and/or 1904 of FIG. 19.

The communication manager 2032 also includes a power handling component 2054 that is configured to determine a transmission power for an uplink transmission based on a pathloss for the SFN reference signal and the scaling factor, for example, as described in connection with 1806 of FIG. 18 and/or 1912 of FIG. 19. The example power handling component 2054 may also be configured to receive configuration of a synchronization signal physical broadcast channel power, for example, as described in connection with 1902 of FIG. 19.

The apparatus may include additional components that perform each of the blocks of the algorithm in the flowcharts of FIGS. 13 to 19. As such, each block in the flowcharts of FIGS. 13 to 19 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 2002 may include a variety of components configured for various functions. In one configuration, the apparatus 2002, and in particular the cellular baseband processor 2004, includes means for receiving an indication of different SFN receiver processing modes. The example apparatus 2002 also includes means for receiving an indication of different RACH configurations for SFN. The example apparatus 2002 also includes means for receiving an indication of modified power control factors for SFN.

In another configuration, the example apparatus 2002 also includes means for receiving an indication of a set of SFN receiver processing modes supported by a set of two or more base stations configured for SFN communication. The example apparatus 2002 also includes means for receiving an SFN-beam that is SFN transmitted by the set of two or more base stations. The example apparatus 2002 also includes means for transmitting an uplink signal to the set of two or more base stations based on the indication and the SFN-beam.

In another configuration, the example apparatus 2002 also includes means for selecting an uplink beam based on a measurement of the SFN-beam.

In another configuration, the example apparatus 2002 also includes means for receiving SFN-beam indicators identifying transmit beams that are SFN-beams.

In another configuration, the example apparatus 2002 also includes means for adapting one or more transmit parameters associated with transmitting the uplink signal based on the respective SFN receiver processing mode.

In another configuration, the example apparatus 2002 also includes means for receiving a RACH configuration associated with a SFN SSB transmitted by a set of two or more base stations configured for SFN communication. The example apparatus 2002 also includes means for transmitting a RACH transmission based on the RACH configuration.

In another configuration, the example apparatus 2002 also includes means for receiving an indication of an SFN reception processing mode. The example apparatus 2002 also includes means for selecting one of the multiple RACH configurations for the SFN SSB based on the SFN reception processing mode.

In another configuration, the example apparatus 2002 also includes means for receiving, from a network, a scaling factor for transmission power control of an uplink transmission associated with a SFN reference signal transmitted by a set of two or more base stations configured for SFN communication. The example apparatus 2002 also includes means for receiving the SFN reference signal. The example apparatus 2002 also includes means for determining the transmission power for the uplink transmission based on a pathloss measurement for the SFN reference signal and using the scaling factor. The example apparatus 2002 also includes means for transmitting the uplink transmission based on the determined transmission power.

In another configuration, the example apparatus 2002 also includes means for receiving an indication of an SFN reception processing mode. The example apparatus 2002 also includes means for selecting one of the multiple scaling factors for the SFN reference signal based on the SFN reception processing mode.

In another configuration, the example apparatus 2002 also includes means for receiving a configuration of a synchronization signal physical broadcast channel block power.

The means may be one or more of the components of the apparatus 2002 configured to perform the functions recited by the means. As described supra, the apparatus 2002 may include the TX processor 368, the RX processor 356, and the controller/processor 359. As such, in one configuration, the means may be the TX processor 368, the RX processor 356, and the controller/processor 359 configured to perform the functions recited by the means.

Figure 21:
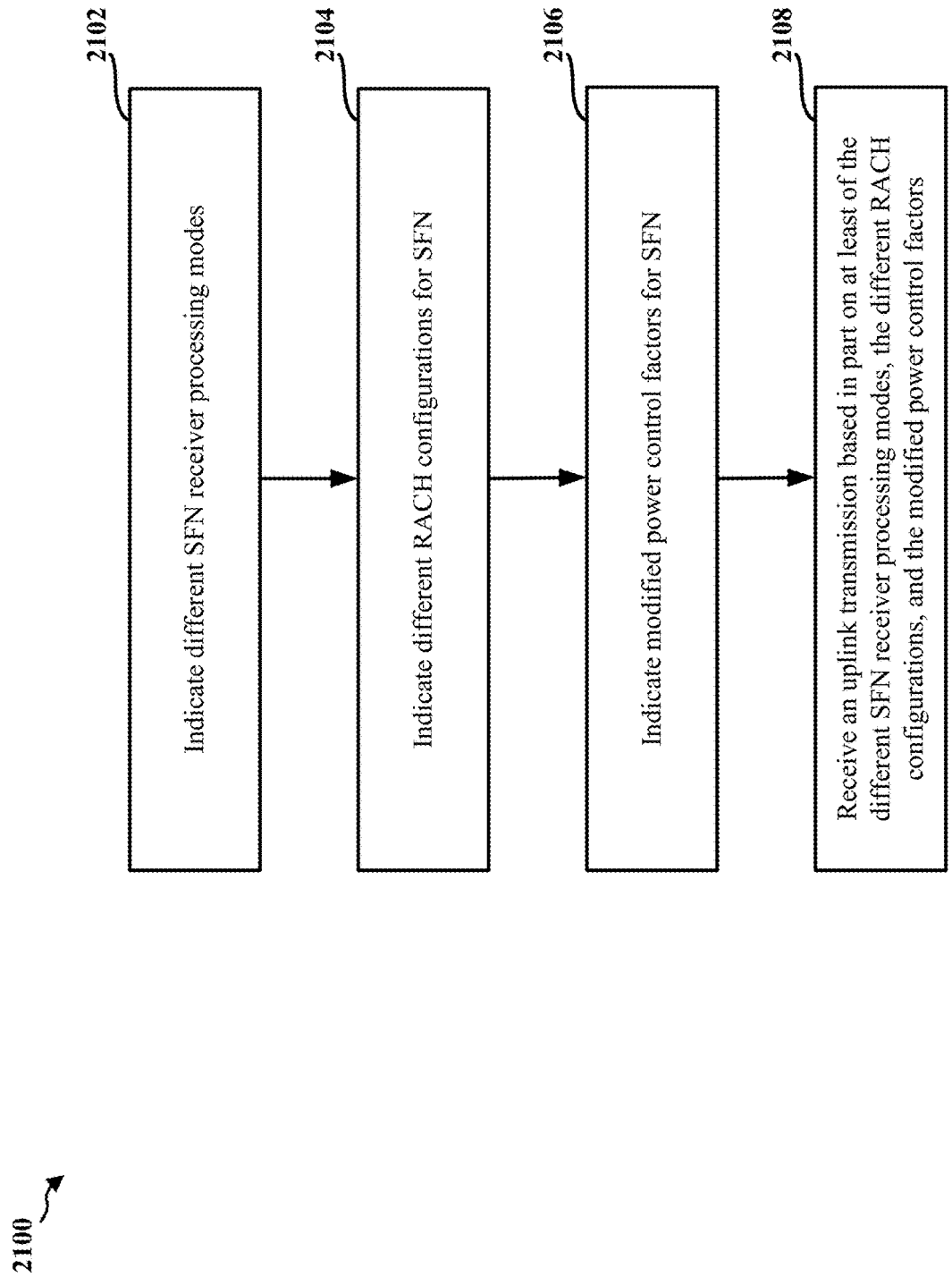
FIG. 21 is a flowchart of a method of wireless communication at a network entity, in accordance with the teachings disclosed herein.

FIG. 21 is a flowchart 2100 of a method of wireless communication. The method may be performed by a network entity, such as a base station (e.g., the base station 102/180, the base station 310, and/or an apparatus 2802 of FIG. 28). The method may enable the network entity to improve uplink SFN reception based on multiple base stations.

At 2102, the network entity indicates different SFN receiver processing modes, as described in connection with the example indication 910 of FIG. 9. For example, an indication of a set of SFN receiver processing modes may identify at least one SFN receiver processing mode supported by the network entity. Aspects of indicating the different SFN receiver processing modes are described in connection with FIG. 9, FIG. 22, and FIG. 23. The set of SFN receiver processing modes include, e.g., at least one of a selective processing mode (e.g., as described in connection with FIG. 6), a combined processing mode (e.g., as described in connection with FIG. 7), and an independent processing mode (e.g., as described in connection FIG. 8).

At 2104, the network entity indicates different RACH configurations for SFN, as described in connection with the example RACH configuration 1010 of FIG. 10. Aspects of indicating the different RACH configurations for SFN are described in connection with FIG. 10, FIG. 24, and FIG. 25.

At 2106, the network entity indicates modified power control factors for SFN, as described in connection with the example scaling factor 1212 of FIG. 12. Aspects of indicating the modified power control factors are described in connection with FIG. 12, FIG. 26, and FIG. 27.

At 2108, the network entity receives an uplink transmission based in part on at least one of the different SFN receiver processing modes, the different RACH configurations, and the modified power control factors, as described in connection with the example SFN-based uplink signal 920 of FIG. 9, the example RACH transmission 1016 of FIG. 10, and/or the example uplink transmission 1224 of FIG. 12.

Figure 22:
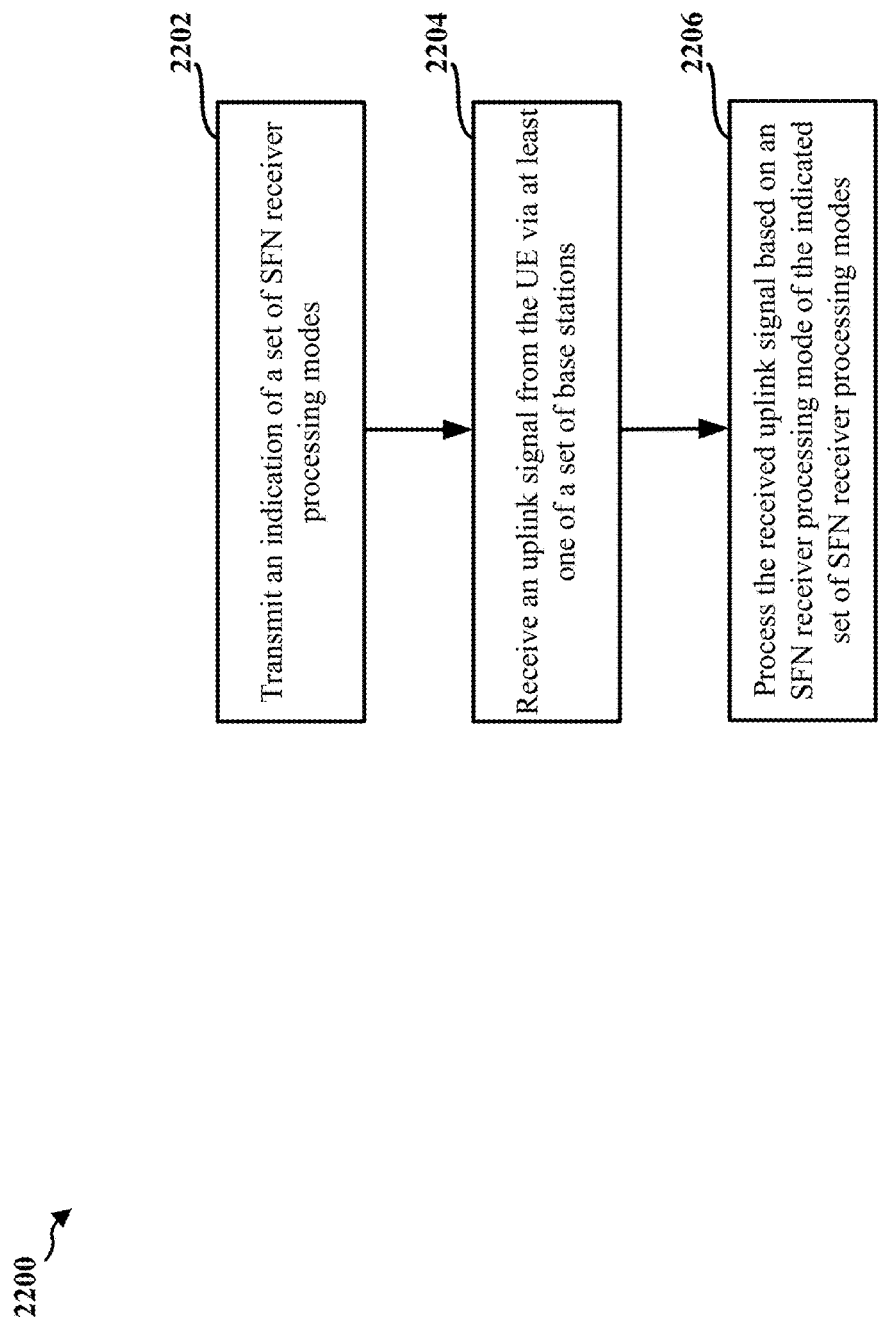
FIG. 22 is a flowchart of a method of wireless communication at a network entity, in accordance with the teachings disclosed herein.

FIG. 22 is a flowchart 2200 of a method of wireless communication. The method may be performed by a network entity, such as a base station (e.g., the base station 102/180, the base station 310, and/or an apparatus 2802 of FIG. 28). For example, the method may be performed by a central baseband processing component for a set of base stations. The method may be performed by a processing component of a TRP in a set of TRPs, in some examples. The method may be performed by a network entity associated with a set of base stations. The method may enable the network entity to improve uplink SFN reception based on multiple base stations.

At 2202, the network entity transmits, to a UE, an indication of a set of SFN receiver processing modes, as described in connection with the indication 910 of FIG. 9. The network entity is associated with a set of two or more base stations configured for SFN communication. The network entity may transmit the indication using at least one of system information (e.g., a SIB), RRC signaling, a MAC-CE, and L1 signaling. The transmitting of the indication, at 2202, may be performed, for example, by a mode component 2842 of the apparatus 2802 of FIG. 28.

In some examples, the indication of the set of SFN receiver processing modes identifies at least one SFN receiver processing mode supported by the network entity. In some examples, the set of two or more base stations may be capable of supporting the indicated SFN receiver processing modes. In some examples, the set of two or more base stations may include a first TRP and a second TRP. In some examples, the set of two or more base stations may include a first RRH and a second RRH. In some examples, the set of two or more base stations may include at least one TRP and at least one RRH.

In some examples, the indication of the set of SFN receiver processing modes may identify at least one SFN receiver processing mode supported by the network entity.

The set of SFN receiver processing modes include, e.g., at least one of a selective processing mode (e.g., as described in connection with FIG. 6), a combined processing mode (e.g., as described in connection with FIG. 7), and an independent processing mode (e.g., as described in connection FIG. 8).

At 2204, the network entity receives an uplink signal from the UE via at least one of the base stations, as described in connection with the example SFN-based uplink signal 920 of FIG. 9. The uplink signal may comprise at least one of a PRACH, a PUCCH, a PUSCH, and an SRS. The receiving of the uplink signal, at 2204, may be performed by an uplink signal component 2844 of the apparatus 2802 of FIG. 28.

At 2206, the network entity processes the received uplink signal based on an SFN receiver processing mode of the indicated set of SFN receiver processing modes, as described in connection with 924 of FIG. 9. The processing of the uplink signal, at 2206, may be performed, for example, by an SFN receive process component 2846 of the apparatus 2802 of FIG. 28.

Figure 23:
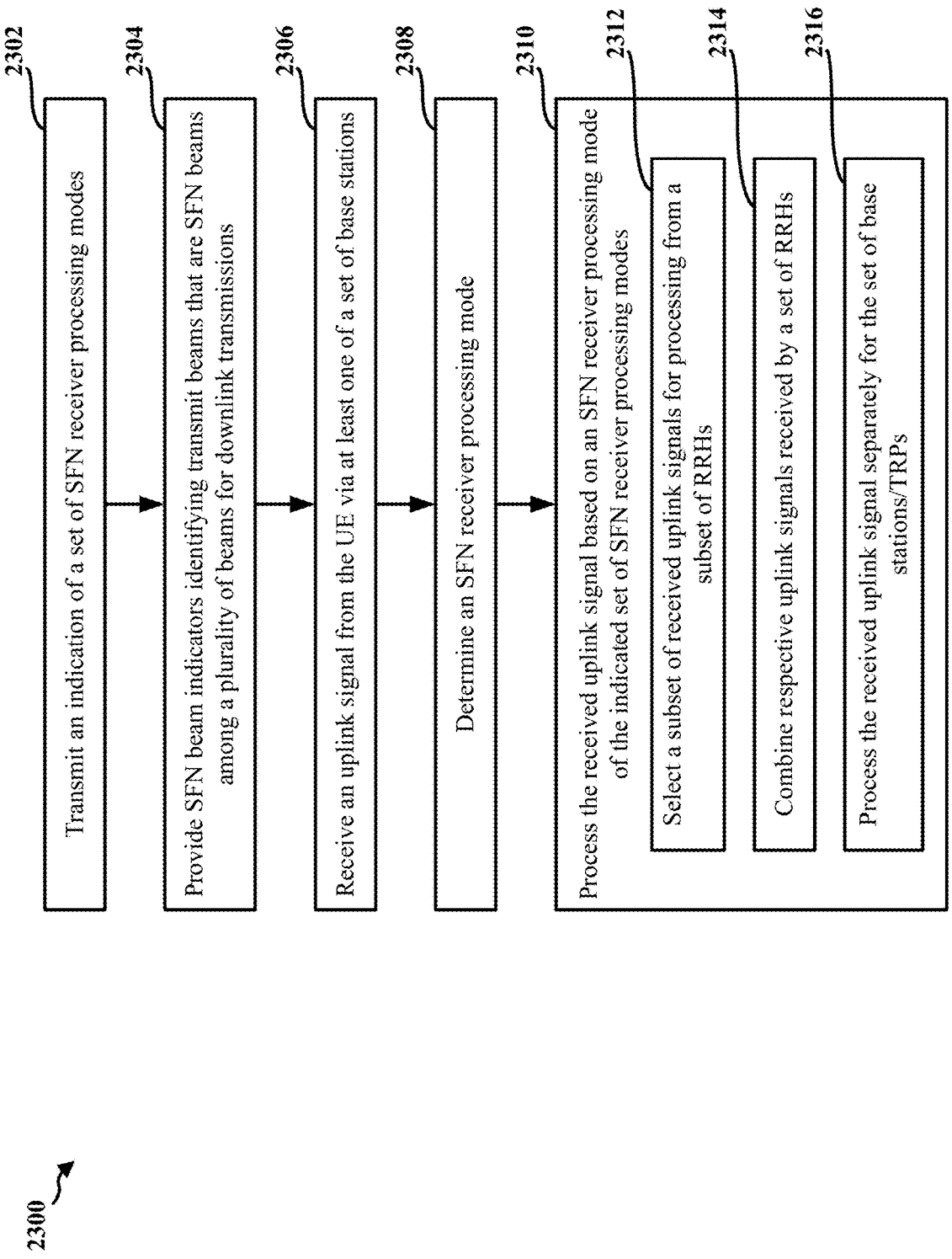
FIG. 23 is a flowchart of a method of wireless communication at a network entity, in accordance with the teachings disclosed herein.

FIG. 23 is a flowchart 2300 of a method of wireless communication. The method may be performed by a network entity, such as a base station (e.g., the base station 102/180, the base station 310, and/or an apparatus 2802 of FIG. 28). For example, the method may be performed by a central baseband processing component for a set of base stations. The method may be performed by a processing component of a TRP in a set of TRPs, in some examples. The method may be performed by a network entity associated with a set of base stations. The method may enable the base station to improve uplink SFN reception based on multiple base stations.

At 2302, the network entity transmits, to a UE, an indication of a set of SFN receiver processing modes, as described in connection with the indication 910 of FIG. 9. The network entity is associated with a set of two or more base stations configured for SFN communication. The network entity may transmit the indication using at least one of system information (e.g., a SIB), RRC signaling, a MAC-CE, and L1 signaling. The transmitting of the indication, at 2302, may be performed, for example, by a mode component 2842 of the apparatus 2802 of FIG. 28.

In some examples, the indication of the set of SFN receiver processing modes identifies at least one SFN receiver processing mode supported by the network entity. In some examples, the set of two or more base stations may be capable of supporting the indicated SFN receiver processing modes. In some examples, the set of two or more base stations may include a first TRP and a second TRP. In some examples, the set of two or more base stations may include a first RRH and a second RRH. In some examples, the set of two or more base stations may include at least one TRP and at least one RRH.

In some examples, the indication of the set of SFN receiver processing modes may identify at least one SFN receiver processing mode supported by the network entity. The set of SFN receiver processing modes include, e.g., at least one of a selective processing mode (e.g., as described in connection with FIG. 6), a combined processing mode (e.g., as described in connection with FIG. 6), and an independent processing mode (e.g., as described in connection FIG. 8).

As illustrated at 2304, the network entity may provide SFN-beam indictors identifying transmit beams that are SFN-beams among a plurality of beams for downlink transmission, as described in connection with the example SFN beam indicators 912 of FIG. 9. The indication may map a respective SFN receiver processing mode of the set of SFN receiver processing modes to a corresponding SFN-beam, e.g., in order to provide particular receiver processing mode to SFN beam pairings. The providing of the SFN-beam indicators, at 2304, may be performed, for example, by an SFN beam indication component 2840 of the apparatus 2802 of FIG. 28.

At 2306, the network entity receives an uplink signal from the UE via at least one of the base stations, as described in connection with the example SFN-based uplink signal 920 of FIG. 9. The uplink signal may comprise at least one of a PRACH, a PUCCH, a PUSCH, and an SRS. The receiving of the uplink signal, at 2306, may be performed by an uplink signal component 2844 of the apparatus 2802 of FIG. 28.

As illustrated at 2308, the network entity may determine the SFN receiver processing mode to process the received uplink signal, as described in connection with 922 of FIG. 9. For example, the network entity may determine the SFN receiver processing mode to apply based on at least one of an instantaneous receiver power of the uplink signal, a receiver power delta across the set of two or more base stations, an uplink channel associated with the uplink signal, an average receiver power, cell loading, and interference conditions. The determining of the SFN receiver processing mode, at 2308, may be performed, for example, by an SFN reception mode determination component 2848 of the apparatus 2802 of FIG. 28.

At 2310, the network entity processes the received uplink signal based on an SFN receiver processing mode of the indicated set of SFN receiver processing modes, as described in connection with 924 of FIG. 9. The processing of the uplink signal, at 2310, may be performed, for example, by an SFN receive process component 2846 of the apparatus 2802 of FIG. 28.

In some examples, the set of two or more base stations may include a set of RRHs, and the SFN receiver processing mode may be based on a selective processing mode. At 2312, the network entity may select a subset of received uplink signals for processing from a subset of the RRHs, wherein the network entity processes the selected subset of the received uplink signals. The subset of the RRHs may be selected based on at least one of a configuration or a criterion associated with the received uplink signals. As an example, the processing of the received uplink signal (e.g., at 2310) may include performing PRACH preamble detection based on the selected subset of the received uplink signals.

In some examples, the set of two or more base stations may comprise a set of RRHs and the network entity may process the uplink signals using a combined processing mode. For example, at 2314, the network entity may combine respective uplink signals received by the set of RRHs as a part of the processing of the uplink signals (e.g., at 2310). For example, the network entity may combine the respective uplink signals based on a combining scheme. The combining scheme may include, e.g., any of equal gain combining, a maximal ratio combining (MRC), etc. For example, the uplink signal may include a PRACH preamble, and the processing the received uplink signal (e.g., at 2310) may include performing PRACH preamble detection based on the combined respective uplink signals.

In some examples, the set of two or more base stations may include a set of TRPs, and the network entity may process the uplink transmission independently for each of the TRPs. For example, the uplink transmission may include a PRACH preamble, and the network entity may perform PRACH preamble detection using the received uplink signal from a single TRP. The received uplink signal may be processed separately for the set of TRPs, e.g., as illustrated at 2316. The received uplink signal (e.g., at 2306) may be considered successfully received when at least one of the TRPs successfully detects a PRACH preamble.

Figure 24:
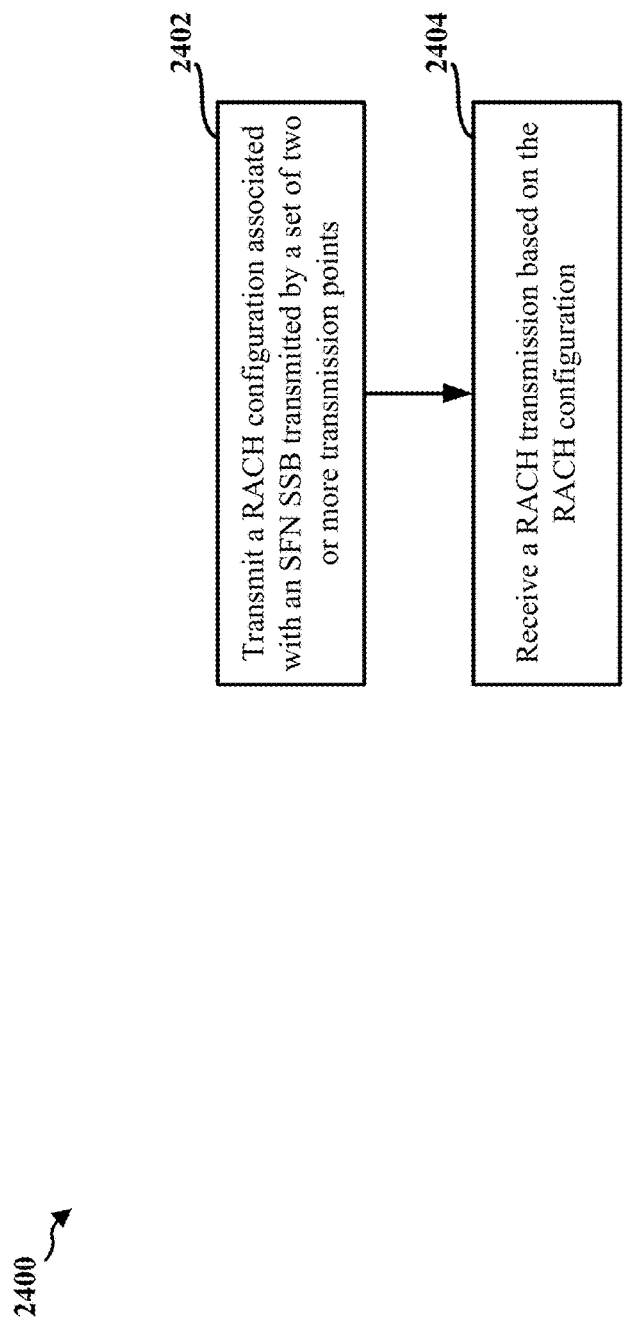
FIG. 24 is a flowchart of a method of wireless communication at a network entity, in accordance with the teachings disclosed herein.

FIG. 24 is a flowchart 2400 of a method of wireless communication. The method may be performed by a network entity, such as a base station (e.g., the base station 102/180, the base station 310, and/or an apparatus 2802 of FIG. 28). The method may help improve random access with a UE in an SFN.

At 2402, the network entity transmits, to a UE, a RACH configuration associated with an SFN SSB transmitted by a set of two or more base stations configured for SFN communication, as described in connection with the example RACH configuration 1010 and/or the example first RACH configuration 1010a to the n-th RACH configuration 1010n of FIG. 10. The RACH configuration may be associated with the SFN SSB includes one or more parameter that are different than for a non-SFN SSB. The transmitting of the RACH configuration, at 2402, may be performed, for example, by a transmission component 2834 and/or a RACH configuration component 2850 of the apparatus 2802 of FIG. 28.

In some examples, the one or more parameter may include an RSRP threshold associated with the SFN SSB. For example, the RSRP threshold associated with the SFN SSB may be higher than for the non-SFN SSB. The one or more parameter may include a RACH message A (Msg A) RSRP threshold for the SFN SSB. The one or more parameter may include a target received power for a RACH preamble associated with the SFN SSB. The target received power for the RACH preamble associated with the SFN SSB may be higher than for a non-SFN SSB, for example. The one or more parameter may include a power ramping step associated with the SFN SSB. The power ramping step associated with the SFN SSB may be higher than for a non-SFN SSB, for example. The one or more parameter may include a maximum number of transmissions of a RACH preamble associated with the SFN SSB.

The network entity may transmit the RACH configuration associated with the SFN SSB in an RRC IE for RACH associated with an SFN. The RRC IE may be different than an RRC IE for non-SFN RACH, for example. In other examples, the network entity may transmit the RACH configuration associated with the SFN SSB in an RRC IE for RACH parameters for an SFN and a non-SFN.

The network entity may transmit the RACH configuration associated with the SFN SSB in system information, such as a SIB1. The network entity may transmit the RACH configuration associated with the SFN SSB in dedicated signaling, such as in dedicated RRC signaling to the UE.

The SFN SSB may be part of an SSB burst set. The network entity may transmit a common RACH configuration for each SFN SSB in an SFN SSB burst set. The network entity may transmit a different RACH configuration for each SFN SSB in an SFN SSB burst set.

In some examples, the network entity may transmit multiple RACH configurations for the SFN SSB, each of the multiple RACH configurations being associated with a different SFN reception processing mode. The network entity may provide reception processing mode information to the UE so that the UE may determine the applicable RACH configuration associated with the SFN SSB based on the SFN reception processing mode of the network entity. The network entity may transmit an indication to the UE indicating a selective processing mode (e.g., in which the network selects a signal from one of multiple reception points to process an uplink signal from the UE), a combined processing mode (e.g., in which the network combines a received signal from multiple reception points to process an uplink signal from the UE), or an independent processing mode (e.g., in which an uplink signal from the UE is processed with independent baseband processors at different reception points such as TRPs).

At 2404, the network entity receives a RACH transmission from the UE based on the RACH configuration, as described in connection with the example RACH transmission 1016 of FIG. 10. For example, the network entity may receive a RACH Msg 1, Msg A, preamble, etc. based on at least one parameter received in the RACH configuration for the SFN SSB(s). The receiving of the RACH transmission, at 2404, may be performed, for example, by a reception component 2830 and/or an uplink signal component 2844 of the apparatus 2802 of FIG. 28.

Figure 25:
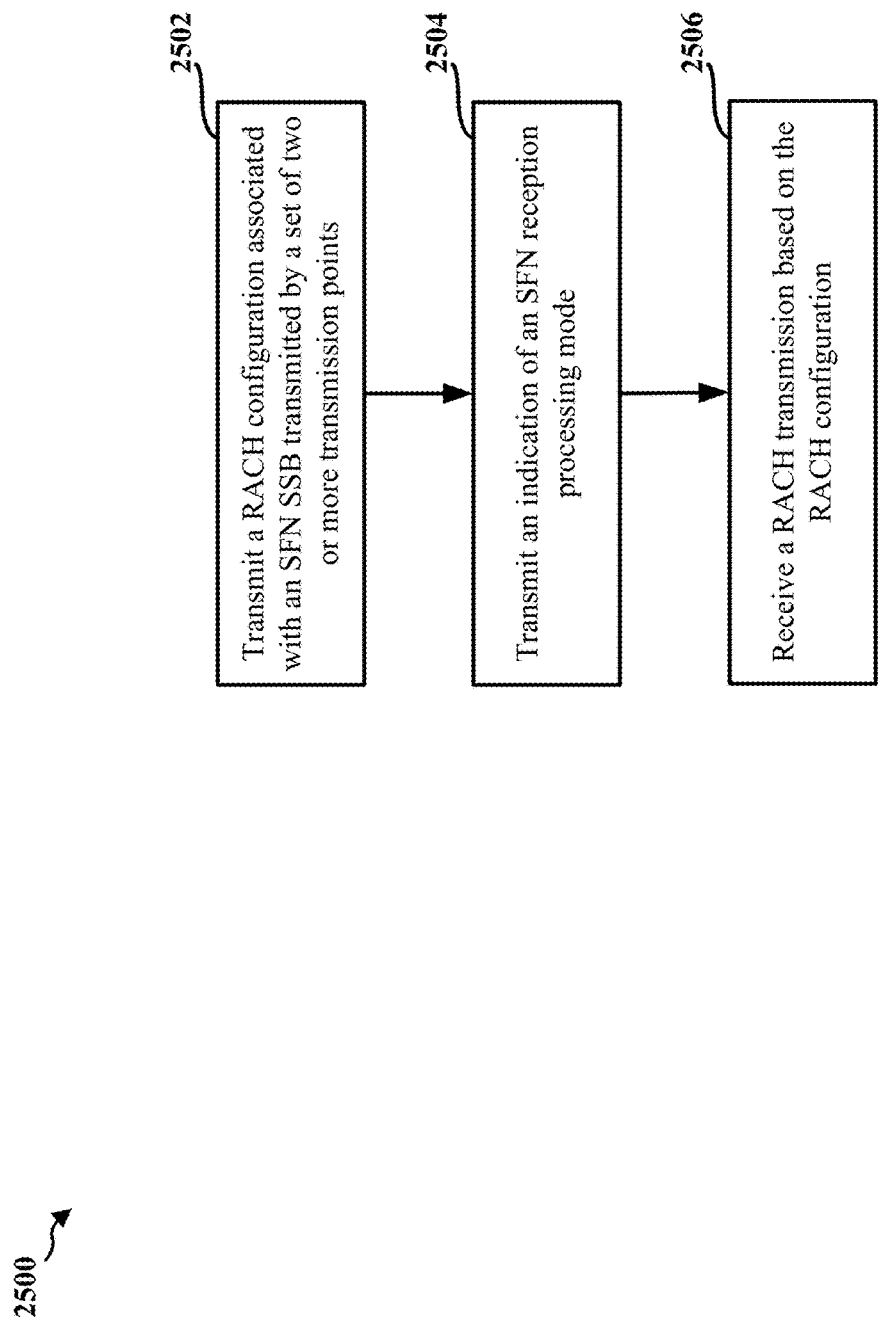
FIG. 25 is a flowchart of a method of wireless communication at a network entity, in accordance with the teachings disclosed herein.

FIG. 25 is a flowchart 2500 of a method of wireless communication. The method may be performed by a network entity, such as a base station (e.g., the base station 102/180, the base station 310, and/or an apparatus 2802 of FIG. 28). The method may help improve random access with a UE in an SFN.

At 2502, the network entity transmits, to a UE, a RACH configuration associated with an SFN SSB transmitted by a set of two or more base stations configured for SFN communication, as described in connection with the example RACH configuration 1010 and/or the example first RACH configuration 1010a to the n-th RACH configuration 1010n of FIG. 10. The RACH configuration may be associated with the SFN SSB includes one or more parameter that are different than for a non-SFN SSB. The transmitting of the RACH configuration, at 2502, may be performed, for example, by a transmission component 2834 and/or a RACH configuration component 2850 of the apparatus 2802 of FIG. 28.

In some examples, the one or more parameter may include an RSRP threshold associated with the SFN SSB. For example, the RSRP threshold associated with the SFN SSB may be higher than for the non-SFN SSB. The one or more parameter may include a RACH message A (Msg A) RSRP threshold for the SFN SSB. The one or more parameter may include a target received power for a RACH preamble associated with the SFN SSB. The target received power for the RACH preamble associated with the SFN SSB may be higher than for a non-SFN SSB, for example. The one or more parameter may include a power ramping step associated with the SFN SSB. The power ramping step associated with the SFN SSB may be higher than for a non-SFN SSB, for example. The one or more parameter may include a maximum number of transmissions of a RACH preamble associated with the SFN SSB.

The network entity may transmit the RACH configuration associated with the SFN SSB in an RRC IE for RACH associated with an SFN. The RRC IE may be different than an RRC IE for non-SFN RACH, for example. In other examples, the network entity may transmit the RACH configuration associated with the SFN SSB in an RRC IE for RACH parameters for an SFN and a non-SFN.

The network entity may transmit the RACH configuration associated with the SFN SSB in system information, such as a SIB1. The network entity may transmit the RACH configuration associated with the SFN SSB in dedicated signaling, such as in dedicated RRC signaling to the UE.

The SFN SSB may be part of an SSB burst set. The network entity may transmit a common RACH configuration for each SFN SSB in an SFN SSB burst set. The network entity may transmit a different RACH configuration for each SFN SSB in an SFN SSB burst set.

In some examples, the network entity may transmit multiple RACH configurations for the SFN SSB, each of the multiple RACH configurations being associated with a different SFN reception processing mode. The network entity may provide reception processing mode information to the UE so that the UE may determine the applicable RACH configuration associated with the SFN SSB based on the SFN reception processing mode of the network entity. For example, at 2504, the network entity may transmit an indication of an SFN reception processing mode, as described in connection with the example SFN reception processing mode indication 1012 of FIG. 10. The transmitting of the SFN reception processing mode, at 2504, may be performed, for example, by the transmission component 2834 and/or a mode component 2842 of the apparatus 2802 of FIG. 28.

The network entity may transmit an indication to the UE indicating a selective processing mode (e.g., in which the network selects a signal from one of multiple reception points to process an uplink signal from the UE), a combined processing mode (e.g., in which the network combines a received signal from multiple reception points to process an uplink signal from the UE), or an independent processing mode (e.g., in which an uplink signal from the UE is processed with independent baseband processors at different reception points such as TRPs).

At 2506, the network entity receives a RACH transmission from the UE based on the RACH configuration, as described in connection with the example RACH transmission 1016 of FIG. 10. For example, the network entity may receive a RACH Msg 1, Msg A, preamble, etc. based on at least one parameter received in the RACH configuration for the SFN SSB(s). The receiving of the RACH transmission, at 2506, may be performed, for example, by a reception component 2830 and/or an uplink signal component 2844 of the apparatus 2802 of FIG. 28.

Figure 26:
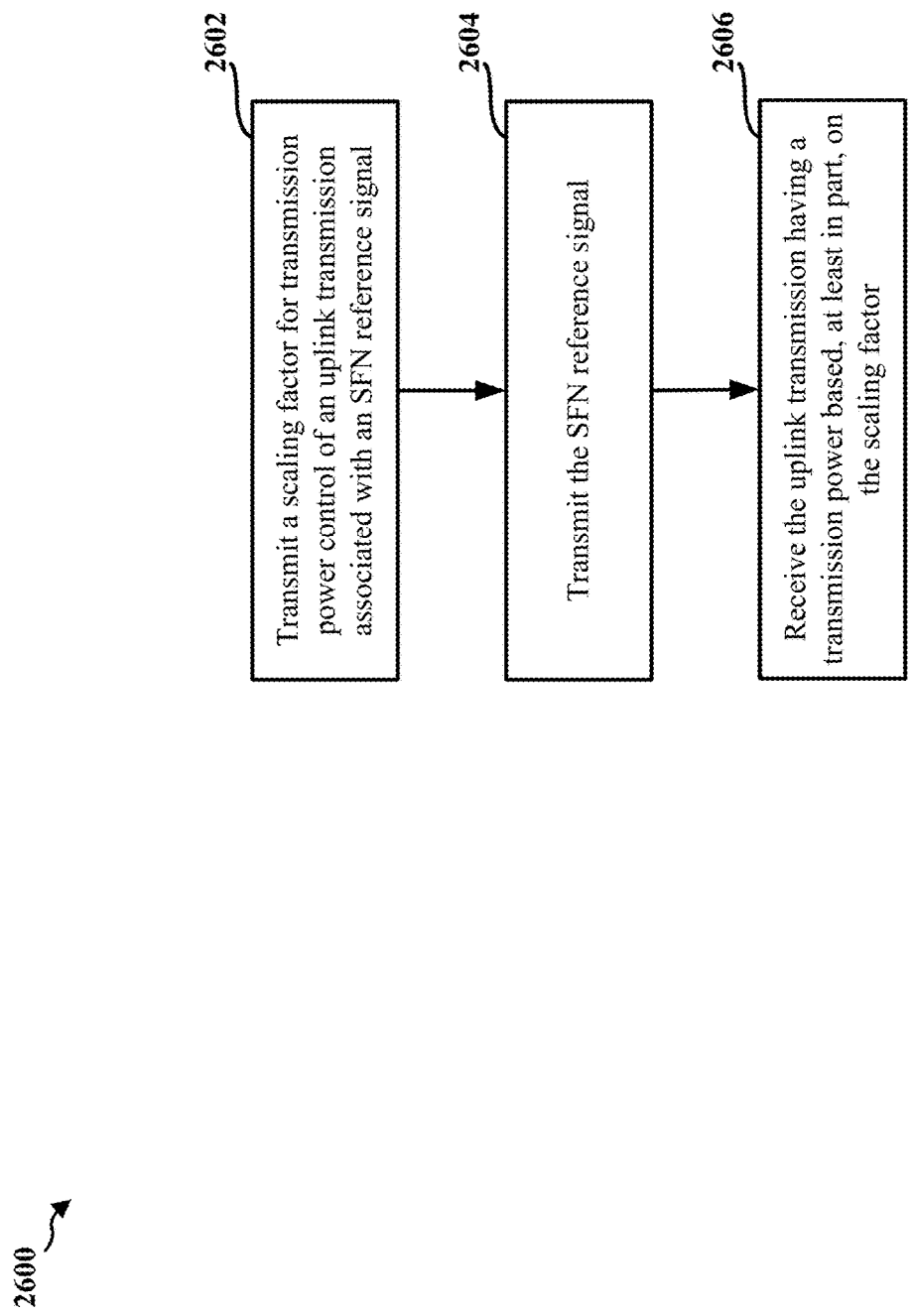
FIG. 26 is a flowchart of a method of wireless communication at a network entity, in accordance with the teachings disclosed herein.

FIG. 26 is a flowchart 2600 of a method of wireless communication. The method may be performed by a network entity (e.g., the base station 102/180, the base station 310, and/or an apparatus 2802 of FIG. 28). The method may help enable the base station to provide information to a UE for an improved uplink transmission power for improved reception at a network in an SFN.

At 2602, the network entity indicates, to a UE, a scaling factor for transmission power control of an uplink transmission associated with an SFN reference signal transmitted by a set of two or more transmission points configured for SFN communication, as described in connection with the example scaling factor 1212 and/or the first scaling factor 1212a to the n-th scaling factor 1212n of FIG. 12. The indicating of the scaling factor, at 2602, may be performed by, for example, by a scaling factor component 2852 of the apparatus 2802 of FIG. 28.

The network entity may transmit the scaling factor in system information, e.g., a SIB such as SIB 1. The network entity may transmit the scaling factor in dedicated signaling for the UE, e.g., one or more of an RRC message, a MAC-CE, or DCI. In some examples, the SFN reference signal may be part of a burst set. The network entity may transmit a different scaling factor for each SFN reference signal in a burst set. For example, the network entity may transmit a different scaling factor for each SFN SSB in an SFN SSB burst set. The network entity may transmit a common scaling factor for each SFN reference signal in a burst set. For example, the network entity may transmit a common scaling factor for each SFN SSB in an SFN SSB burst set.

At 2604, the network entity transmits the SFN reference signal, as described in connection with the example SFN reference signal 1216 of FIG. 12. In some examples, the SFN reference signal may include two or more SFN SSBs transmitted by the set of two or more transmission points. The transmitting of the SFN reference signal, at 2604, may be performed by an SFN reference signal component 2854 of the apparatus 2802 of FIG. 28.

At 2606, the network entity receives the uplink transmission having a transmission power based, at least in part, on the scaling factor, as described in connection with the uplink transmission 1224 of FIG. 12. In some examples, the uplink transmission may include a PRACH transmission. The receiving of the uplink transmission, at 2606, may be performed, for example, by an uplink signal component 2844 of the apparatus 2802 of FIG. 28.

Figure 27:
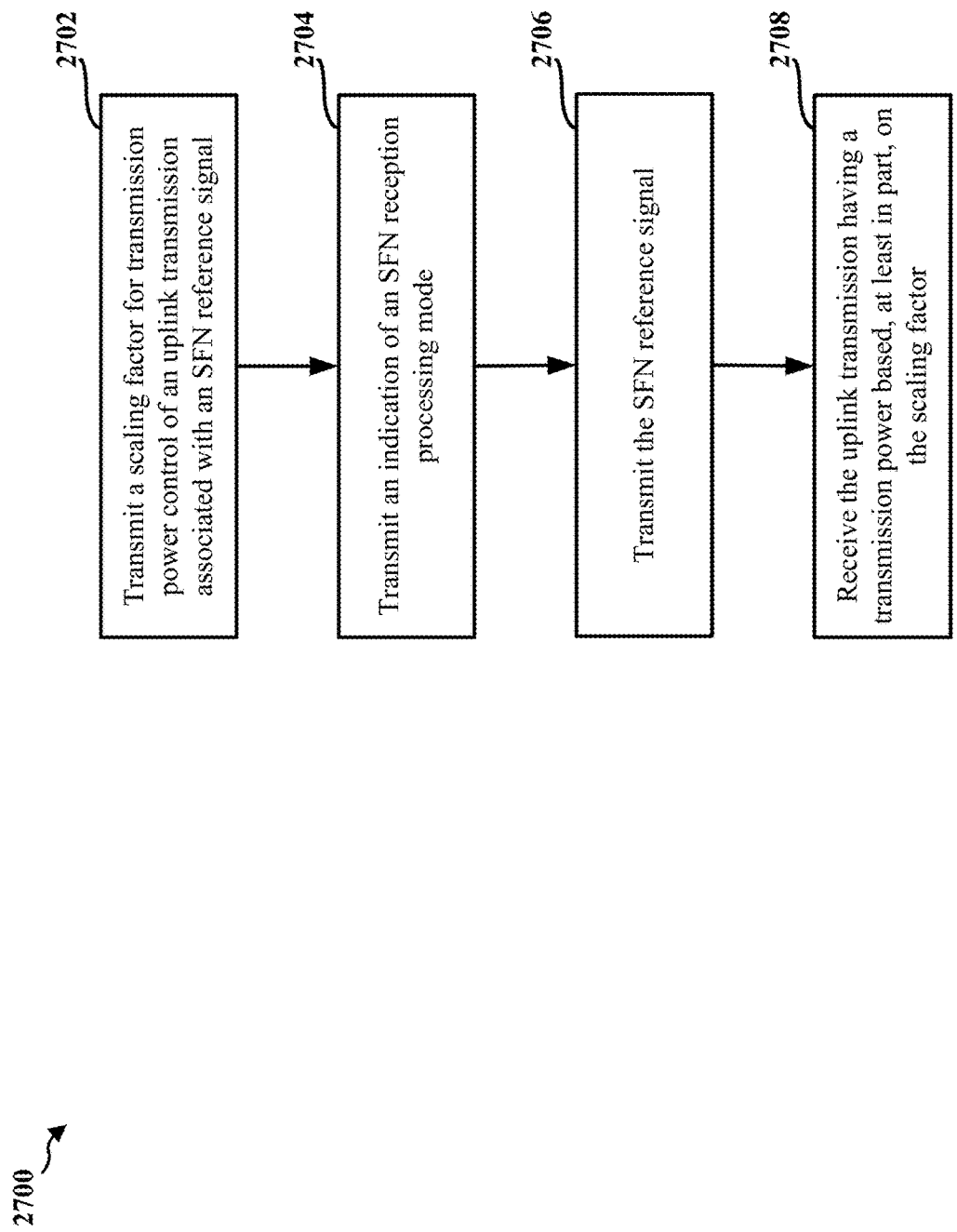
FIG. 27 is a flowchart of a method of wireless communication at a network entity, in accordance with the teachings disclosed herein.

FIG. 27 is a flowchart 2700 of a method of wireless communication. The method may be performed by a network entity (e.g., the base station 102/180, the base station 310, and/or an apparatus 2802 of FIG. 28). The method may help enable the base station to provide information to a UE for an improved uplink transmission power for improved reception at a network in an SFN.

At 2702, the network entity indicates, to a UE, a scaling factor for transmission power control of an uplink transmission associated with an SFN reference signal transmitted by a set of two or more transmission points configured for SFN communication, as described in connection with the example scaling factor 1212 and/or the first scaling factor 1212a to the n-th scaling factor 1212n of FIG. 12. The indicating of the scaling factor, at 2702, may be performed by, for example, by a scaling factor component 2852 of the apparatus 2802 of FIG. 28.

The network entity may transmit the scaling factor in system information, e.g., a SIB such as SIB 1. The network entity may transmit the scaling factor in dedicated signaling for the UE, e.g., one or more of an RRC message, a MAC-CE, or DCI. In some examples, the SFN reference signal may be part of a burst set. The network entity may transmit a different scaling factor for each SFN reference signal in a burst set. For example, the network entity may transmit a different scaling factor for each SFN SSB in an SFN SSB burst set. The network entity may transmit a common scaling factor for each SFN reference signal in a burst set. For example, the network entity may transmit a common scaling factor for each SFN SSB in an SFN SSB burst set.

In some examples, the network entity may transmit multiple scaling factors for the SFN reference signal, each of the multiple scaling factors being associated with a different SFN reception processing mode. For example, at 2704, the network entity may further transmit an indication of an SFN reception processing mode, as described in connection with the example SFN reception processing mode indication 1214 of FIG. 12. The indication of the SFN reception processing mode may enable a UE to select between the different scaling factors based on the SFN reception processing mode. The network entity may transmit an indication to the UE indicating a selective processing mode (e.g., in which the network selects a signal from one of multiple reception points to process an uplink signal from the UE), a combined processing mode (e.g., in which the network combines a received signal from multiple reception points to process an uplink signal from the UE), or an independent processing mode (e.g., in which an uplink signal from the UE is processed with independent baseband processors at different reception points such as TRPs). The transmitting of the indication, at 2704, may be performed by a mode component 2842 of the apparatus 2802 of FIG. 28.

At 2706, the network entity transmits the SFN reference signal, as described in connection with the example SFN reference signal 1216 of FIG. 12. In some examples, the SFN reference signal may include two or more SFN SSBs transmitted by the set of two or more transmission points. The transmitting of the SFN reference signal, at 2706, may be performed by an SFN reference signal component 2854 of the apparatus 2802 of FIG. 28.

At 2708, the network entity receives the uplink transmission having a transmission power based, at least in part, on the scaling factor, as described in connection with the uplink transmission 1224 of FIG. 12. In some examples, the uplink transmission may include a PRACH transmission. The receiving of the uplink transmission, at 2708, may be performed, for example, by an uplink signal component 2844 of the apparatus 2802 of FIG. 28.

Figure 28:
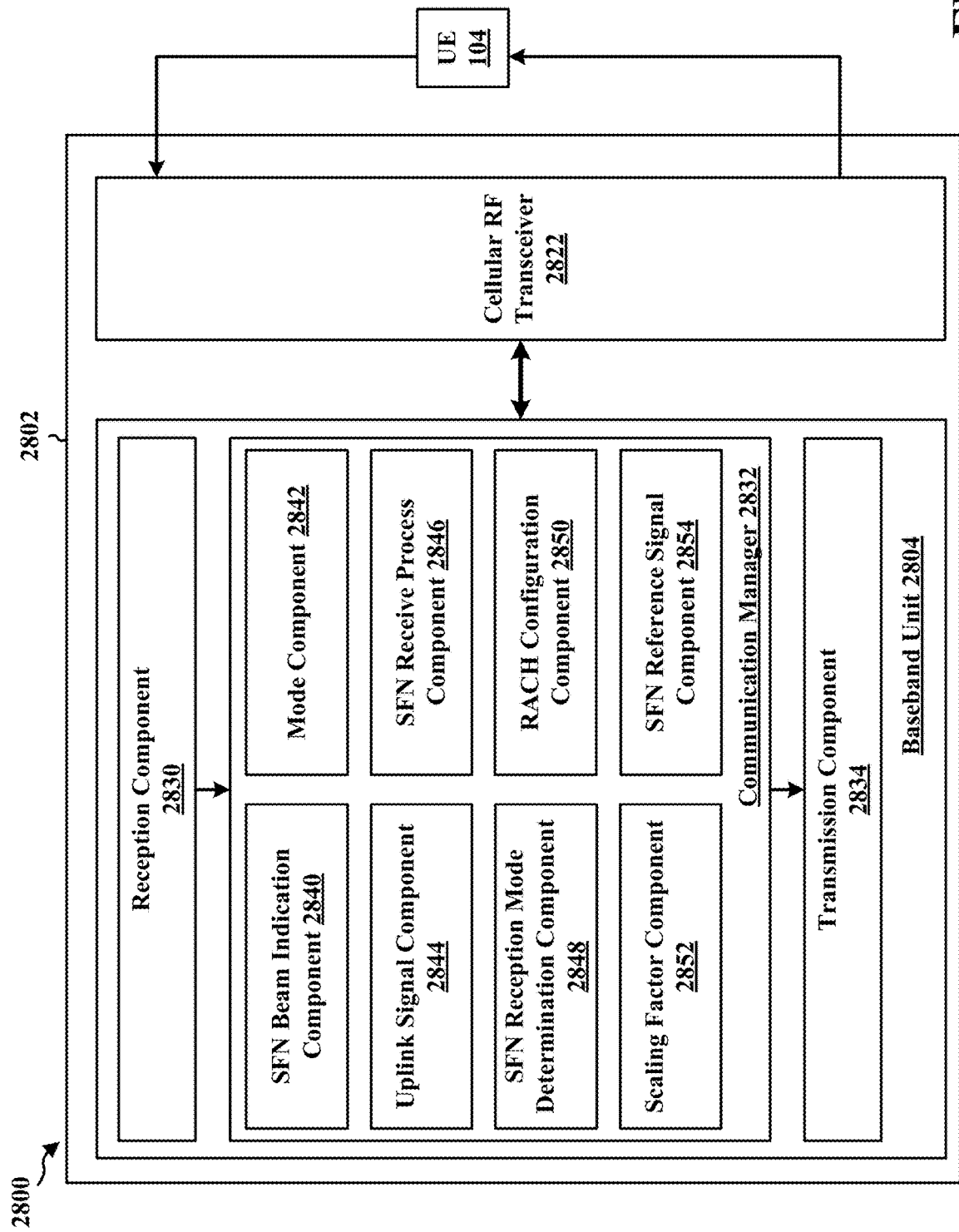
FIG. 28 is a diagram illustrating an example of a hardware implementation for an example apparatus, in accordance with the teachings disclosed herein.

FIG. 28 is a diagram 2800 illustrating an example of a hardware implementation for an apparatus 2802. The apparatus 2802 may be a network component, such as a base station, a component of a base station, or may implement base station functionality. In some aspects, the apparatus 2802 may include a baseband unit 2804. The baseband unit 2804 may communicate through a cellular RF transceiver 2822 with the UE 104. The baseband unit 2804 may include a computer-readable medium/memory. The baseband unit 2804 is responsible for general processing, including the execution of software stored on the computer-readable medium/memory. The software, when executed by the baseband unit 2804, causes the baseband unit 2804 to perform the various functions described supra. The computer-readable medium/memory may also be used for storing data that is manipulated by the baseband unit 2804 when executing software. The baseband unit 2804 further includes a reception component 2830, a communication manager 2832, and a transmission component 2834. The communication manager 2832 includes the one or more illustrated components. The components within the communication manager 2832 may be stored in the computer-readable medium/memory and/or configured as hardware within the baseband unit 2804. The baseband unit 2804 may be a component of the base station 310 and may include the memory 376 and/or at least one of the TX processor 316, the RX processor 370, and the controller/processor 375.

The communication manager 2832 includes an SFN beam indication component 2840 that is configured to provide SFN beam indicators identifying transmit beams that are SFN beams among a plurality of beams for downlink transmissions, for example, as described in connection with 2304 of FIG. 23.

The communication manager 2832 also includes a mode component 2842 that is configured to transmit an indication of a set of SFN receiver processing modes, for example, as described in connection with 2202 of FIG. 22 and/or 2302 of FIG. 23. The example mode component 2842 may also be configured to transmit an indication of an SFN reception processing mode, for example, as described in connection with 2504 of FIG. 25. The example mode component 2842 may also be configured to transmit an indication of an SFN reception processing mode, for example, as described in connection with 2704 of FIG. 27.

The communication manager 2832 also includes an uplink signal component 2844 that is configured to receive an uplink signal from the UE via at least one of a set of base stations, for example, as described in connection with 2204 of FIG. 22 and/or 2306 of FIG. 23. The example uplink signal component 2844 may also be configured to receive a RACH transmission based on the RACH configuration, for example, as described in connection with 2404 of FIG. 24 and/or 2506 of FIG. 25. The example uplink signal component 2844 may also be configured to receive the uplink transmission having a transmission power based, at least in part, on the scaling factor, for example, as described in connection with 2606 of FIG. 26 and/or 2708 of FIG. 27.

The communication manager 2832 also includes an SFN receive process component 2846 that is configured to process the received uplink signal based on an SFN receiver processing mode of the indicated set of SFN receiver processing modes, for example, as described in connection with 2206 of FIG. 22 and/or 2310 of FIG. 23. The example SFN receive process component 2846 may also be configured to select a subset of received uplink signals for processing from a subset of RRHs, for example, as described in connection with 2312 of FIG. 23. The example SFN receive process component 2846 may also be configured to combine respective uplink signals received by a set of RRHs, for example, as described in connection with 2314 of FIG. 23. The example SFN receive process component 2846 may also be configured to process the received uplink signal separately for the set of base stations/TRPs, for example, as described in connection with 2316 of FIG. 23.

The communication manager 2832 also includes an SFN reception mode determination component 2848 that is configured to determine an SFN receiver processing mode, for example, as described in connection with 2308 of FIG. 23.

The communication manager 2832 also includes a RACH configuration component 2850 that is configured to transmit a RACH configuration associated with an SFN SSB transmitted by a set of two or more transmission points, for example, as described in connection with 2402 of FIG. 24 and/or 2502 of FIG. 25.

The communication manager 2832 also includes a scaling factor component 2852 that is configured to transmit a scaling factor for transmission power control of an uplink transmission associated with an SFN reference signal, for example, as described in connection with 2602 of FIG. 26 and/or 2702 of FIG. 27.

The communication manager 2832 also includes an SFN reference signal component 2854 that is configured to transmit the SFN reference signal, for example, as described in connection with 2604 of FIG. 26 and/or 2706 of FIG. 27.

The apparatus may include additional components that perform each of the blocks of the algorithm in the flowcharts of FIGS. 21 to 27. As such, each block in the flowcharts of FIGS. 21 to 27 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 2802 may include a variety of components configured for various functions. In one configuration, the apparatus 2802, and in particular the baseband unit 2804, includes means for indicating different SFN receiver processing modes. The example apparatus 2802 also includes means for indicating different RACH configurations for SFN. The example apparatus 2802 also includes means for indicating modified power control factors for SFN.

In another configuration, the example apparatus 2802 also includes means for transmitting, to a UE, an indication of a set of SFN receiver processing modes, where the network entity is associated with a set of two or more base stations configured for SFN communication. The example apparatus 2802 also includes means for receiving an uplink signal from the UE via at least one of the base stations. The example apparatus 2802 also includes means for processing the received uplink signal based on an SFN receiver processing mode of the indicated set of SFN receiver processing modes.

In another configuration, the example apparatus 2802 also includes means for determining the SFN receiver processing mode to process the received uplink signal.

In another configuration, the example apparatus 2802 also includes means for selecting a subset of received uplink signals for processing from a subset of the RRHs, where the network entity processes the selected subset of the received uplink signals.

In another configuration, the example apparatus 2802 also includes means for combining respective uplink signals received by the set of RRHs.

In another configuration, the example apparatus 2802 also includes means for providing SFN-beam indicators identifying transmit beams that are SFN-beams among a plurality of beams for downlink transmission.

In another configuration, the example apparatus 2802 also includes means for transmitting, to a UE, a RACH configuration associated with a SFN SSB transmitted by a set of two or more base stations configured for SFN communication, where the RACH configuration associated with the SFN SSB includes one or more parameter that are different than for a non-SFN SSB. The example apparatus 2802 also includes means for receiving a RACH transmission from a UE based on the RACH configuration. The example apparatus 2802 also includes means for transmitting an indication of a reception processing mode for an SFN to a UE.

In another configuration, the example apparatus 2802 also includes means for indicating, to a UE, a scaling factor for transmission power control of an uplink transmission associated with a SFN reference signal transmitted by a set of two or more transmission points configured for SFN communication. The example apparatus 2802 also includes means for transmitting the SFN reference signal. The example apparatus 2802 also includes means for receiving the uplink transmission having a transmission power based, at least in part, on the scaling factor.

In another configuration, the example apparatus 2802 also includes means for transmitting an indication of a reception processing mode for an SFN to a UE.

The means may be one or more of the components of the apparatus 2802 configured to perform the functions recited by the means. As described supra, the apparatus 2802 may include the TX processor 316, the RX processor 370, and the controller/processor 375. As such, in one configuration, the means may be the TX processor 316, the RX processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication at a UE, comprising: receiving an indication of a set of SFN receiver processing modes supported by a set of two or more base stations configured for SFN communication; receiving an SFN-beam that is SFN transmitted by the set of two or more base stations; and transmitting an uplink signal to the set of two or more base stations based on the indication and the SFN-beam.

Aspect 2 is the method of aspect 1, further including that the set of two or more base stations includes at least one of: a first TRP and a second TRP, a first RRH and a second RRH, or the first TRP and the first RRH.

Aspect 3 is the method of any of aspect 1 and aspect 2, further including that the set of SFN receiver processing modes comprises at least one of selective processing, combined processing, and independent processing.

Aspect 4 is the method of any of aspects 1 to 3, further including that the UE selects an uplink beam based on a measurement of the SFN-beam.

Aspect 5 is the method of any of aspects 1 to 4, further including that the uplink signal comprises a PRACH, and wherein the UE selects a RACH occasion to transmit the PRACH based on a measurement of the SFN-beam.

Aspect 6 is the method of any of aspects 1 to 5, further including that the UE receives SFN-beam indictors identifying transmit beams that are SFN-beams among a plurality of beams for downlink transmission.

Aspect 7 is the method of any of aspects 1 to 6, further including that the indication maps a respective SFN receiver processing mode of the set of SFN receiver processing modes to a corresponding SFN-beam.

Aspect 8 is the method of any of aspects 1 to 7, further including that the UE adapts one or more transmit parameters associated with transmitting the uplink signal based on the respective SFN receiver processing mode mapping to the received SFN-beam.

Aspect 9 is the method of any of aspects 1 to 8, further including that the one or more transmit parameters comprise an uplink transmit power, beam selection, panel selection, and link adaptation.

Aspect 10 is the method of any of aspects 1 to 9, further including that the indication of the set of SFN receiver processing modes identifies at least one SFN receiver processing mode supported by the set of two or more base stations.

Aspect 11 is the method of any of aspects 1 to 10, further including that the UE adapts one or more transmit parameters associated with transmitting the uplink signal based on the at least one identified SFN receiver processing modes.

Aspect 12 is the method of any of aspects 1 to 11, further including that the one or more transmit parameters comprise an uplink transmit power, beam selection, panel selection, and link adaptation.

Aspect 13 is the method of any of aspects 1 to 12, further including that the UE receives the indication via at least one of a SIB, RRC signaling, a MAC-CE, and L1 signaling.

Aspect 14 is the method of any of aspects 1 to 13, further including that the uplink signal comprises at least one of a PRACH, a PUCCH, a PUSCH, and an SRS.

Aspect 15 is an apparatus for wireless communication including at least processor coupled to a memory and configured to implement any of aspects 1 to 14.

Aspect 16 is an apparatus for wireless communication including means for implementing any of aspects 1 to 14.

Aspect 17 is a non-transitory computer-readable medium storing computer executable code, where the code, when executed, causes a processor to implement any of aspects 1 to 14.

Aspect 18 is a method of wireless communication at a network entity, comprising: transmitting, to a UE, an indication of a set of SFN receiver processing modes, wherein the network entity is associated with a set of two or more base stations configured for SFN communication; receiving an uplink signal from the UE via at least one of the base stations; and processing the received uplink signal based on an SFN receiver processing mode of the indicated set of SFN receiver processing modes.

Aspect 19 is the method of aspect 18, further including that the set of two or more base stations are capable of supporting the indicated SFN receiver processing modes.

Aspect 20 is the method of any of aspect 18 or aspect 19, further including that the set of two or more base stations include at least one of: a first TRP and a second TRP, a first RRH and a second RRH, or the first TRP and the first RRH.

Aspect 21 is the method of any of aspects 18 to 20, further including that the network entity determines the SFN receiver processing mode to process the received uplink signal based on at least one of an instantaneous receiver power of the uplink signal, a receiver power delta associated with the uplink signal across the set of two or more base stations, an uplink channel associated with the uplink signal, an average receiver power associated with the uplink signal, cell loading associated with the uplink signal, and interference conditions associated with the uplink signal.

Aspect 22 is the method of any of aspects 18 to 21, further including that the network entity further provides SFN-beam indictors identifying transmit beams that are SFN-beams among a plurality of beams for downlink transmission.

Aspect 23 is the method of any of aspects 18 to 22, further including that the indication maps a respective SFN receiver processing mode of the set of SFN receiver processing modes to a corresponding SFN-beam.

Aspect 24 is the method of any of aspects 18 to 23, further including that the indication of the set of SFN receiver processing modes identifies at least one SFN receiver processing mode supported by the network entity.

Aspect 25 is the method of any of aspects 18 to 24, further including that the network entity transmits the indication using at least one of a SIB, RRC signaling, a MAC-CE, and L1 signaling.

Aspect 26 is the method of any of aspects 18 to 25, further including that the uplink signal comprises at least one of a PRACH, a PUCCH, a PUSCH, and an SRS.

Aspect 27 is the method of any of aspects 18 to 26, further including that the set of SFN receiver processing modes comprises at least one of selective processing, combined processing, and independent processing.

Aspect 28 is the method of any of aspects 18 to 27, further including that the set of two or more base stations comprises a set of RRHs, the method further comprising: selecting a subset of received uplink signals for processing from a subset of the RRHs, wherein the network entity processes the selected subset of the received uplink signals.

Aspect 29 is the method of any of aspects 18 to 28, further including that the subset of the RRHs is selected based on at least one of a configuration or a criterion associated with the received uplink signals.

Aspect 30 is the method of any of aspects 18 to 29, further including that processing the received uplink signal includes performing PRACH preamble detection based on the selected subset of the received uplink signals.

Aspect 31 is the method of any of aspects 18 to 30, further including that the set of two or more base stations comprises a set of RRHs, the method further comprising: combining respective uplink signals received by the set of RRHs.

Aspect 32 is the method of any of aspects 18 to 31, further including that combining the respective uplink signals is based on a combining scheme.

Aspect 33 is the method of any of aspects 18 to 32, further including that processing the received uplink signal includes performing PRACH preamble detection based on the combined respective uplink signals.

Aspect 34 is the method of any of aspects 18 to 33, further including that the set of two or more base stations comprises a set of TRPs, and wherein the network entity performs PRACH preamble detection using the received uplink signal from a single TRP.

Aspect 35 is the method of any of aspects 18 to 34, further including that the received uplink signal is processed separately for the set of TRPs.

Aspect 36 is the method of any of aspects 18 to 35, further including the received uplink signal is successfully received when at least one of the TRPs detects a PRACH preamble.

Aspect 37 is an apparatus for wireless communication including at least processor coupled to a memory and configured to implement any of aspects 18 to 36.

Aspect 38 is an apparatus for wireless communication including means for implementing any of aspects 18 to 36.

Aspect 39 is a non-transitory computer-readable medium storing computer executable code, where the code, when executed, causes a processor to implement any of aspects 18 to 36.

Aspect 40 is a method of wireless communication at a UE, comprising: receiving a RACH configuration associated with a SFN SSB transmitted by a set of two or more base stations configured for SFN communication, wherein the RACH configuration associated with the SFN SSB includes one or more parameter that are different than for a non-SFN SSB; and transmitting a RACH transmission based on the RACH configuration.

Aspect 41 is the method of aspect 40, further including that the one or more parameter includes a RSRP threshold associated with the SFN SSB.

Aspect 42 is the method of any of aspects 40 and 41, further including that the RSRP threshold associated with the SFN SSB is higher than for the non-SFN SSB.

Aspect 43 is the method of any of aspects 40 to 42, further including that the one or more parameter includes a RACH message A (Msg A) RSRP threshold for the SFN SSB.

Aspect 44 is the method of any of aspects 40 to 43, further including that the one or more parameter includes a target received power for a RACH preamble associated with the SFN SSB.

Aspect 45 is the method of any of aspects 40 to 44, further including that the target received power for the RACH preamble associated with the SFN SSB is higher than for a non-SFN SSB.

Aspect 46 is the method of any of aspects 40 to 45, further including that the one or more parameter includes a power ramping step associated with the SFN SSB.

Aspect 47 is the method of any of aspects 40 to 46, further including that the power ramping step associated with the SFN SSB is higher than for a non-SFN SSB.

Aspect 48 is the method of any of aspects 40 to 47, further including that the one or more parameter includes a maximum number of transmissions of a RACH preamble associated with the SFN SSB.

Aspect 49 is the method of any of aspects 40 to 48, further including that the RACH configuration associated with the SFN SSB is received in a RRC IE for RACH associated with an SFN.

Aspect 50 is the method of any of aspects 40 to 49, further including that the RACH configuration associated with the SFN SSB is received in a RRC IE for RACH parameters for an SFN and a non-SFN.

Aspect 51 is the method of any of aspects 40 to 50, further including that the RACH configuration associated with the SFN SSB is received in system information.

Aspect 52 is the method of any of aspects 40 to 51, further including that the RACH configuration associated with the SFN SSB is received in dedicated RRC signaling to the UE.

Aspect 53 is the method of any of aspects 40 to 52, further including that the UE receives a common RACH configuration for each SFN SSB in an SFN SSB burst set.

Aspect 54 is the method of any of aspects 40 to 52, further including that the UE receives a different RACH configuration for each SFN SSB in an SFN SSB burst set.

Aspect 55 is the method of any of aspects 40 to 54, further including that the UE receives multiple RACH configurations for the SFN SSB, each of the multiple RACH configurations being associated with a different SFN reception processing mode.

Aspect 56 is the method of any of aspects 40 to 55, further including: receiving an indication of an SFN reception processing mode; and selecting one of the multiple RACH configurations for the SFN SSB based on the SFN reception processing mode.

Aspect 57 is an apparatus for wireless communication comprising at least one processor coupled to a memory and configured to implement any of aspects 40 to 56.

Aspect 58 is an apparatus for wireless communication including means for implementing any of aspects 40 to 56.

Aspect 59 is a non-transitory computer-readable storage medium storing computer executable code, where the code, when executed, causes a processor to implement any of aspects 40 to 56.

Aspect 60 is a method of wireless communication at a network entity, comprising: transmitting, to a UE, a RACH configuration associated with a SFN SSB transmitted by a set of two or more base stations configured for SFN communication, wherein the RACH configuration associated with the SFN SSB includes one or more parameter that are different than for a non-SFN SSB; and receiving a RACH transmission from a UE based on the RACH configuration.

Aspect 61 is the method of aspect 1, further including that the one or more parameter includes a RSRP threshold associated with the SFN SSB.

Aspect 62 is the method of any of aspects 60 and 61, further including that the RSRP threshold associated with the SFN SSB is higher than for the non-SFN SSB.

Aspect 63 is the method of any of aspects 60 to 62, further including that the one or more parameter includes a RACH message A (Msg A) RSRP threshold for the SFN SSB.

Aspect 64 is the method of any of aspects 60 to 63, further including that the one or more parameter includes a target received power for a RACH preamble associated with the SFN SSB.

Aspect 65 is the method of any of aspects 60 to 64, further including that the target received power for the RACH preamble associated with the SFN SSB is higher than for a non-SFN SSB.

Aspect 66 is the method of any of aspects 60 to 65, further including that the one or more parameter includes a power ramping step associated with the SFN SSB.

Aspect 67 is the method of any of aspects 60 to 66, further including that the power ramping step associated with the SFN SSB is higher than for a non-SFN SSB.

Aspect 68 is the method of any of aspects 60 to 67, further including that the one or more parameter includes a maximum number of transmissions of a RACH preamble associated with the SFN SSB.

Aspect 69 is the method of any of aspects 60 to 68, further including that the RACH configuration associated with the SFN SSB is transmitted in a RRC IE for RACH associated with an SFN.

Aspect 70 is the method of any of aspects 60 to 69, further including that the RACH configuration associated with the SFN SSB is transmitted in a RRC IE for RACH parameters for an SFN and a non-SFN.

Aspect 71 is the method of any of aspects 60 to 70, further including that the RACH configuration associated with the SFN SSB is transmitted in system information.

Aspect 72 is the method of any of aspects 60 to 71, further including that the RACH configuration associated with the SFN SSB is transmitted in dedicated RRC signaling to the UE.

Aspect 73 is the method of any of aspects 60 to 72, further including that the network entity transmits a common RACH configuration for each SFN SSB in an SFN SSB burst set.

Aspect 74 is the method of any of aspects 60 to 72, further including that the network entity transmits a different RACH configuration for each SFN SSB in an SFN SSB burst set.

Aspect 75 is the method of any of aspects 60 to 74, further including that the network entity transmits multiple RACH configurations for the SFN SSB, each of the multiple RACH configurations being associated with a different SFN reception processing mode.

Aspect 76 is an apparatus for wireless communication comprising at least one processor coupled to a memory and configured to implement any of aspects 60 to 75.

Aspect 77 is an apparatus for wireless communication including means for implementing any of aspects 60 to 75.

Aspect 78 is a non-transitory computer-readable storage medium storing computer executable code, where the code, when executed, causes a processor to implement any of aspects 60 to 75.

Aspect 79 is a method of wireless communication at a UE, comprising receiving, from a network, a scaling factor for transmission power control of an uplink transmission associated with an SFN reference signal transmitted by a set of two or more base stations configured for SFN communication; receiving the SFN reference signal; determining a transmission power for the uplink transmission based on a pathloss for the SFN reference signal and using the scaling factor, where the pathloss measurement is based on respective pathlosses associated with the set of two or more base stations; and transmitting the uplink transmission based on the determined transmission power.

Aspect 80 is the method of aspect 79, further including that determining the transmission power of the uplink transmission using the scaling factor includes applying the scaling factor to the pathloss measurement for the SFN reference signal.

Aspect 81 is the method of any of aspects 79 and 80, further including that the uplink transmission is a PRACH transmission.

Aspect 82 is the method of any of aspects 79 to 81, further including: receiving a configuration of a synchronization signal physical broadcast channel block power, where determining the transmission power using the scaling factor includes applying the scaling factor to the synchronization signal physical broadcast channel block power.

Aspect 83 is the method of any of aspects 79 to 82, further including that the UE receives the scaling factor in system information.

Aspect 84 is the method of any of aspects 79 to 83, further including that the UE receives the scaling factor in dedicated signaling for the UE comprising one or more of an RRC message, a MAC-CE, or DCI.

Aspect 85 is the method of any of aspects 79 to 84, further including that the UE receives a different scaling factor for each SFN reference signal in a burst set.

Aspect 86 is the method of any of aspects 79 to 84, further including that the UE receives a common scaling factor for each SFN reference signal in a burst set.

Aspect 87 is the method of any of aspects 79 to 86, further including that the UE receives multiple scaling factors for the SFN reference signal, each of the multiple scaling factors being associated with a different SFN reception processing mode.

Aspect 88 is the method of any of aspects 79 to 87, further including: receiving an indication of an SFN reception processing mode; and selecting one of the multiple scaling factors for the SFN reference signal based on the SFN reception processing mode.

Aspect 89 is the method of any of aspects 79 to 88, further including that the SFN reference signal comprises two or more SFN SSBs transmitted by the set of two or more base stations.

Aspect 90 is the method of any of aspects 79 to 89, further including that the UE applies an adjusted scaling factor to determine the transmission power.

Aspect 91 is the method of any of aspects 79 to 90, further including that the adjusted scaling factor is based on a beam width for receiving.

Aspect 92 is the method of any of aspects 79 to 91, further including that the adjusted scaling factor is based on a number of beams or panels that the UE uses to receive the SFN reference signal.

Aspect 93 is the method of any of aspects 79 to 92, further including that applying the adjusted scaling factor comprises reducing the scaling factor.

Aspect 94 is an apparatus for wireless communication comprising at least one processor coupled to a memory and configured to implement any of aspects 79 to 93.

Aspect 95 is an apparatus for wireless communication including means for implementing any of aspects 79 to 93.

Aspect 96 is a non-transitory computer-readable storage medium storing computer executable code, where the code, when executed, causes a processor to implement any of aspects 79 to 93.

Aspect 97 is a method of wireless communication at a baes station, comprising: indicating, to a UE, a scaling factor for transmission power control of an uplink transmission associated with an SFN reference signal transmitted by a set of two or more transmission points configured for SFN communication; transmitting the SFN reference signal; and receiving the uplink transmission having a transmission power based, at least in part, on the scaling factor.

Aspect 98 is the method of aspect 97, further including that uplink transmission is a PRACH transmission.

Aspect 99 is the method of any of aspects 97 and 98, further including that the base station transmits the scaling factor in system information.

Aspect 100 is the method of any of aspects 97 to 99, further including that the base station transmits the scaling factor in dedicated signaling for the UE comprising one or more of an RRC message, a MAC-CE, or DCI.

Aspect 101 is the method of any of aspects 97 to 100, further including that the base station transmits a different scaling factor for each SFN reference signal in a burst set.

Aspect 102 is the method of any of aspects 97 to 100, further including that the base station transmits a common scaling factor for each SFN reference signal in a burst set.

Aspect 103 is the method of any of aspects 97 to 102, further including that the base station transmits multiple scaling factors for the SFN reference signal, each of the multiple scaling factors being associated with a different SFN reception processing mode.

Aspect 104 is the method of any of aspects 97 to 103, further including: transmitting an indication of an SFN reception processing mode.

Aspect 105 is the method of any of aspects 97 to 104, further including that the SFN reference signal comprises two or more SFN SSBs transmitted by the set of two or more transmission points.

Aspect 106 is an apparatus for wireless communication comprising at least one processor coupled to a memory and configured to implement any of aspects 97 to 105.

Aspect 107 is an apparatus for wireless communication including means for implementing any of aspects 97 to 105.

Aspect 108 is a non-transitory computer-readable storage medium storing computer executable code, where the code, when executed, causes a processor to implement any of aspects 97 to 105.

Aspect 109 is a method of wireless communication at a UE, comprising: receiving an indication of a set of SFN receiver processing modes supported by a set of two or more base stations configured for SFN communication; receiving an SFN-beam that is SFN transmitted by the set of two or more base stations; and transmitting an uplink signal to the set of two or more base stations based on the indication and the SFN-beam.

Aspect 110 is the method of aspect 109, further including that the set of SFN receiver processing modes comprises at least one of selective processing, combined processing, and independent processing.

Aspect 111 is the method of any of aspects 109 and 110, further including: selecting an uplink beam based on a measurement of the SFN-beam.

Aspect 112 is the method of any of aspects 109 to 111, further including that the uplink signal comprises a PRACH, the method further comprising: selecting a RACH occasion to transmit the PRACH based on a measurement of the SFN-beam.

Aspect 113 is the method of any of aspects 109 to 112, further including: receiving SFN-beam indictors identifying transmit beams that are SFN-beams among a plurality of beams for downlink transmission.

Aspect 114 is the method of any of aspects 109 to 113, further including that the indication maps a respective SFN receiver processing mode of the set of SFN receiver processing modes to a corresponding SFN-beam.

Aspect 115 is the method of any of aspects 109 to 114, further including: adapting a transmit parameter associated with transmitting the uplink signal based on the respective SFN receiver processing mode, the SFN-beam, and the indication, the transmit parameter including one or more of: an uplink transmit power, beam selection, panel selection, and link adaptation.

Aspect 116 is the method of any of aspects 109 to 115, further including that the indication of the set of SFN receiver processing modes identifies at least one SFN receiver processing mode supported by the set of two or more base stations.

Aspect 117 is the method of any of aspects 109 to 116, further including: adapting a transmit parameter associated with transmitting the uplink signal based on the at least one SFN receiver processing mode, the transmit parameter including one or more of: an uplink transmit power, beam selection, panel selection, and link adaptation.

Aspect 118 is an apparatus for wireless communication comprising at least one processor coupled to a memory and configured to implement any of aspects 109 to 117.

Aspect 119 is an apparatus for wireless communication including means for implementing any of aspects 109 to 117.

Aspect 120 is a non-transitory computer-readable storage medium storing computer executable code, where the code, when executed, causes a processor to implement any of aspects 109 to 117.

Aspect 121 is a method of wireless communication at a UE, comprising: receiving a RACH configuration associated with a SFN SSB transmitted by a set of two or more base stations configured for SFN communication, the RACH configuration associated with the SFN SSB including one or more parameter that are different than for a non-SFN SSB; and transmitting a RACH transmission based on the RACH configuration.

Aspect 122 is the method of aspect 121, further including that the one or more parameter includes a RSRP threshold associated with the SFN SSB, and the RSRP threshold associated with the SFN SSB is higher than for the non-SFN SSB.

Aspect 123 is the method of any of aspects 121 and 122, further including that the one or more parameter includes a RACH message A RSRP threshold for the SFN SSB.

Aspect 124 is the method of any of aspects 121 to 123, further including that the one or more parameter includes a target received power for a RACH preamble associated with the SFN SSB, and the target received power for the RACH preamble associated with the SFN SSB is higher than for the non-SFN SSB.

Aspect 125 is the method of any of aspects 121 to 124, further including that the one or more parameter includes a power ramping step associated with the SFN SSB, and the power ramping step associated with the SFN SSB is higher than for the non-SFN SSB.

Aspect 126 is the method of any of aspects 121 to 125, further including that the one or more parameter includes a maximum number of transmissions of a RACH preamble associated with the SFN SSB.

Aspect 127 is the method of any of aspects 121 to 126, further including that the RACH configuration associated with the SFN SSB is received in a RRC IE for RACH associated with an SFN.

Aspect 128 is the method of any of aspects 121 to 127, further including that the RACH configuration associated with the SFN SSB is received in a RRC IE for RACH parameters for an SFN and a non-SFN.

Aspect 129 is the method of any of aspects 121 to 128, further including: receiving a common RACH configuration for each SFN SSB in an SFN SSB burst set.

Aspect 130 is the method of any of aspects 121 to 128, further including: receiving a different RACH configuration for each SFN SSB in an SFN SSB burst set.

Aspect 131 is the method of any of aspects 121 to 130, further including: receiving multiple RACH configurations for the SFN SSB, each of the multiple RACH configurations being associated with a different SFN reception processing mode; receiving an indication of a first SFN reception processing mode of a set of SFN receiver processing modes; and selecting one of the multiple RACH configurations for the SFN SSB based on the first SFN reception processing mode.

Aspect 132 is the method of any of aspects 121 to 131, further including: receiving a scaling factor for transmission power control of an uplink transmission associated with a SFN reference signal; receiving the SFN reference signal; determining a transmission power for the uplink transmission based on a pathloss measurement for the SFN reference signal and using the scaling factor, where the pathloss measurement is based on respective pathlosses associated with the set of two or more base stations; and transmitting the uplink transmission based on the transmission power.

Aspect 133 is the method of any of aspects 121 to 132, further including that determining the transmission power of the uplink transmission using the scaling factor includes applying the scaling factor to the pathloss measurement for the SFN reference signal.

Aspect 134 is the method of any of aspects 121 to 133, further including that the uplink transmission is a PRACH transmission, the method further comprising: receiving a configuration of a synchronization signal physical broadcast channel block power, where determining the transmission power using the scaling factor includes applying the scaling factor to the synchronization signal physical broadcast channel block power.

Aspect 135 is the method of any of aspects 121 to 134, further including: receiving a different scaling factor for each SFN reference signal in a burst set or a resource set, or receiving a common scaling factor for each SFN reference signal in the burst set or the resource set.

Aspect 136 is the method of any of aspects 121 to 135, further including: receiving multiple scaling factors for the SFN reference signal, each of the multiple scaling factors being associated with a different SFN reception processing mode; receiving an indication of a first SFN reception processing mode of a set of SFN receiver processing modes; and selecting one of the multiple scaling factors for the SFN reference signal based on the first SFN reception processing mode.

Aspect 137 is the method of any of aspects 121 to 136, further including that the SFN reference signal comprises two or more SFN SSBs transmitted by the set of two or more base stations.

Aspect 138 is the method of any of aspects 121 to 137, further including: applying an adjusted scaling factor to determine the transmission power, the adjusted scaling factor being based on at least one of a beam width for receiving, and a number of beams or panels that the UE uses to receive the SFN reference signal.

Aspect 139 is an apparatus for wireless communication comprising at least one processor coupled to a memory and configured to implement any of aspects 121 to 138.

Aspect 140 is an apparatus for wireless communication including means for implementing any of aspects 121 to 138.

Aspect 141 is a non-transitory computer-readable storage medium storing computer executable code, where the code, when executed, causes a processor to implement any of aspects 121 to 138.

Aspect 142 is a method of wireless communication at a network entity, comprising: transmitting, to a UE, an indication of a set of SFN receiver processing modes, wherein the network entity is associated with a set of two or more base stations configured for SFN communication; receiving an uplink signal from the UE via at least one of the set of two or more base stations; and processing the uplink signal based on an SFN receiver processing mode of the set of SFN receiver processing modes.

Aspect 143 is an apparatus for wireless communication comprising at least one processor coupled to a memory and configured to implement aspect 143.

Aspect 144 is an apparatus for wireless communication including means for implementing aspect 143.

Aspect 145 is a non-transitory computer-readable storage medium storing computer executable code, where the code, when executed, causes a processor to implement aspect 143.

What is claimed is:

1. An apparatus for wireless communication at a user equipment (UE), comprising:
   a memory; and
   at least one processor coupled to the memory, the memory and the at least one processor configured to:
      receive an indication of a set of single frequency network (SFN) receiver processing modes supported by a set of two or more base stations configured for SFN communication;
      receive an SFN-beam that is SFN transmitted by the set of two or more base stations; and
      transmit an uplink signal to the set of two or more base stations based on the indication and the SFN-beam.

2. The apparatus of claim 1, wherein the set of SFN receiver processing modes comprises at least one of selective processing, combined processing, and independent processing.

3. The apparatus of claim 1, wherein the memory and the at least one processor are configured to:
   select an uplink beam based on a measurement of the SFN-beam.

4. The apparatus of claim 1, wherein the uplink signal comprises a physical random access channel (PRACH), and the memory and the at least one processor are configured to:
   select a random access channel (RACH) occasion to transmit the PRACH based on a measurement of the SFN-beam.

5. The apparatus of claim 1, wherein the memory and the at least one processor are configured to:
   receive SFN-beam indictors identifying transmit beams that are SFN-beams among a plurality of beams for downlink transmission.

6. The apparatus of claim 5, wherein the indication maps a respective SFN receiver processing mode of the set of SFN receiver processing modes to a corresponding SFN-beam.

7. The apparatus of claim 6, wherein the memory and the at least one processor are configured to:
   adapt a transmit parameter associated with transmitting the uplink signal based on the respective SFN receiver processing mode, the SFN-beam, and the indication, the transmit parameter including one or more of: an uplink transmit power, beam selection, panel selection, and link adaptation.

8. The apparatus of claim 5, wherein the indication of the set of SFN receiver processing modes identifies at least one SFN receiver processing mode supported by the set of two or more base stations.

9. The apparatus of claim 8, wherein the memory and the at least one processor are configured to:
   adapt a transmit parameter associated with transmitting the uplink signal based on the at least one SFN receiver processing mode, the transmit parameter including one or more of: an uplink transmit power, beam selection, panel selection, and link adaptation.

10. An apparatus for wireless communication at a user equipment (UE), comprising:
    a memory; and
    at least one processor coupled to the memory, the memory and the at least one processor configured to:
       receive a random access channel (RACH) configuration associated with a single frequency network (SFN) synchronization signal block (SSB) transmitted by a set of two or more base stations configured for SFN communication, the RACH configuration associated with the SFN SSB including one or more parameter that are different than for a non-SFN SSB; and transmitting a RACH transmission based on the RACH configuration.

11. The apparatus of claim 10, wherein the one or more parameter includes a reference signal received power (RSRP) threshold associated with the SFN SSB, and the RSRP threshold associated with the SFN SSB is higher than for the non-SFN SSB.

12. The apparatus of claim 10, wherein the one or more parameter includes a RACH message A RSRP threshold for the SFN SSB.

13. The apparatus of claim 10, wherein the one or more parameter includes a target received power for a RACH preamble associated with the SFN SSB, and the target received power for the RACH preamble associated with the SFN SSB is higher than for the non-SFN SSB.

14. The apparatus of claim 10, wherein the one or more parameter includes a power ramping step associated with the SFN SSB, and the power ramping step associated with the SFN SSB is higher than for the non-SFN SSB.

15. The apparatus of claim 10, wherein the one or more parameter includes a maximum number of transmissions of a RACH preamble associated with the SFN SSB.

16. The apparatus of claim 10, wherein the RACH configuration associated with the SFN SSB is received in a radio resource control (RRC) information element (IE) for RACH associated with an SFN.

17. The apparatus of claim 10, wherein the RACH configuration associated with the SFN SSB is received in a radio resource control (RRC) information element (IE) for RACH parameters for an SFN and a non-SFN.

18. The apparatus of claim 10, wherein the memory and the at least one processor are configured to:
receive a common RACH configuration for each SFN SSB in an SFN SSB burst set.

19. The apparatus of claim 10, wherein the memory and the at least one processor are configured to:
receive a different RACH configuration for each SFN SSB in an SFN SSB burst set.

20. The apparatus of claim 10, wherein the memory and the at least one processor are configured to:
receive multiple RACH configurations for the SFN SSB, each of the multiple RACH configurations being associated with a different SFN reception processing mode;
receive an indication of a first SFN reception processing mode of a set of SFN receiver processing modes; and
select one of the multiple RACH configurations for the SFN SSB based on the first SFN reception processing mode.

21. The apparatus of claim 10, wherein the memory and the at least one processor are further configured to:
receive a scaling factor for transmission power control of an uplink transmission associated with a single frequency network (SFN) reference signal;
receive the SFN reference signal;
determine a transmission power for the uplink transmission based on a pathloss measurement for the SFN reference signal and using the scaling factor, wherein the pathloss measurement is based on respective pathlosses associated with the set of two or more base stations; and
transmit the uplink transmission based on the transmission power.

22. The apparatus of claim 21, wherein to determine the transmission power of the uplink transmission using the scaling factor, the memory and the at least one processor are configured to:
apply the scaling factor to the pathloss measurement for the SFN reference signal.

23. The apparatus of claim 21, wherein the uplink transmission is a physical random access channel (PRACH) transmission, the memory and the at least one processor further configured to:
receive a configuration of a synchronization signal physical broadcast channel block power, wherein determining the transmission power using the scaling factor includes applying the scaling factor to the synchronization signal physical broadcast channel block power.

24. The apparatus of claim 21, wherein the memory and the at least one processor are configured to:
receive a different scaling factor for each SFN reference signal in a burst set or a resource set, or
receive a common scaling factor for each SFN reference signal in the burst set or the resource set.

25. The apparatus of claim 21, wherein the memory and the at least one processor are configured to:
receive multiple scaling factors for the SFN reference signal, each of the multiple scaling factors being associated with a different SFN reception processing mode;
receive an indication of a first SFN reception processing mode of a set of SFN receiver processing modes; and
select one of the multiple scaling factors for the SFN reference signal based on the first SFN reception processing mode.

26. The apparatus of claim 21, wherein the SFN reference signal comprises two or more SFN synchronization signal blocks (SSBs) transmitted by the set of two or more base stations.

27. The apparatus of claim 21, wherein the memory and the at least one processor are configured to:
apply an adjusted scaling factor to determine the transmission power, the adjusted scaling factor being based on at least one of a beam width for receiving, and a number of beams or panels that the UE uses to receive the SFN reference signal.

28. A method of wireless communication at a user equipment (UE), comprising:
receiving an indication of a set of single frequency network (SFN) receiver processing modes supported by a set of two or more base stations configured for SFN communication;
receiving an SFN-beam that is SFN transmitted by the set of two or more base stations; and
transmitting an uplink signal to the set of two or more base stations based on the indication and the SFN-beam.

29. An apparatus for wireless communication at a network entity, comprising:
a memory; and
at least one processor coupled to the memory, the memory and the at least one processor configured to:
transmit, to a user equipment (UE), an indication of a set of single frequency network (SFN) receiver processing modes, wherein the network entity is associated with a set of two or more base stations configured for SFN communication;
receive an uplink signal from the UE via at least one of the set of two or more base stations; and
process the uplink signal based on an SFN receiver processing mode of the set of SFN receiver processing modes.

* * * * *